(12) United States Patent
Nichols et al.

(10) Patent No.: US 10,746,270 B2
(45) Date of Patent: *Aug. 18, 2020

(54) CONTINUOUSLY VARIABLE TRANSMISSION

(71) Applicant: Fallbrook Intellectual Property Company LLC, Cedar Park, TX (US)

(72) Inventors: Jon M. Nichols, Georgetown, TX (US); Gregory G. Stevenson, Austin, TX (US); Brad P. Pohl, Leander, TX (US); Fernand A. Thomassy, Liberty Hill, TX (US); Charles B. Lohr, Austin, TX (US); Jeremy Carter, Austin, TX (US); John W. Sherrill, Round Rock, TX (US); Brian B. Sweet, Leander, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/924,080

(22) Filed: Mar. 16, 2018

(65) Prior Publication Data

US 2018/0202527 A1    Jul. 19, 2018

Related U.S. Application Data

(63) Continuation of application No. 15/062,461, filed on Mar. 7, 2016, now Pat. No. 9,920,823, which is a
(Continued)

(51) Int. Cl.
*F16H 15/28*    (2006.01)
*F16H 37/02*    (2006.01)
(Continued)

(52) U.S. Cl.
CPC .......... *F16H 37/022* (2013.01); *B62M 11/16* (2013.01); *F16H 15/28* (2013.01); *F16H 15/503* (2013.01);
(Continued)

(58) Field of Classification Search
CPC ...... F16H 37/022; F16H 15/503; F16H 15/52; F16H 15/28; F16H 61/6649; F16H 1/321;
(Continued)

(56) References Cited

U.S. PATENT DOCUMENTS

| | | | |
|---|---|---|---|
| 4,963 A | 2/1847 | Armstrong et al. | |
| 719,595 A | 2/1903 | Huss | |

(Continued)

FOREIGN PATENT DOCUMENTS

| | | |
|---|---|---|
| CH | 118064 | 12/1926 |
| CN | 1054340 | 9/1991 |

(Continued)

OTHER PUBLICATIONS

Office Action dated Aug. 3, 2012 for U.S. Appl. No. 12/760,823.
(Continued)

*Primary Examiner* — Roger L Pang
(74) *Attorney, Agent, or Firm* — Knobbe Martens Olson & Bear LLP

(57) ABSTRACT

Inventive embodiments are directed to components, subassemblies, systems, and/or methods for continuously variable transmissions (CVT). In one embodiment, a control system is adapted to facilitate a change in the ratio of a CVT. In another embodiment, a control system includes a stator plate configured to have a plurality of radially offset slots. Various inventive traction planet assemblies and stator plates can be used to facilitate shifting the ratio of a CVT. In some embodiments, the traction planet assemblies include planet axles configured to cooperate with the stator plate. In one
(Continued)

embodiment, the stator plate is configured to rotate and apply a skew condition to each of the planet axles. In some embodiments, a stator driver is operably coupled to the stator plate. Embodiments of a traction sun are adapted to cooperate with other components of the CVT to support operation and/or functionality of the CVT. Among other things, shift control interfaces for a CVT are disclosed.

20 Claims, 38 Drawing Sheets

Related U.S. Application Data continuation of application No. 14/195,483, filed on Mar. 3, 2014, now Pat. No. 9,279,482, which is a continuation of application No. 13/717,197, filed on Dec. 17, 2012, now Pat. No. 8,663,050, which is a continuation of application No. 12/760,823, filed on Apr. 15, 2010, now Pat. No. 8,360,917.

(60) Provisional application No. 61/239,377, filed on Sep. 2, 2009, provisional application No. 61/234,905, filed on Aug. 18, 2009, provisional application No. 61/170,073, filed on Apr. 16, 2009.

(51) Int. Cl.
| | |
|---|---|
| B62M 11/16 | (2006.01) |
| F16H 15/52 | (2006.01) |
| F16H 61/664 | (2006.01) |
| F16H 63/06 | (2006.01) |
| F16H 15/50 | (2006.01) |

(52) U.S. Cl.
CPC ......... F16H 15/52 (2013.01); F16H 61/6649 (2013.01); F16H 63/067 (2013.01)

(58) Field of Classification Search
CPC ......... F16H 2001/323; F16H 2001/324; F16H 2001/325
USPC ........ 475/163, 178, 185, 189, 190, 196, 214
See application file for complete search history.

(56) References Cited

U.S. PATENT DOCUMENTS

| | | | |
|---|---|---|---|
| 1,121,210 A | 12/1914 | Techel | |
| 1,175,677 A | 3/1916 | Barnes | |
| 1,207,985 A | 12/1916 | Null et al. | |
| 1,380,006 A | 5/1921 | Nielsen | |
| 1,390,971 A | 9/1921 | Samain | |
| 1,558,222 A | 10/1925 | Beetow | |
| 1,629,902 A | 5/1927 | Arter et al. | |
| 1,631,069 A | 5/1927 | Smith | |
| 1,686,446 A | 10/1928 | Gilman | |
| 1,774,254 A | 8/1930 | Daukus | |
| 1,793,571 A | 2/1931 | Vaughn | |
| 1,847,027 A | 2/1932 | Thomsen et al. | |
| 1,850,189 A | 3/1932 | Weiss | |
| 1,858,696 A | 5/1932 | Weiss | |
| 1,865,102 A | 6/1932 | Hayes | |
| 1,978,439 A | 10/1934 | Sharpe | |
| 2,030,203 A | 2/1936 | Gove et al. | |
| 2,060,884 A | 11/1936 | Madle | |
| 2,086,491 A | 7/1937 | Dodge | |
| 2,100,629 A | 11/1937 | Chilton | |
| 2,109,845 A | 3/1938 | Madle | |
| 2,112,763 A | 3/1938 | Cloudsley | |
| 2,131,158 A | 9/1938 | Almen et al. | |
| 2,134,225 A | 10/1938 | Christiansen | |
| 2,152,796 A | 4/1939 | Erban | |
| 2,196,064 A | 4/1940 | Erban | |
| 2,209,254 A | 7/1940 | Ahnger | |
| 2,230,398 A | 2/1941 | Benjafield | |
| 2,259,933 A | 10/1941 | Holloway | |
| 2,269,434 A | 1/1942 | Brooks | |
| 2,325,502 A | 7/1943 | Auguste | |
| RE22,761 E | 5/1946 | Wemp | |
| 2,461,258 A | 2/1949 | Brooks | |
| 2,469,653 A | 5/1949 | Kopp | |
| 2,480,968 A | 9/1949 | Ronai | |
| 2,553,465 A | 5/1951 | Monge | |
| 2,586,725 A | 2/1952 | Henry | |
| 2,595,367 A | 5/1952 | Picanol | |
| 2,596,538 A | 5/1952 | Dicke | |
| 2,597,849 A | 5/1952 | Alfredeen | |
| 2,675,713 A | 4/1954 | Acker | |
| 2,696,888 A | 12/1954 | Chillson et al. | |
| 2,868,038 A | 5/1955 | Billeter | |
| 2,716,357 A | 8/1955 | Rennerfelt | |
| 2,730,904 A | 1/1956 | Rennerfelt | |
| 2,748,614 A | 6/1956 | Weisel | |
| 2,959,070 A | 1/1959 | Flinn | |
| 2,873,911 A | 2/1959 | Perrine | |
| 2,874,592 A | 2/1959 | Oehrli | |
| 2,883,883 A | 4/1959 | Chillson | |
| 2,891,213 A | 6/1959 | Kern | |
| 2,901,924 A | 9/1959 | Banker | |
| 2,913,932 A | 11/1959 | Oehrli | |
| 2,931,234 A | 4/1960 | Hayward | |
| 2,931,235 A | 4/1960 | Hayward | |
| 2,949,800 A | 8/1960 | Neuschotz | |
| 2,959,063 A | 11/1960 | Perry | |
| 2,959,972 A | 11/1960 | Madson | |
| 2,964,959 A | 12/1960 | Beck | |
| 3,008,061 A | 11/1961 | Mims et al. | |
| 3,035,460 A | 5/1962 | Guichard | |
| 3,048,056 A | 8/1962 | Wolfram | |
| 3,051,020 A | 8/1962 | Hartupee | |
| 3,071,194 A | 1/1963 | Geske | |
| 3,086,704 A | 4/1963 | Hurtt | |
| 3,087,348 A | 4/1963 | Kraus | |
| 3,154,957 A | 11/1964 | Kashihara | |
| 3,163,050 A | 12/1964 | Kraus | |
| 3,176,542 A | 4/1965 | Monch | |
| 3,184,983 A | 5/1965 | Kraus | |
| 3,204,476 A | 9/1965 | Rouverol | |
| 3,209,606 A | 10/1965 | Yamamoto | |
| 3,211,364 A | 10/1965 | Wentling et al. | |
| 3,216,283 A | 11/1965 | General | |
| 3,229,538 A | 1/1966 | Schlottler | |
| 3,237,468 A | 3/1966 | Schlottler | |
| 3,246,531 A | 4/1966 | Kashihara | |
| 3,248,960 A | 5/1966 | Schottler | |
| 3,273,468 A | 9/1966 | Allen | |
| 3,280,646 A | 10/1966 | Lemieux | |
| 3,283,614 A | 11/1966 | Hewko | |
| 3,292,443 A | 12/1966 | Felix | |
| 3,340,895 A | 9/1967 | Osgood, Jr. et al. | |
| 3,374,009 A | 3/1968 | Jeunet | |
| 3,407,687 A | 10/1968 | Hayashi | |
| 3,413,896 A * | 12/1968 | Wildhaber | F16H 1/32 475/163 |
| 3,430,504 A | 3/1969 | Dickenbrock | |
| 3,439,563 A | 4/1969 | Petty | |
| 3,440,895 A | 4/1969 | Fellows | |
| 3,464,281 A | 9/1969 | Azuma | |
| 3,477,315 A | 11/1969 | Macks | |
| 3,487,726 A | 1/1970 | Burnett | |
| 3,487,727 A | 1/1970 | Gustafsson | |
| 3,574,289 A | 4/1971 | Scheiter et al. | |
| 3,581,587 A | 6/1971 | Dickenbrock | |
| 3,661,404 A | 5/1972 | Bossaer | |
| 3,695,120 A | 10/1972 | Titt | |
| 3,707,888 A | 1/1973 | Schottler | |
| 3,727,473 A | 4/1973 | Bayer | |
| 3,727,474 A | 4/1973 | Fullerton | |
| 3,736,803 A | 6/1973 | Horowitz et al. | |
| 3,768,715 A | 10/1973 | Tout | |
| 3,769,849 A | 11/1973 | Hagen | |
| 3,800,607 A | 4/1974 | Zurcher | |

(56) References Cited

U.S. PATENT DOCUMENTS

| | | |
|---|---|---|
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,987,681 A | 10/1976 | Keithley et al. |
| 3,996,807 A | 12/1976 | Adams |
| 4,023,442 A | 5/1977 | Woods et al. |
| 4,053,173 A | 10/1977 | Chase, Sr. |
| 4,086,026 A | 4/1978 | Tamanini |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,493,677 A | 1/1985 | Ikenoya |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |
| 4,549,874 A | 10/1985 | Wen |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,628,766 A | 12/1986 | De Brie Perry |
| 4,630,839 A | 12/1986 | Seol |
| 4,631,469 A | 12/1986 | Tsuboi et al. |
| 4,647,060 A | 3/1987 | Tomkinson |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,725,258 A | 2/1988 | Joanis, Jr. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,806,066 A | 2/1989 | Rhodes et al. |
| 4,830,578 A | 5/1989 | Kraus |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,884,473 A * | 12/1989 | Lew .................. F16H 1/32 475/168 |
| 4,900,046 A | 2/1990 | Aranceta-Angoitia |
| 4,909,101 A | 3/1990 | Terry |
| 4,918,344 A | 4/1990 | Chikamori et al. |
| 4,961,477 A | 10/1990 | Sweeney |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,090,658 A * | 2/1992 | Kusmer .................. F16K 41/106 251/129.11 |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,261,858 A | 11/1993 | Browning |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,323,570 A | 6/1994 | Kuhlman et al. |
| 5,330,396 A | 7/1994 | Lohr et al. |
| 5,355,749 A | 10/1994 | Obara et al. |
| 5,356,348 A | 10/1994 | Bellio et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,758 A | 9/1997 | Williamson |
| 5,669,845 A | 9/1997 | Muramoto et al. |
| 5,690,346 A | 11/1997 | Keskitalo |
| 5,701,786 A | 12/1997 | Kawakami |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,050,854 A | 4/2000 | Fang et al. |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |

(56) References Cited

U.S. PATENT DOCUMENTS

| | | |
|---|---|---|
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,155,132 A | 12/2000 | Yamane |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,201,315 B1 | 3/2001 | Larsson |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,293,575 B1 | 9/2001 | Burrows et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,340,067 B1 | 1/2002 | Fujiwara |
| 6,358,174 B1 | 3/2002 | Folsom et al. |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,035 B2 | 8/2002 | Tsukada et al. |
| 6,440,037 B2 | 8/2002 | Takagi et al. |
| 6,459,978 B2 | 10/2002 | Tamiguchi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,523,223 B2 | 2/2003 | Wang |
| 6,532,890 B2 | 3/2003 | Chen |
| 6,551,210 B2 | 4/2003 | Miller |
| 6,558,285 B1 | 5/2003 | Sieber |
| 6,571,726 B2 | 6/2003 | Tsai et al. |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,000,496 B2 | 2/2006 | Wessel et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,207,918 B2 | 4/2007 | Shimazu |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| D546,741 S | 7/2007 | Iteya et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| D548,655 S | 8/2007 | Barrow et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,384,370 B2 | 6/2008 | Miller |
| 7,393,300 B2 | 7/2008 | Miller et al. |

(56) References Cited

U.S. PATENT DOCUMENTS

| | | |
|---|---|---|
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| D579,833 S | 11/2008 | Acenbrak |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,600,771 B2 | 10/2009 | Miller et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,814,739 B1 | 8/2014 | Hamrin et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,956,262 B2 | 2/2015 | Tomomatsu et al. |
| 8,961,363 B2 | 2/2015 | Shiina et al. |
| 8,992,376 B2 | 3/2015 | Ogawa et al. |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |
| 9,279,482 B2 | 3/2016 | Nichols et al. |
| 9,291,251 B2 | 3/2016 | Lohr et al. |
| 9,328,807 B2 | 5/2016 | Carter et al. |
| 9,341,246 B2 | 5/2016 | Miller et al. |
| 9,360,089 B2 | 6/2016 | Lohr et al. |
| 9,365,203 B2 | 6/2016 | Keilers et al. |
| 9,371,894 B2 | 6/2016 | Carter et al. |
| 9,388,896 B2 | 7/2016 | Hibino et al. |
| 9,506,562 B2 | 11/2016 | Miller et al. |
| 9,528,561 B2 | 12/2016 | Nichols et al. |
| 9,574,642 B2 | 2/2017 | Pohl et al. |
| 9,574,643 B2 | 2/2017 | Pohl |
| 9,611,921 B2 | 4/2017 | Thomassy et al. |
| 9,618,100 B2 | 4/2017 | Lohr |
| 9,656,672 B2 | 5/2017 | Schieffelin |
| 9,676,391 B2 | 6/2017 | Carter et al. |
| 9,677,650 B2 | 6/2017 | Nichols et al. |
| 9,683,638 B2 | 6/2017 | Kostrup |
| 9,683,640 B2 | 6/2017 | Lohr et al. |
| 9,709,138 B2 | 7/2017 | Miller et al. |
| 9,726,282 B2 | 8/2017 | Pohl et al. |
| 9,732,848 B2 | 8/2017 | Miller et al. |
| 9,739,375 B2 | 8/2017 | Vasiliotis et al. |
| 9,850,993 B2 | 12/2017 | Bazyn et al. |
| 9,869,388 B2 | 1/2018 | Pohl et al. |

(56) References Cited

U.S. PATENT DOCUMENTS

| | | |
|---|---|---|
| 9,878,717 B2 | 1/2018 | Keilers et al. |
| 9,878,719 B2 | 1/2018 | Carter et al. |
| 9,903,450 B2 | 2/2018 | Thomassy |
| 9,920,823 B2 * | 3/2018 | Nichols .................. B62M 11/16 |
| 9,963,199 B2 | 5/2018 | Hancock et al. |
| 10,023,266 B2 | 7/2018 | Contello et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0025875 A1 * | 2/2002 | Tsujioka .................. F16H 1/32 475/162 |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0153695 A1 | 10/2002 | Wang |
| 2002/0161503 A1 | 10/2002 | Joe et al. |
| 2002/0169051 A1 | 11/2002 | Oshidari |
| 2002/0179348 A1 | 12/2002 | Tamai et al. |
| 2002/0189524 A1 | 12/2002 | Chen |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0096674 A1 | 5/2003 | Uno |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0176247 A1 | 9/2003 | Gottschalk |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0237698 A1 | 12/2004 | Hilsky et al. |
| 2004/0254047 A1 | 12/2004 | Frank et al. |
| 2005/0037876 A1 | 2/2005 | Unno et al. |
| 2005/0064986 A1 | 3/2005 | Ginglas |
| 2005/0085979 A1 | 4/2005 | Carlson et al. |
| 2005/0172752 A1 | 8/2005 | Florczyk et al. |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0041823 A1 | 2/2007 | Miller |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2007/0232423 A1 | 10/2007 | Katou et al. |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0070729 A1 | 3/2008 | Miller et al. |
| 2008/0073137 A1 | 3/2008 | Miller et al. |
| 2008/0073467 A1 | 3/2008 | Miller et al. |
| 2008/0079236 A1 | 4/2008 | Miller et al. |
| 2008/0081715 A1 | 4/2008 | Miller et al. |
| 2008/0081728 A1 | 4/2008 | Faulring et al. |
| 2008/0085795 A1 | 4/2008 | Miller et al. |
| 2008/0085796 A1 | 4/2008 | Miller et al. |
| 2008/0085797 A1 | 4/2008 | Miller et al. |
| 2008/0085798 A1 | 4/2008 | Miller et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0145573 A1 | 6/2010 | Vasilescu |
| 2010/0181130 A1 | 7/2010 | Chou |
| 2011/0127096 A1 | 6/2011 | Schneidewind |
| 2011/0190093 A1 | 8/2011 | Bishop |
| 2011/0230297 A1 | 9/2011 | Shiina et al. |
| 2011/0237385 A1 | 9/2011 | Andre Parise |
| 2011/0291507 A1 | 12/2011 | Post |
| 2011/0319222 A1 | 12/2011 | Ogawa et al. |
| 2012/0035011 A1 | 2/2012 | Menachem et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2014/0094339 A1 | 4/2014 | Ogawa et al. |
| 2014/0148303 A1 | 5/2014 | Nichols et al. |
| 2014/0274536 A1 | 9/2014 | Versteyhe |
| 2015/0038285 A1 | 2/2015 | Aratsu et al. |
| 2015/0051801 A1 | 2/2015 | Quinn et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2016/0003349 A1 | 1/2016 | Kimura et al. |
| 2016/0031526 A1 | 2/2016 | Watarai |
| 2016/0131231 A1 | 5/2016 | Carter et al. |
| 2016/0201772 A1 | 7/2016 | Lohr et al. |
| 2016/0281825 A1 | 9/2016 | Lohr et al. |
| 2016/0290451 A1 | 10/2016 | Lohr |
| 2016/0298740 A1 | 10/2016 | Carter et al. |
| 2016/0347411 A1 | 12/2016 | Yamamoto et al. |
| 2017/0072782 A1 | 3/2017 | Miller et al. |
| 2017/0082049 A1 | 3/2017 | David et al. |
| 2017/0103053 A1 | 4/2017 | Nichols et al. |
| 2017/0159812 A1 | 6/2017 | Pohl et al. |
| 2017/0163138 A1 | 6/2017 | Pohl |
| 2017/0204948 A1 | 7/2017 | Thomassy et al. |
| 2017/0204969 A1 | 7/2017 | Thomassy et al. |
| 2017/0211698 A1 | 7/2017 | Lohr |
| 2017/0225742 A1 | 8/2017 | Hancock et al. |
| 2017/0268638 A1 | 9/2017 | Nichols et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |
| 2017/0328470 A1 | 11/2017 | Pohl |
| 2017/0335961 A1 | 11/2017 | Hamrin |
| 2018/0066754 A1 | 3/2018 | Miller et al. |

(56) References Cited

U.S. PATENT DOCUMENTS

| | | |
|---|---|---|
| 2018/0106359 A1 | 4/2018 | Bazyn et al. |
| 2018/0134750 A1 | 5/2018 | Pohl et al. |
| 2018/0148055 A1 | 5/2018 | Carter et al. |
| 2018/0148056 A1 | 5/2018 | Keilers et al. |
| 2018/0195586 A1 | 7/2018 | Thomassy et al. |
| 2018/0236867 A1 | 8/2018 | Miller et al. |
| 2018/0251190 A1 | 9/2018 | Hancock et al. |
| 2018/0306283 A1 | 10/2018 | Engesather et al. |
| 2018/0327060 A1 | 11/2018 | Contello et al. |
| 2018/0343105 A1 | 11/2018 | Wang et al. |
| 2018/0347693 A1 | 12/2018 | Thomassy et al. |
| 2018/0372192 A1 | 12/2018 | Lohr |
| 2019/0049004 A1 | 2/2019 | Quinn et al. |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 2320843 Y | 5/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| CN | 101312867 | 11/2008 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 263566 | 1/1989 |
| DE | 19851738 | 5/2000 |
| DE | 10155372 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 251 294 | 10/2002 |
| EP | 1 366 978 | 3/2003 |
| EP | 1 362 783 | 11/2003 |
| EP | 1 433 641 | 6/2004 |
| EP | 1 452 441 | 9/2004 |
| EP | 1 518 785 | 3/2005 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |
| GB | 14132 | 5/1910 |
| GB | 391448 | 4/1933 |
| GB | 592320 | 9/1947 |
| GB | 858710 | 1/1961 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 27-004354 | 10/1952 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 46-029087 B1 | 8/1971 |
| JP | 47-000448 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 48-54371 | 7/1973 |
| JP | 49-012742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 53-50395 U | 4/1978 |
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |

(56) References Cited

FOREIGN PATENT DOCUMENTS

| | | |
|---|---|---|
| JP | 10-115356 | 5/1998 |
| JP | 10-194186 | 7/1998 |
| JP | 10-225053 | 8/1998 |
| JP | 10-511621 | 11/1998 |
| JP | 11-063130 | 3/1999 |
| JP | 11-091411 | 4/1999 |
| JP | 11-210850 | 8/1999 |
| JP | 11-240481 | 9/1999 |
| JP | 11-257479 | 9/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-234999 | 8/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003-194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-232776 | 8/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-14412 | 1/2008 |
| JP | 2008-133896 | 6/2008 |
| JP | 2010-069005 | 4/2010 |
| JP | 2012-107725 | 6/2012 |
| JP | 2012-122568 | 6/2012 |
| JP | 2012-211610 | 11/2012 |
| JP | 2012-225390 | 11/2012 |
| JP | 2015-227690 | 12/2015 |
| JP | 2015-227691 | 12/2015 |
| KR | 2002 0054126 | 7/2002 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 07/044128 | 4/2007 |
| WO | WO 07/133538 | 11/2007 |
| WO | WO 08/078047 | 7/2008 |
| WO | WO 10/073036 | 7/2010 |
| WO | WO 10/135407 | 11/2010 |
| WO | WO 11/064572 | 6/2011 |
| WO | WO 11/101991 | 8/2011 |
| WO | WO 11/121743 | 10/2011 |
| WO | WO 12/030213 | 3/2012 |
| WO | WO 13/042226 | 3/2013 |
| WO | WO 14/186732 | 11/2014 |
| WO | WO 16/062461 | 4/2016 |

OTHER PUBLICATIONS

Office Action dated Jun. 13, 2013 in U.S. Appl. No. 13/717,197.
Office Action dated Jun. 30, 2015 in U.S. Appl. No. 14/195,483.
Office Action dated Oct. 11, 2016 in Canadian Patent Application No. 2,756,273.
Office Action dated Sep. 3, 3013 in Chinese Patent Application No. 201080016567.8.
Office Action dated Feb. 28, 2014 in Chinese Patent Application No. 201080016567.8.
Third Office Action dated Aug. 13, 2014 in Chinese Patent Application No. 201080016567.8.
Office Action dated Sep. 11, 2012 for European Patent Application No. 10715051.8.
Extended European Search Report dated Sep. 26, 2013 in European Patent Application No. 13182164.7.
Notification of Reasons for Refusal dated Jan. 28, 2014 in Japanese Patent Application No. 2012-506182.
Decision to Grant a Patent dated Oct. 14, 2014 in Japanese Patent Application No. 2012-506182.
Office Action dated Oct. 27, 2015 in Japanese Patent Application No. 2014-228023.
Notification of Reasons for Rejection dated Jul. 4, 2017 in Japanese Patent Application No. 2016-151126.
Non Final Notification to Submit an Argument dated Jul. 8, 2016 in Korean Patent Application No. 10-2011-7025770.
Preliminary Notice of First Office Action dated Dec. 15, 2014 in Taiwanese Patent Application No. 99111952.
International Search Report and Written Opinion dated Aug. 20, 2010 for PCT Application No. PCT/US2010/031100.
Goi et al., Development of Traction Drive IDG (T-IDG), Proceedings of International Congress on Continuously Variable and Hybrid Transmissions, Sep. 2007, 6 pages.
Pohl, Brad, CVT Split Power Transmissions, A Configuration versus Performance Study with an Emphasis on the Hydromechanical Type, Society of Automotive Engineers, Mar. 4, 2002, 11 pages.
Pohl, et al., Configuration Analysis of a Spherical Traction Drive CVT/IVT, SAE International, 2004 International Continuously Variable and Hybrid Transmission Congress, Sep. 23, 2004, 6 pages.
Smithson et al., Scalability for an Alternative Rolling Traction CVT, Society of Automotive Engineers, Mar. 8, 2004, 6 pages.
Office Action dated Jun. 14, 2018 in Canadian Patent Application No. 2,964,358.
First Examination Report dated Apr. 11, 2018 in Indian Patent Application No. 3993/KOLNP/2011.
Non Final Notification to Submit an Argument dated Mar. 16, 2018 in Korean Patent Application No. 10-2018-7000675.

(56) References Cited

OTHER PUBLICATIONS

Non Final Notification to Submit an Argument dated Nov. 21, 2018 in Korean Patent Application No. 10-2018-7029945.

\* cited by examiner

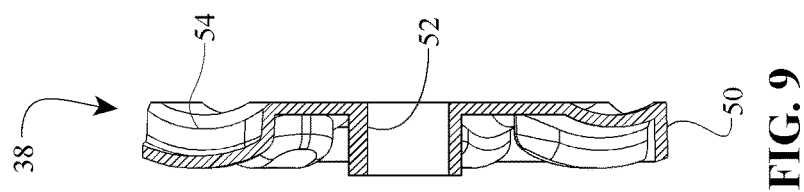
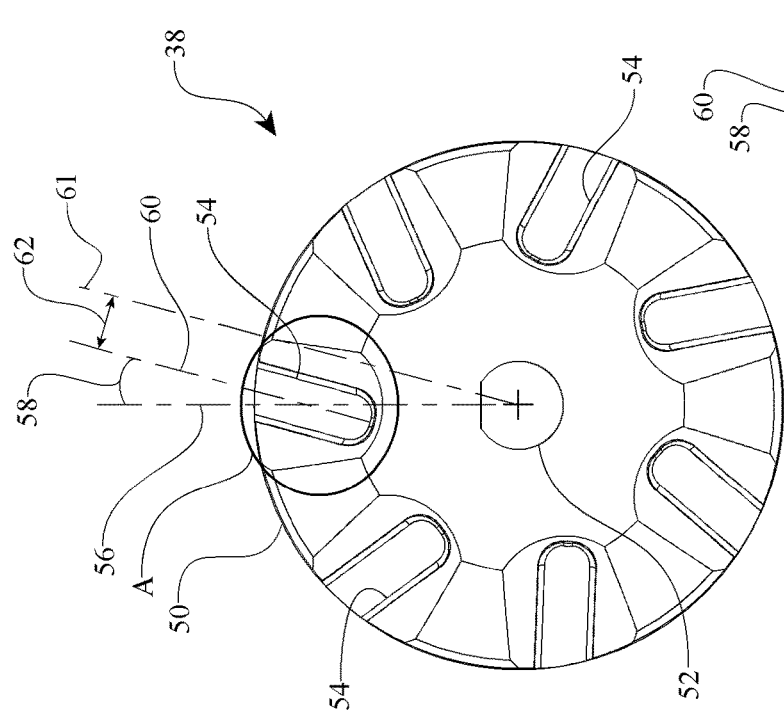
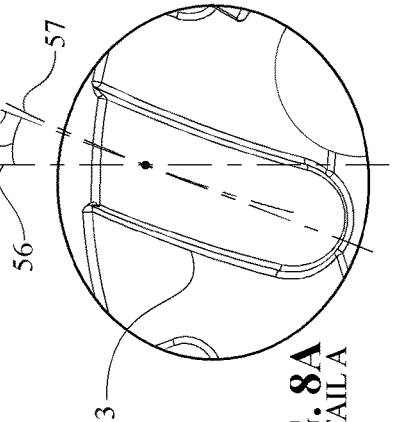
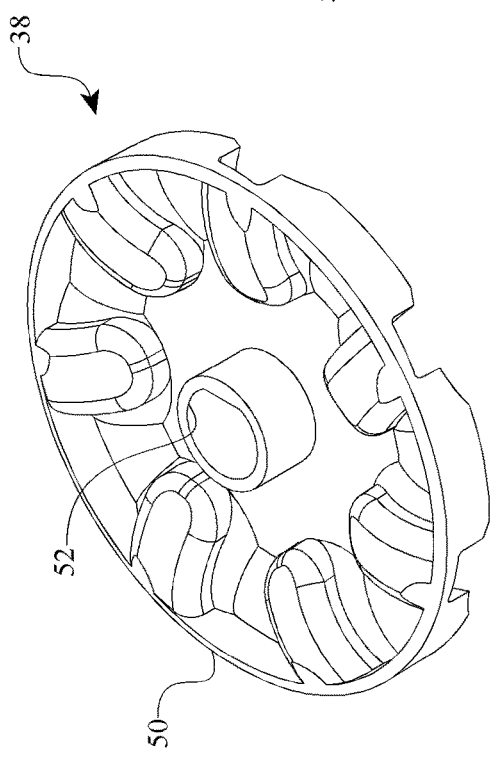
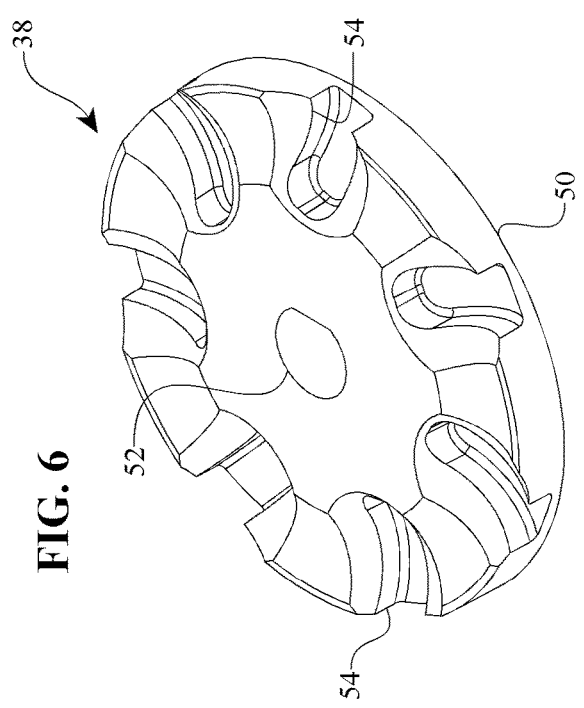
FIG. 9
FIG. 8
FIG. 8A
DETAIL A
FIG. 6
FIG. 7

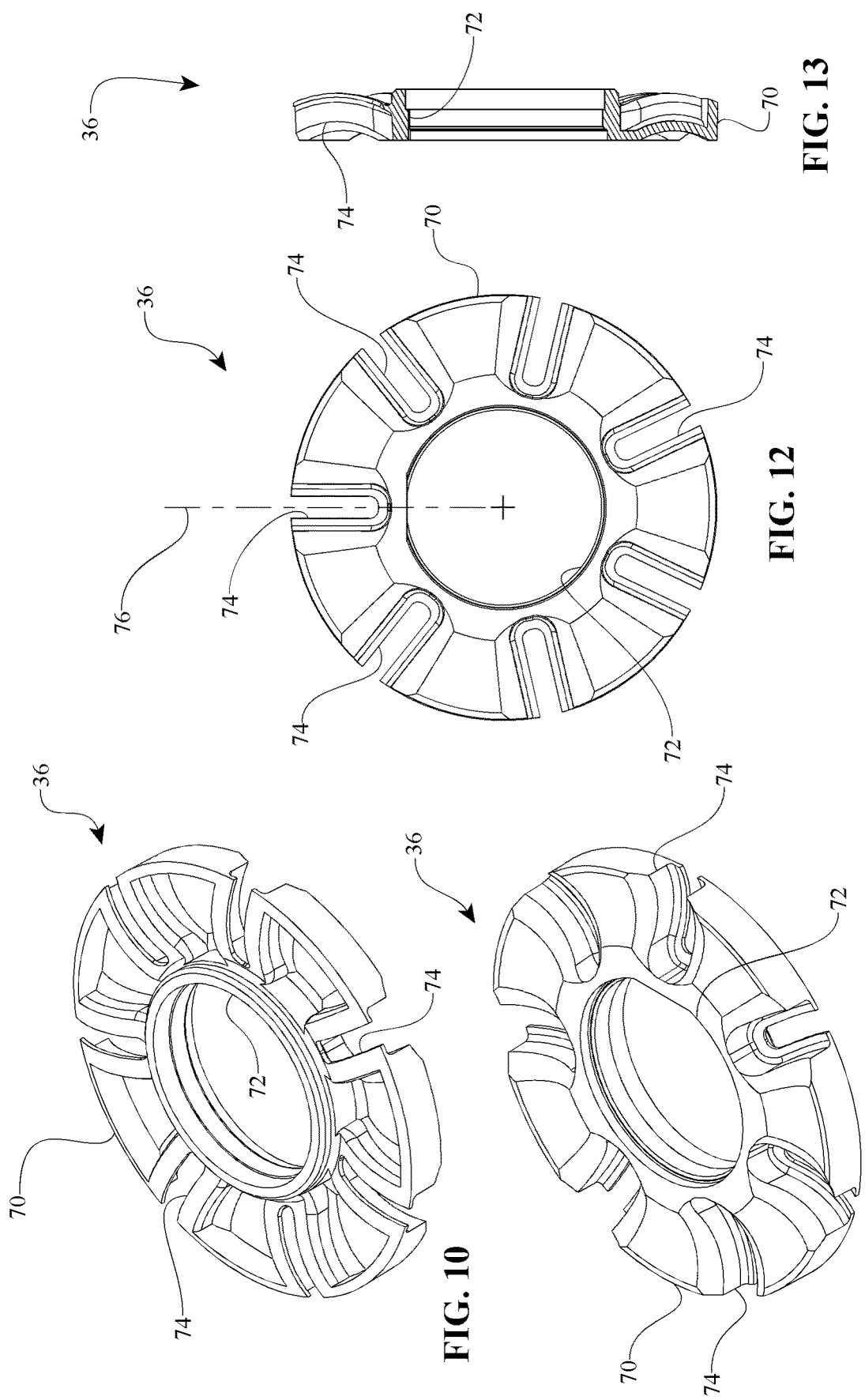

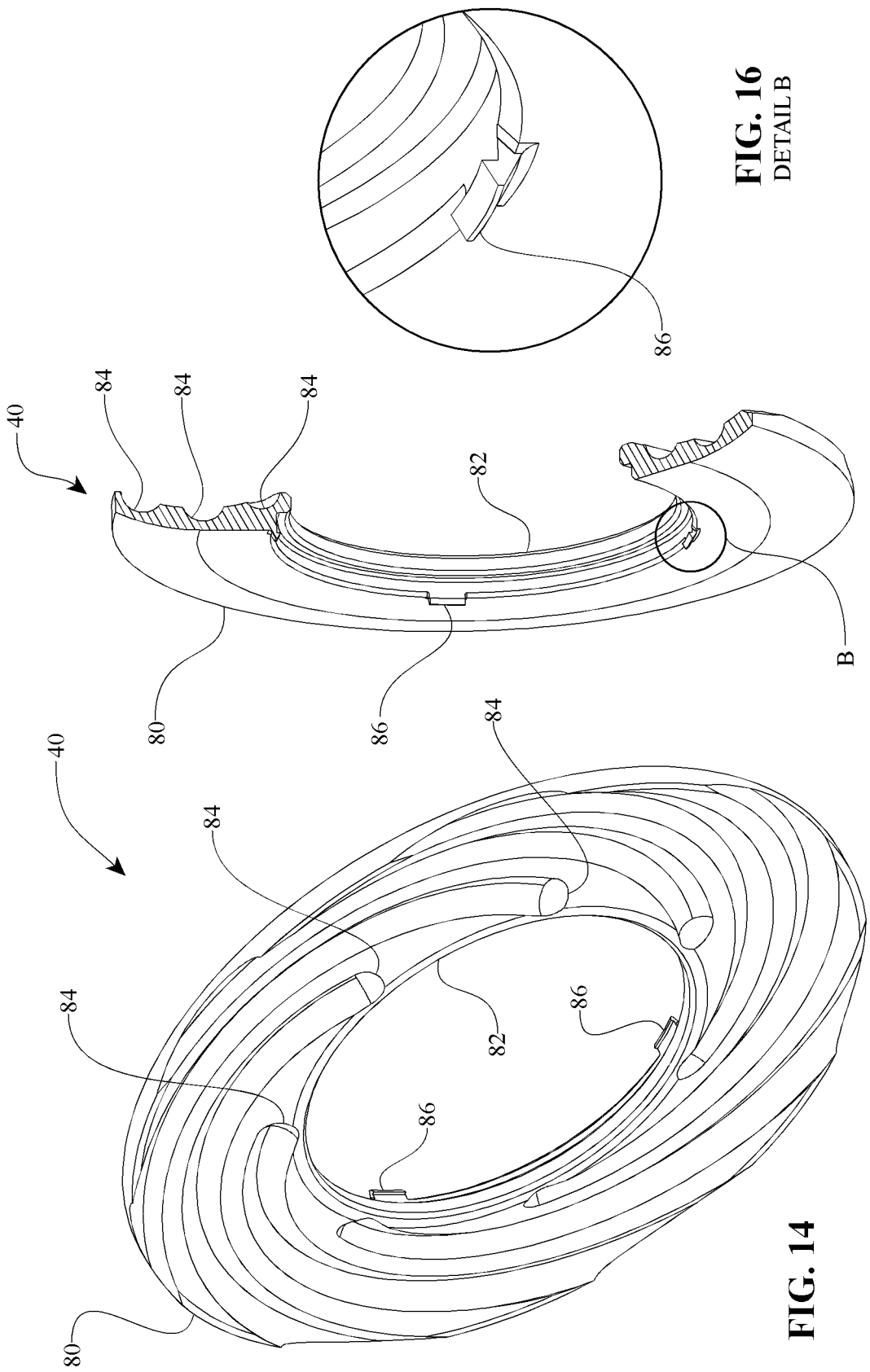

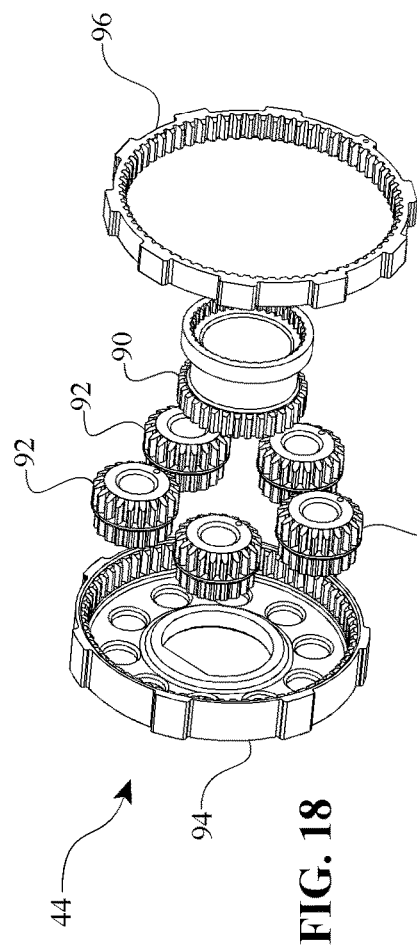
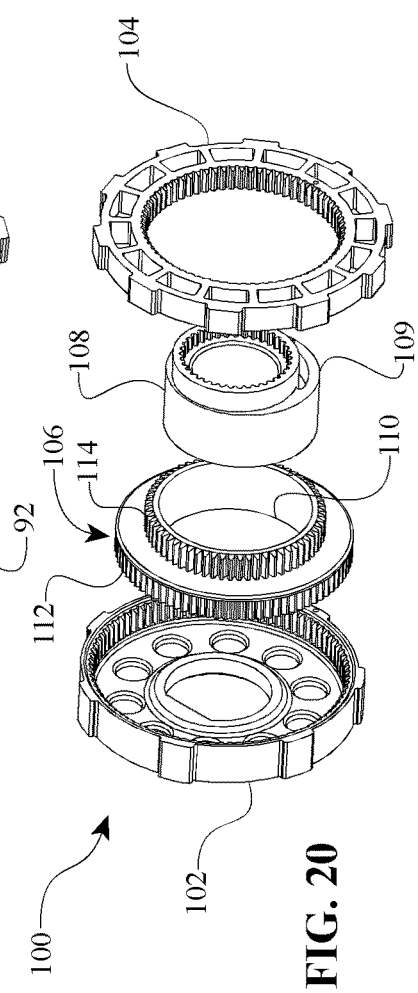
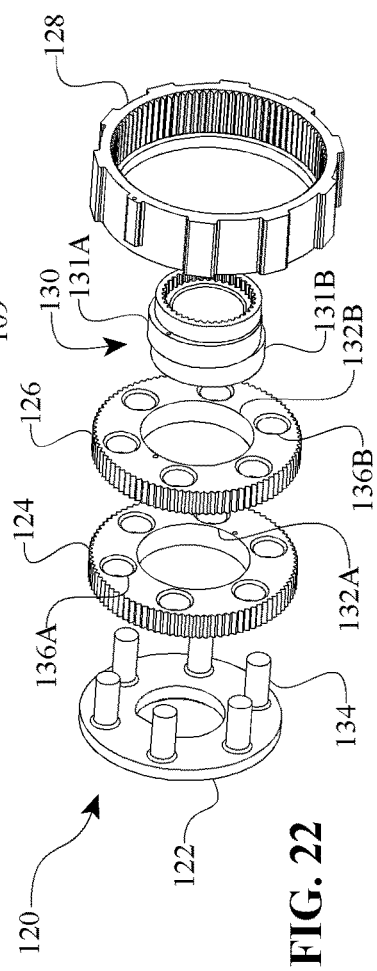
FIG. 18
FIG. 20
FIG. 22
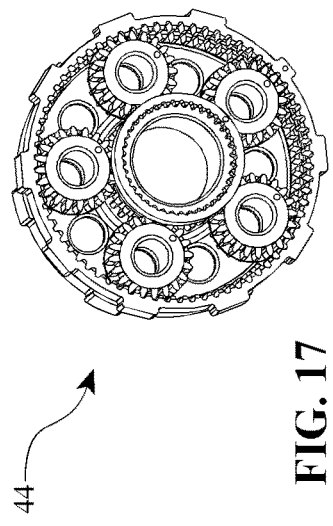
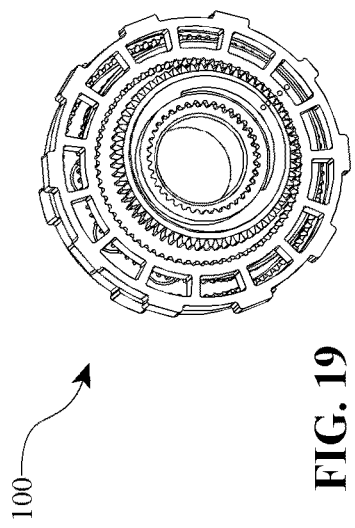
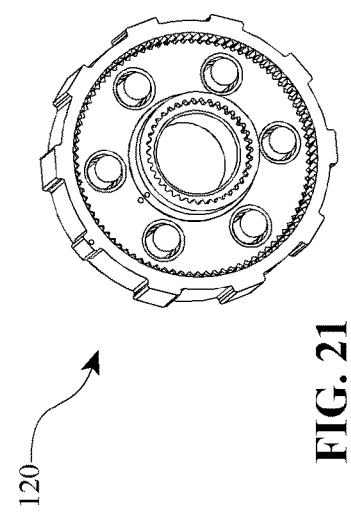
FIG. 17
FIG. 19
FIG. 21

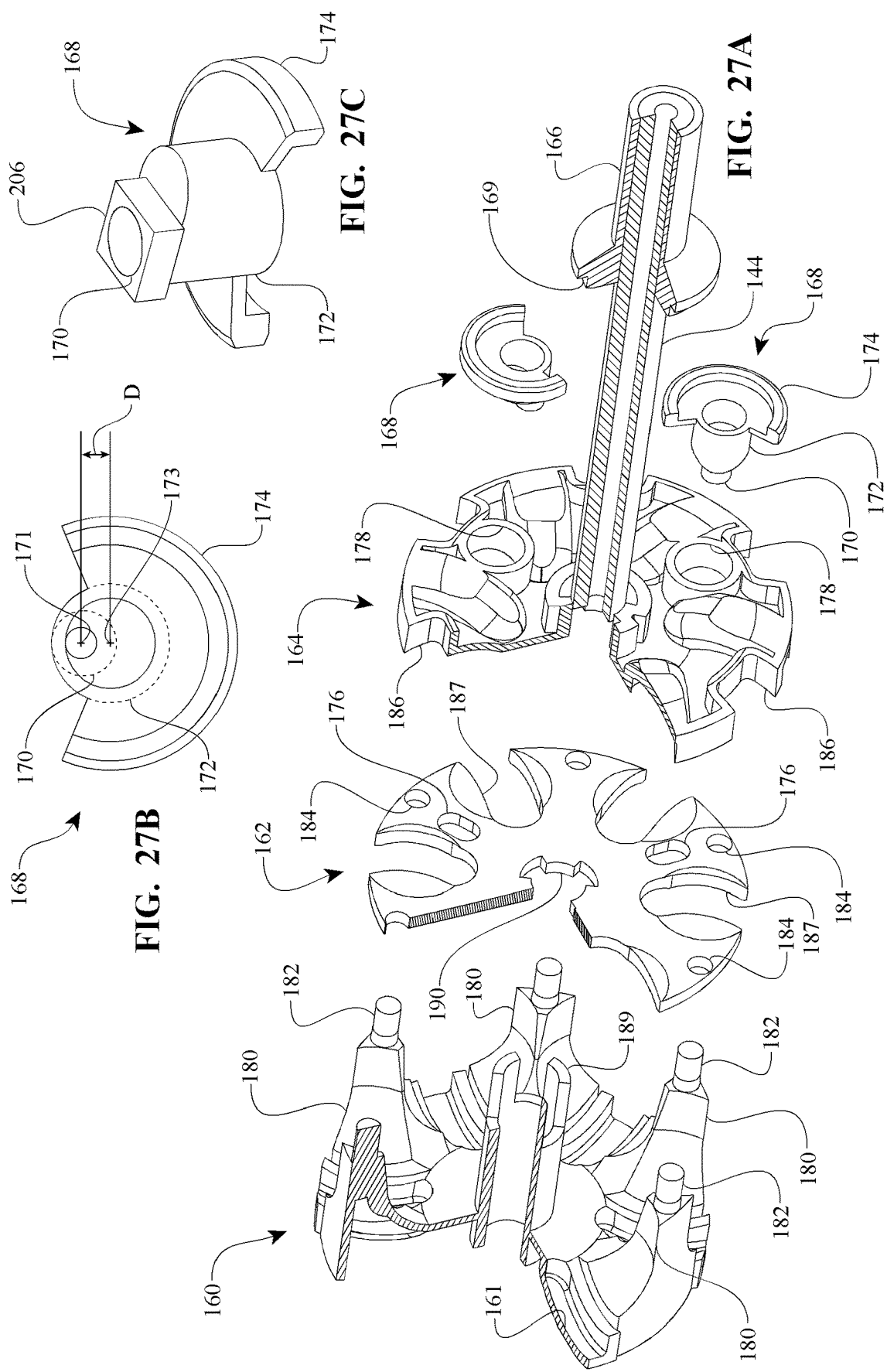

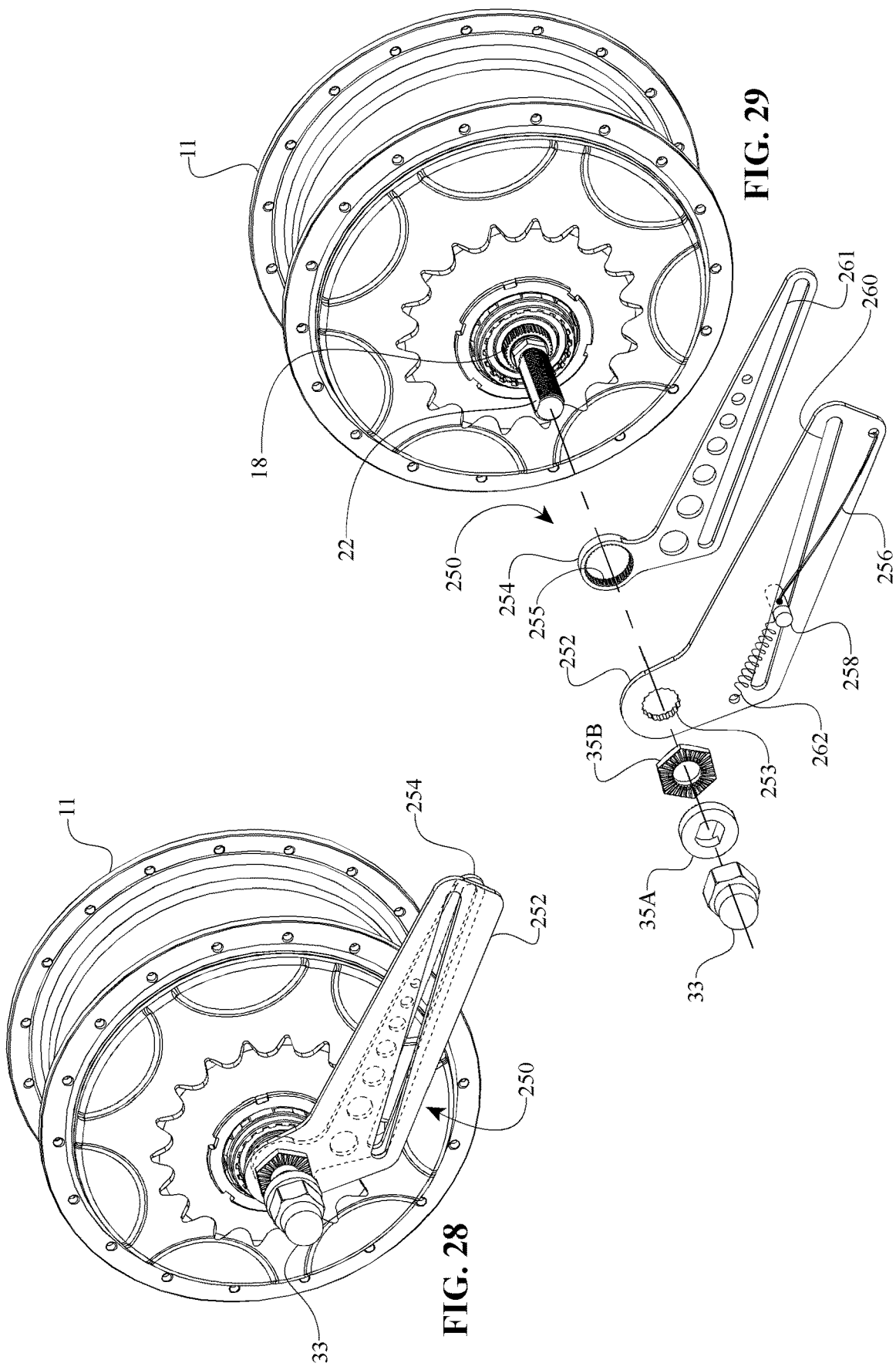

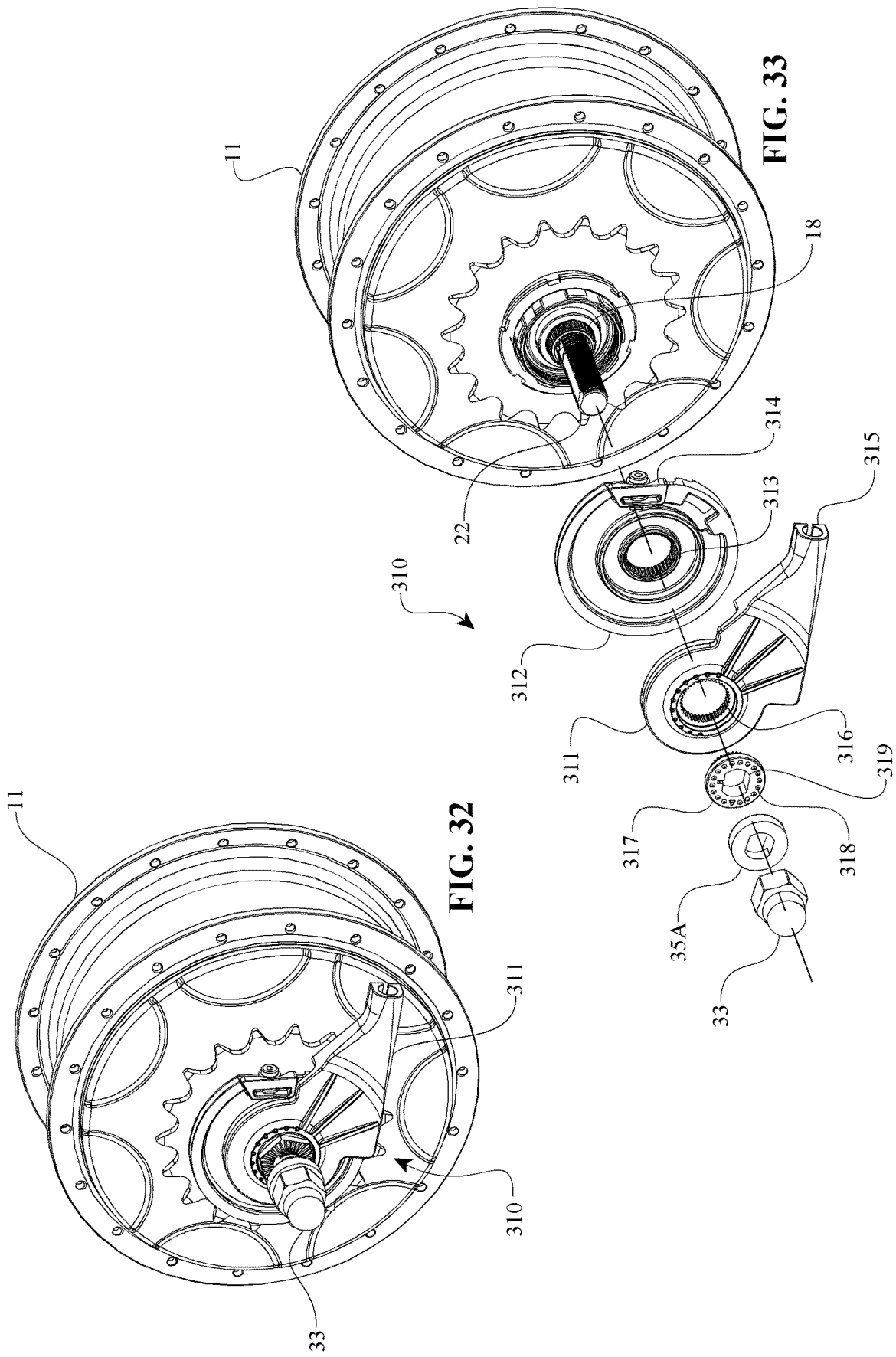

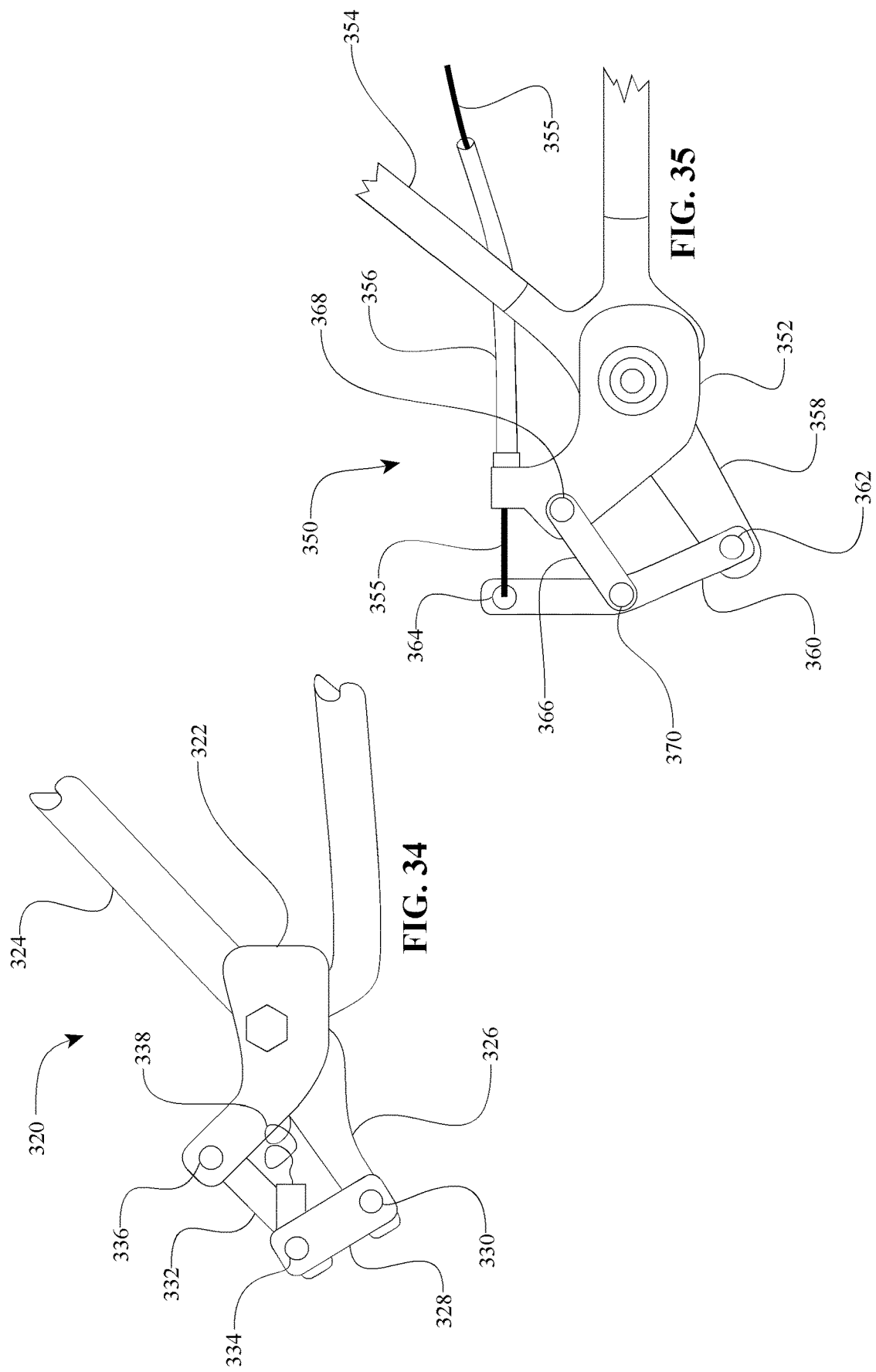

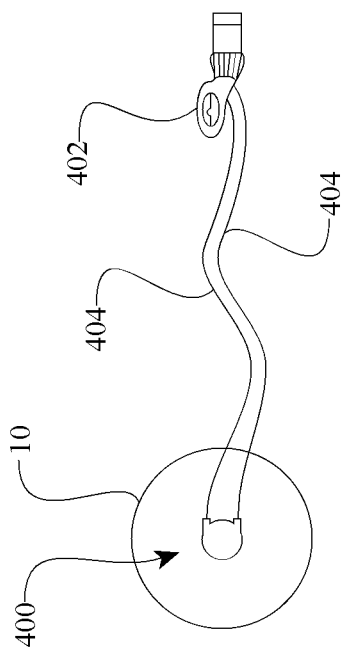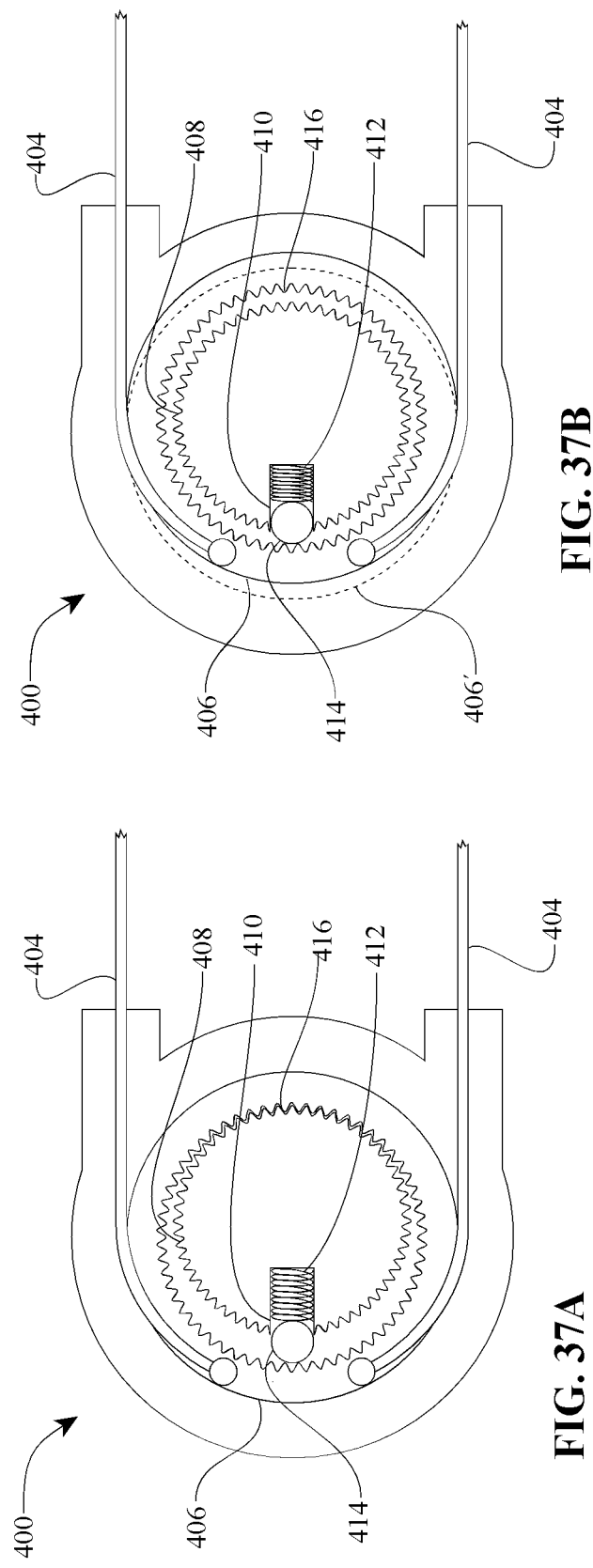
FIG. 36
FIG. 37A
FIG. 37B

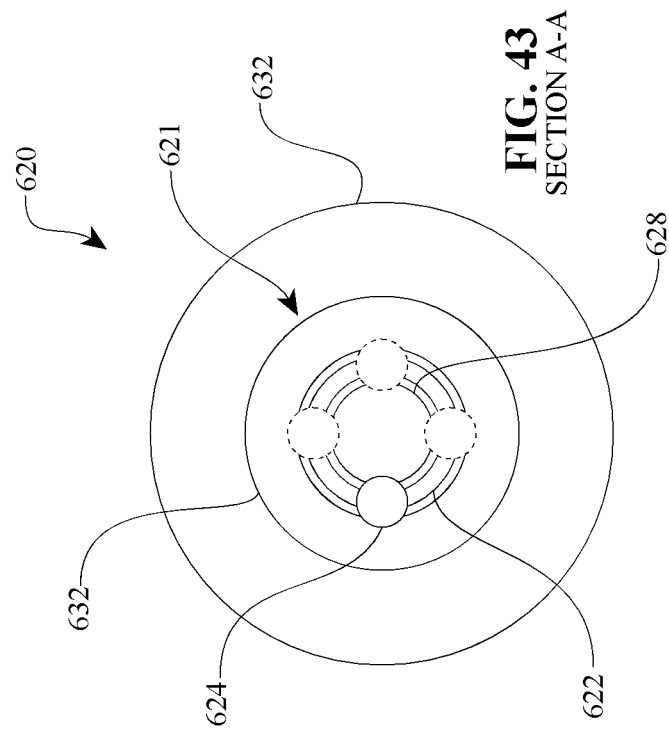
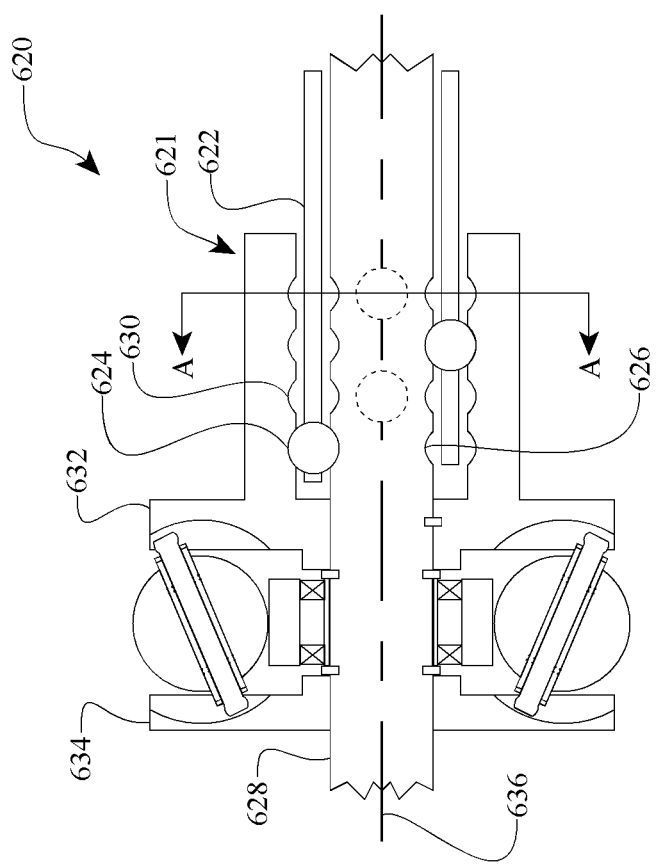
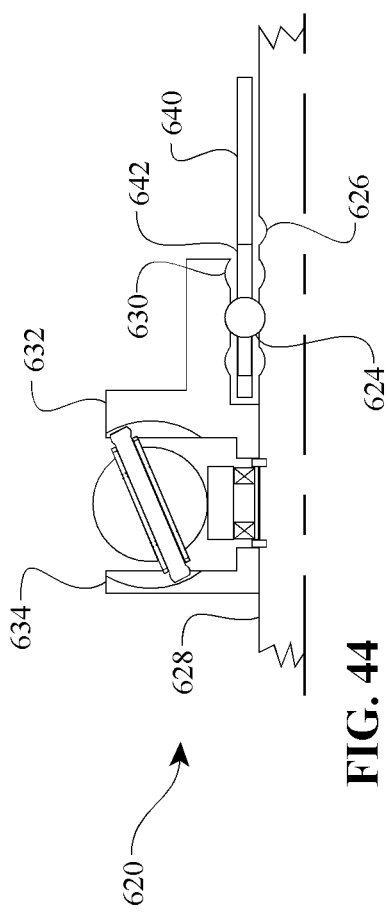
FIG. 43 SECTION A-A
FIG. 42
FIG. 44

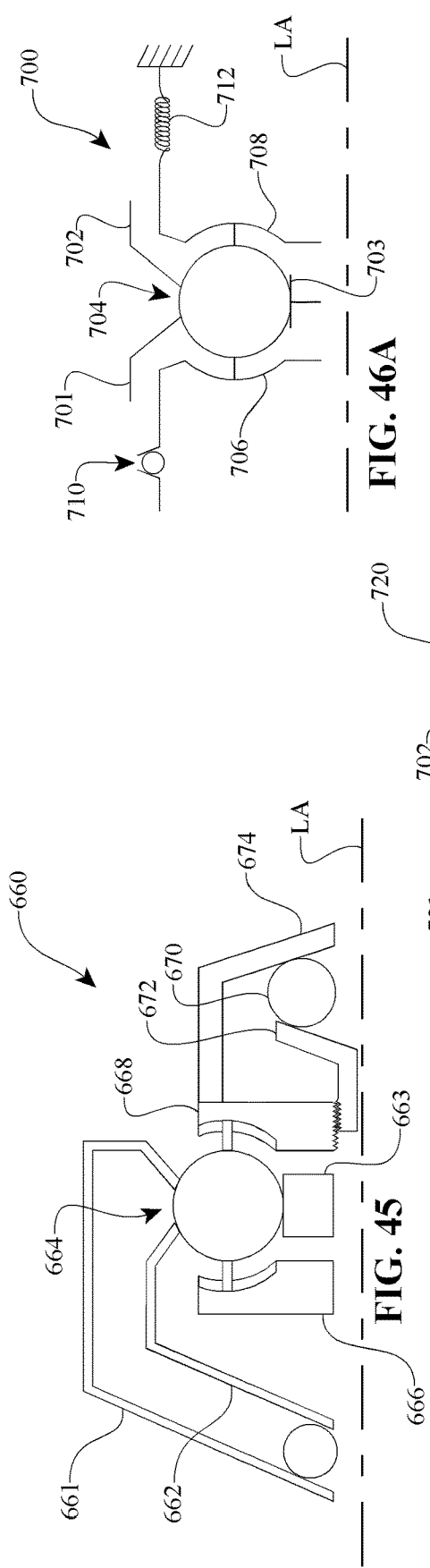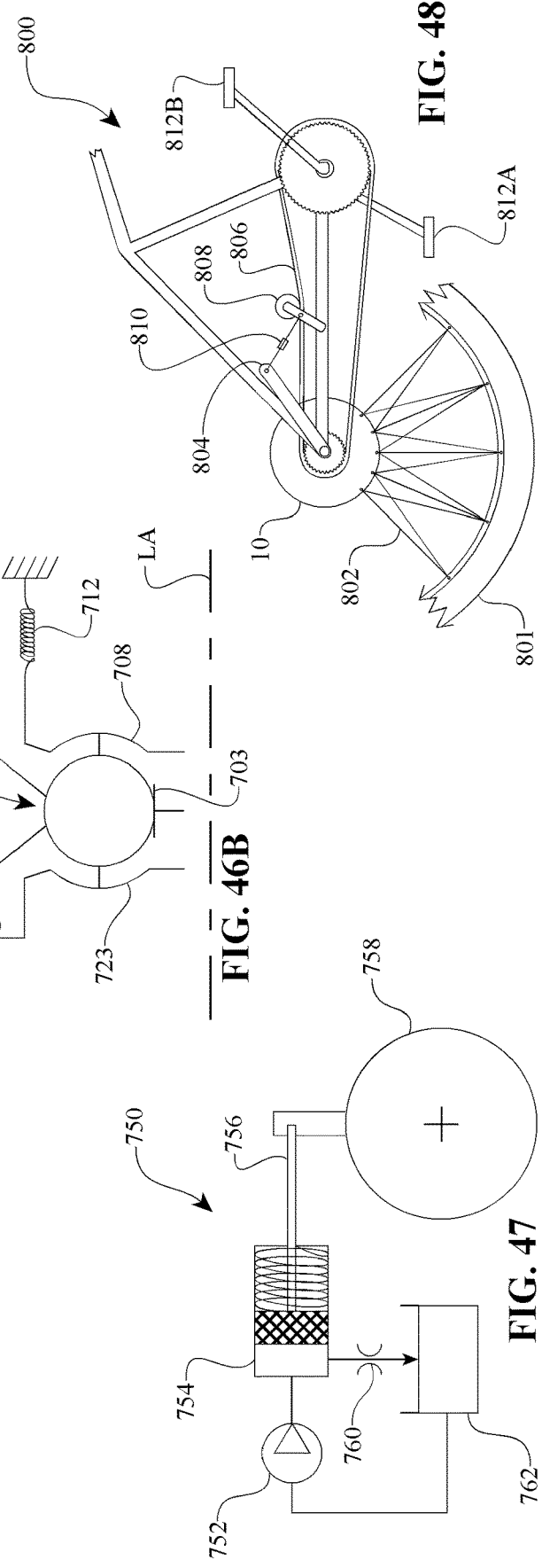

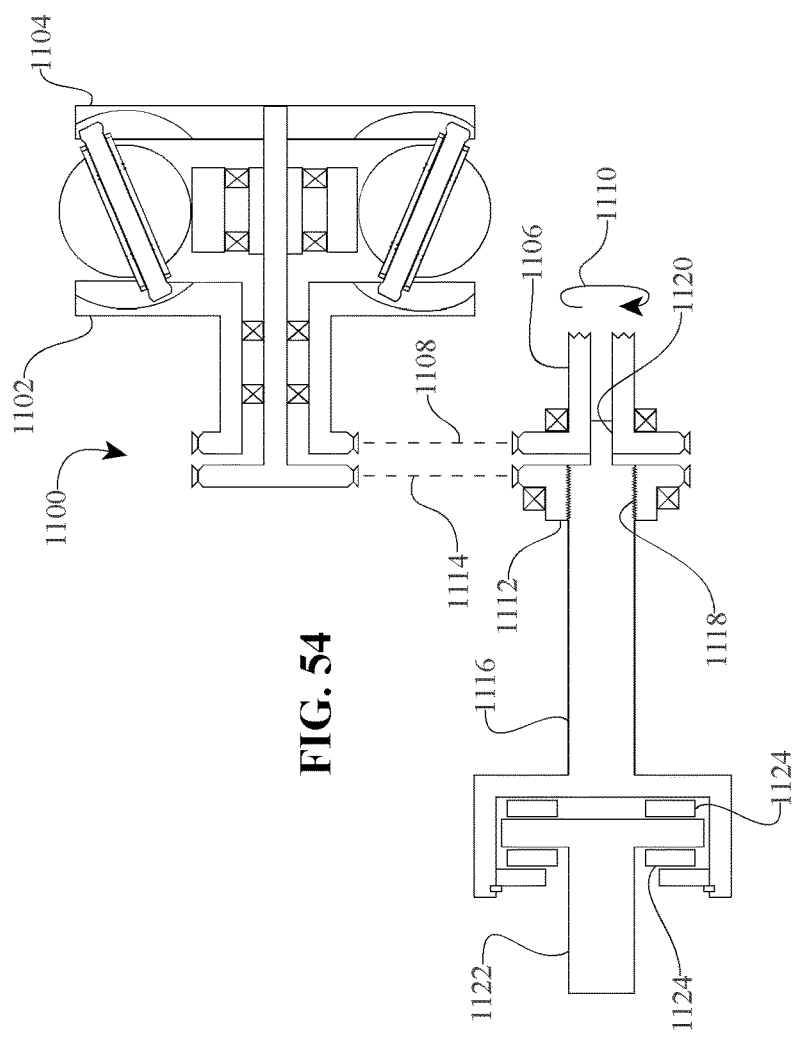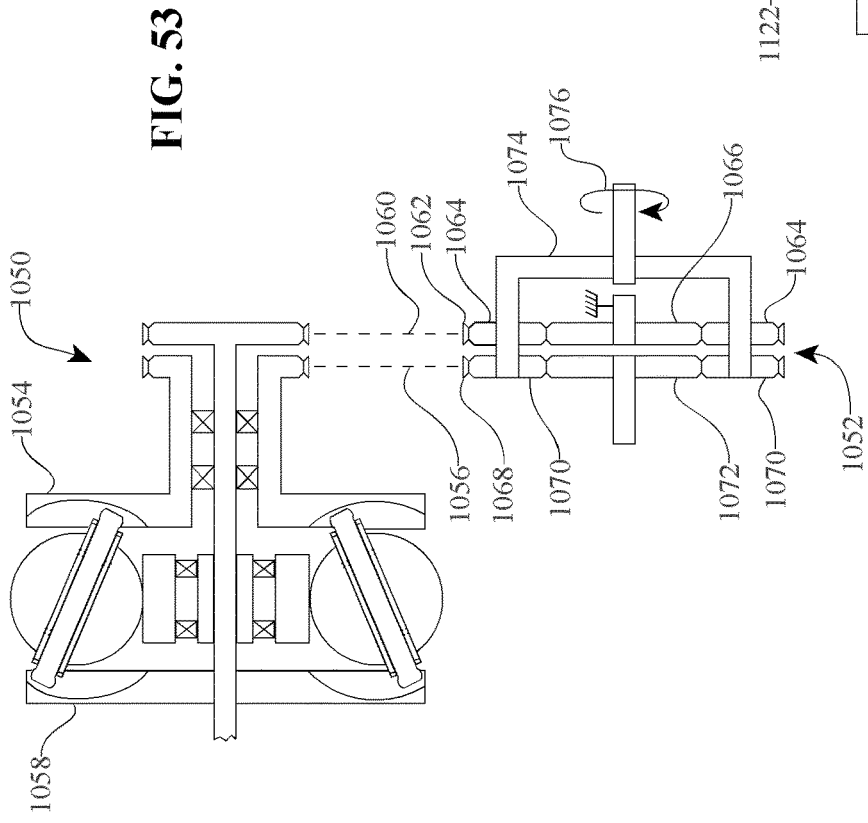
FIG. 53
FIG. 54

SECTION B-B

DETAIL C

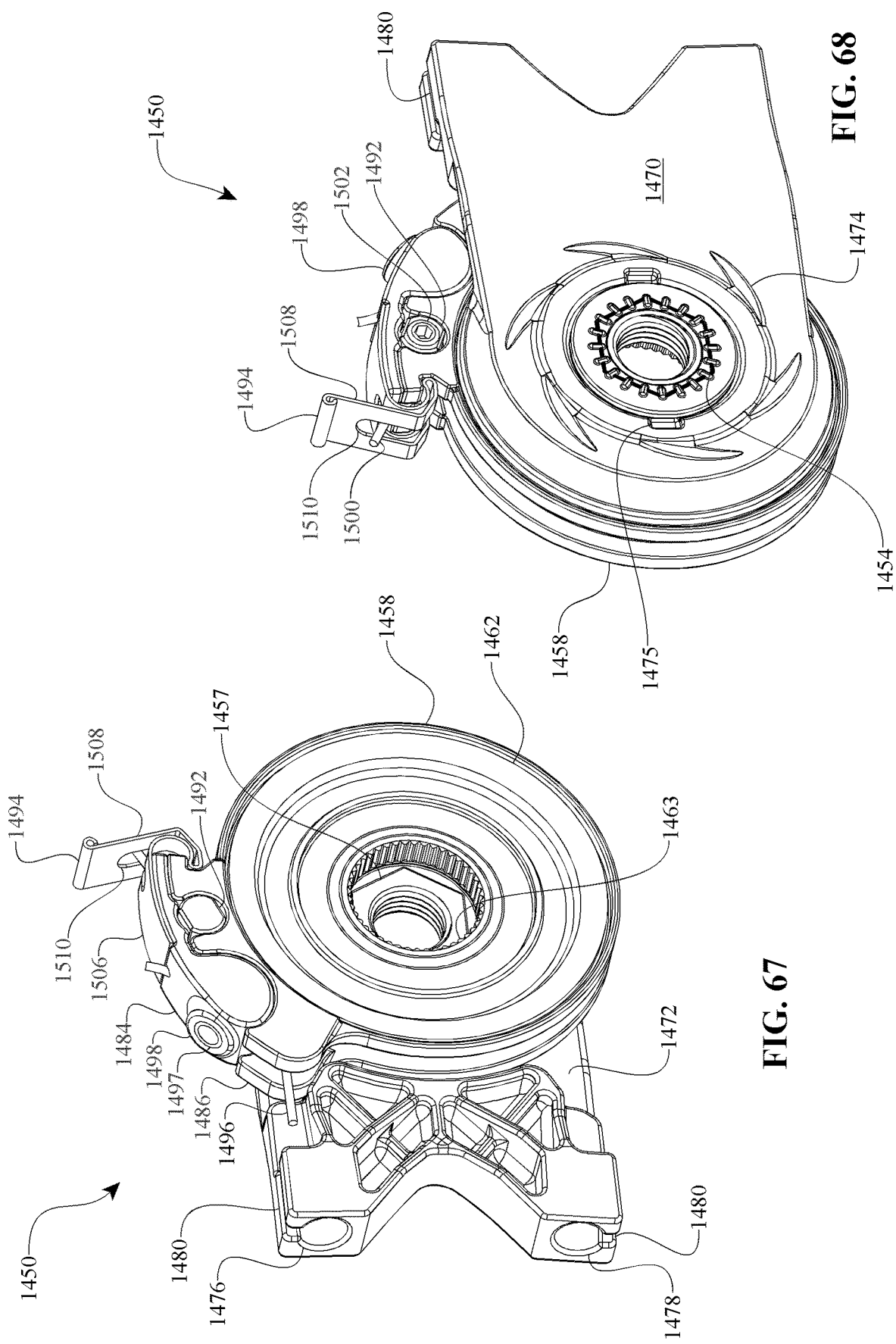

CONTINUOUSLY VARIABLE TRANSMISSION

CROSS-REFERENCE TO RELATED APPLICATIONS

This application is a continuation of U.S. patent application Ser. No. 15/062,461, filed Mar. 7, 2016 and scheduled to issue as U.S. Pat. No. 9,920,823 on Mar. 20, 2018, which is a continuation of U.S. patent application Ser. No. 14/195, 483, filed Mar. 3, 2014 and issued as U.S. Pat. No. 9,279,482 on Mar. 8, 2016, which is a continuation of U.S. patent application Ser. No. 13/717,197, filed Dec. 17, 2012 and issued as U.S. Pat. No. 8,663,050 on Mar. 4, 2014, which is a continuation of U.S. patent application Ser. No. 12/760, 823, filed Apr. 15, 2010 and issued as U.S. Pat. No. 8,360,917 on Jan. 29, 2013, which claims the benefit of U.S. Provisional Application 61/170,073, filed on Apr. 16, 2009, U.S. Provisional Application 61/234,905, filed on Aug. 18, 2009, and U.S. Provisional Application 61/239,377, filed on Sep. 2, 2009. The disclosures of U.S. patent application Ser. No. 12/760,823, U.S. patent application Ser. No. 13/717, 197, U.S. patent application Ser. No. 14/195,483, and U.S. patent application Ser. No. 15/062,461 are hereby incorporated by reference in their entirety.

BACKGROUND OF THE INVENTION

Field of the Invention

The field of the invention relates generally to transmissions, and more particularly to methods, assemblies, and components for continuously variable transmissions (CVTs).

Description of the Related Art

There are well-known ways to achieve continuously variable ratios of input speed to output speed. Typically, a mechanism for adjusting the speed ratio of an output speed to an input speed in a CVT is known as a variator. In a belt-type CVT, the variator consists of two adjustable pulleys coupled by a belt. The variator in a single cavity toroidal-type CVT usually has two partially toroidal transmission discs rotating about a shaft and two or more disc-shaped power rollers rotating on respective axes that are perpendicular to the shaft and clamped between the input and output transmission discs. Usually, a control system is used for the variator so that the desired speed ratio can be achieved in operation.

Embodiments of the variator disclosed here are of the spherical-type variator utilizing spherical speed adjusters (also known as power adjusters, balls, planets, sphere gears, or rollers) that each has a tiltable axis of rotation adapted to be adjusted to achieve a desired ratio of output speed to input speed during operation. The speed adjusters are angularly distributed in a plane perpendicular to a longitudinal axis of a CVT. The speed adjusters are contacted on one side by an input disc and on the other side by an output disc, one or both of which apply a clamping contact force to the rollers for transmission of torque. The input disc applies input torque at an input rotational speed to the speed adjusters. As the speed adjusters rotate about their own axes, the speed adjusters transmit the torque to the output disc. The output speed to input speed ratio is a function of the radii of the contact points of the input and output discs to the axes of the speed adjusters. Tilting the axes of the speed adjusters with respect to the axis of the variator adjusts the speed ratio.

There is a continuing need in the industry for variators and control systems therefor that provide improved performance and operational control. Embodiments of the systems and methods disclosed here address said need.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention concerns a stator assembly for a continuously variable transmission (CVT) having a number of traction planet assemblies arranged about a longitudinal axis of the CVT. In one embodiment, the CVT includes a first stator coupled to the traction planet assemblies. The first stator has a number of radial guide slots. The CVT includes a second stator coupled to the traction planet assemblies. The second stator has a number of radially offset guide slots configured to guide the traction planet assemblies. In one embodiment, the CVT includes a reaction plate coupled to the traction planet assemblies. The CVT can be provided with a number of eccentric gears coupled to the first stator. The CVT includes a stator driver coupled to the eccentric gears. The second stator is adapted to rotate with respect to the first stator.

One aspect of the invention relates to a continuously variable transmission (CVT) having a number of traction planets arranged angularly about a longitudinal axis of the CVT. In one embodiment, the CVT has a first stator coupled to the each of the traction planet assemblies. The first stator has a number of radially off-set slots. The first stator is configured to guide the traction planet assemblies. The CVT also includes a stator driver assembly coupled to the first stator. The stator driver assembly is coaxial to the first stator.

Another aspect of the invention concerns a stator driver assembly for a continuously variable transmission (CVT) having a group of traction planet assemblies. The stator driver assembly includes a shift tube and a gear set coupled to the shift tube. In one embodiment, the stator driver assembly includes a stator coupled to the gear set. The stator has a number of radially off-set guide slots adapted to couple to the traction planet assemblies. In one embodiment, a rotation of the shift tube corresponds to a rotation of the stator.

Another aspect of the invention concerns a stator assembly for a continuously variable transmission (CVT) having a number of traction planet assemblies. In one embodiment, the stator assembly includes a first stator having a number of radial slots. The stator assembly includes a second stator coaxial with the first stator. The first and second stators are configured to rotate relative to each other. The second stator has a number of radially off-set guide slots. In one embodiment, the stator assembly includes a reaction member that is coaxial with the first and second stators. The stator assembly includes a number of eccentric gears coupled to the reaction member and the first stator. The stator assembly also includes a stator driver coupled to each of the eccentric gears.

Another aspect of the invention relates to a shifting mechanism for a continuously variable transmission (CVT) provided with a number of traction planet assemblies. In one embodiment, the shifting mechanism includes a shift tube aligned with a longitudinal axis of the CVT. The shifting mechanism can be provided with a shift arm operably coupled to the shift tube. The shift arm has a first guide slot. The shifting mechanism includes a reaction arm coupled to a main shaft of the CVT. The reaction arm has a second guide slot. In one embodiment, the shifting mechanism includes a cable coupled to the shift arm and the reaction arm. The cable has a cable end configured to be received in the first and second guide slots. The shift arm is adapted to rotate with respect to the reaction arm.

Another aspect of the invention concerns a shifting mechanism for a continuously variable transmission (CVT) having a skew-based control system. The shifting mechanism includes a shift arm operably coupled to the skew-based control system. In one embodiment, the shifting mechanism includes a transfer gear coupled to the shift arm. The transfer gear has an eccentric guide bore configured to engage the shift arm. The shifting mechanism includes an input gear coupled to the transfer gear. The input gear is configured to rotate the transfer gear. The input gear and the transfer gear are attached to a rigid member.

Another aspect of the invention relates to a shifting mechanism for a continuously variable transmission (CVT) having a stator driver. In one embodiment, the shifting mechanism includes a pulley operably coupled to the stator driver. The pulley has a splined bore. The pulley has a cable-end attachment interface. The shifting mechanism includes a reaction arm operably coupled to a main shaft of the CVT. The reaction arm is configured to receive a cable. The reaction arm is configured to operably couple to the pulley.

Yet one more aspect of the invention addresses a shifting mechanism for a continuously variable transmission (CVT) having a skew-based control system. The shifting mechanism includes a reaction arm coupled to a main shaft of the CVT. In one embodiment, the shifting mechanism includes a shift arm operably coupled to the skew-based control system. The shift arm is configured to rotate with respect to the reaction arm. The shifting mechanism has a first lever coupled to the shift arm. The shifting mechanism has a cable coupled to the first lever. The shifting mechanism also has a linkage coupled to the first lever.

In another aspect, the invention concerns a shifting mechanism for a continuously variable transmission (CVT) having a group of traction planet assemblies. In one embodiment, the shifting mechanism includes at least one cable. The shifting mechanism has a pulley operably coupled to the cable. The pulley is adapted to translate and rotate. In one embodiment, the shifting mechanism includes a reaction member operably coupled to the pulley. The reaction member has a pocket configured to receive a spring. The shifting mechanism includes a roller coupled to the pulley. The roller is adapted to contact the spring.

One aspect of the invention relates to a continuously variable transmission (CVT) having a group of traction planet assemblies arranged about a longitudinal axis of the CVT. The CVT has a first stator coupled to the traction planet assemblies. The first stator has a group of radially off-set guide slots. The guide slots are adapted to couple to the traction planet assemblies. In one embodiment, the CVT includes a second stator coupled to the traction planet assemblies. The second stator is coaxial with the first stator. The CVT has a reaction member coupled to the first and second stators. The CVT also has a guide member operably coupled to the second stator. The guide member is configured to rotate the second stator with respect to the first stator.

Another aspect of the invention relates to a shifting mechanism for a continuously variable transmission (CVT) having a group of traction planet assemblies. In one embodiment, the shifting mechanism includes a stator having radially off-set guide slots. The shifting mechanism can have a spring coupled to the stator. In one embodiment, the shifting mechanism has a reaction arm coupled to the spring. The shifting mechanism has a shift tube coupled to the stator and a push link coupled to the shift tube. In one embodiment, the shifting mechanism has first and second linkages coupled to the push link. The first linkage is coupled to the stator. The second linkage is coupled to the reaction arm.

Yet one more aspect of the invention addresses a shifting mechanism for a continuously variable transmission (CVT) having a group of traction planet assemblies. In one embodiment, the shifting mechanism has a stator having radially off-set guide slots. The shifting mechanism can include a pin coupled to the stator. In one embodiment, the shifting mechanism includes a driven gear coupled to the stator. The driven gear has a slot configured to receive the pin. The shifting mechanism can also include a driver coupled to the driven gear. The driver is configured to rotate the driven gear to facilitate a rotation of the stator.

One aspect of the invention concerns a shifting mechanism for a continuously variable transmission (CVT). In one embodiment, the shifting mechanism includes a main shaft provided with a first set of helical grooves formed about an outer circumference. The shifting mechanism includes a stator having a second set of helical grooves formed on an inner circumference. The stator has a number of radially off-set slots. In one embodiment, the shifting mechanism includes a shift tube coaxial with the stator. The shifting mechanism can also include a number of rollers coupled to the shift tube. The rollers are configured to contact the first and second helical grooves.

One aspect of the invention relates to a continuously variable transmission (CVT) having a group of traction planet assemblies. In one embodiment, the CVT is provided with a first stator having a number of radially offset slots. The CVT has a second stator having a number of radial slots. The CVT includes a shift tube coaxial with the first and second stators. The CVT also includes a number of rollers coupled to the shift tube.

Another aspect of the invention concerns a continuously variable transmission (CVT) having a number of traction planet assemblies. In one embodiment, the CVT includes a first stator coupled to the traction planet assemblies. The CVT has a second stator coupled to the traction planet assemblies. The second stator is coaxial with the first stator. The second stator is configured to rotate with respect to the first stator. The CVT is also provided with a fly-ball governor coupled to the first stator.

Yet another aspect of the invention involves a control system for continuously variable transmission (CVT) having a group of traction planet assemblies coupled to a stator. In one embodiment, the control system includes a hydraulic control valve supplied with a pressurized fluid. The hydraulic control valve is adapted to couple to the stator. The control system can have an orifice in fluid communication with the hydraulic control valve. A change in the pressurized fluid corresponds to a change in the rotational position of the stator.

One aspect of the invention concerns a continuously variable transmission (CVT) having a number of traction planet assemblies. In one embodiment, the CVT has a first stator coupled to the traction planet assemblies. The CVT includes a second stator coupled to the traction planet assemblies. The second stator is coaxial with the first stator. The second stator is configured to rotate with respect to the first stator. The second stator has a number of radially off-set guide slots. The first and second stators are adapted to receive a rotational power. The CVT also includes a planetary gear set coupled to the first stator. The planetary gear set is configured to facilitate a relative rotation between the first and second stators.

In another aspect, the invention concerns a shifting mechanism for a continuously variable transmission (CVT) having a number of traction planet assemblies coupled to first and second stators. The shifting mechanism includes a stator driver operably coupled to the first stator. In one embodiment, the shifting mechanism includes a pulley having a splined inner bore. The shifting mechanism has a number of planet gears coupled to the inner bore of the pulley. The shifting mechanism also has a reaction arm operably coupled to a main shaft of the CVT. In one embodiment, the shifting mechanism has a sun gear coupled to the reaction arm. The sun gear is coupled to each planet gear. The shifting mechanism can have a cage coupled to the planet gears. The cage has a splined inner bore coupled to the stator driver. The pulley is adapted to receive first and second control cables.

Another aspect of the invention relates to a stator for a continuously variable transmission (CVT) having a number of traction planet assemblies. In one embodiment, the stator includes a disc-shaped body having a central bore. The stator has a number of guide slots formed on a first side of the disc-shaped body. The guide slots are arranged angularly about the central bore. Each guide slot is radially offset with respect to the center of the disc-shaped body.

One more aspect of the invention relates to a planocentric gear set having a fixed ring arranged along a longitudinal axis. In one embodiment, the planocentric gear set has an output ring coaxial with the fixed ring. The gear set includes an orbital planet gear having a first gear ring and a second gear ring. The first gear ring has a larger diameter than the second gear ring. The orbital planet gear has a central bore. The gear set also includes an eccentric driver coaxial with the fixed ring and the output ring. The eccentric driver has an eccentric lobe surface adapted to couple to the inner bore of the orbital planet gear.

BRIEF DESCRIPTION OF THE FIGURES

FIG. 6 is a perspective view of a first stator that can be used with the CVT of FIG. 1.

FIG. 7 is another perspective view of the first stator of FIG. 6.

FIG. 8 is a plan view of the first stator of FIG. 6.

FIG. 8A is a plan view (detail view A) of one embodiment of a radially off-set slot that can be provided on the first stator of FIG. 6.

FIG. 9 is a cross-sectional view of the first stator of FIG. 6.

FIG. 10 is a perspective view of a second stator that can be used with the CVT of FIG. 1.

FIG. 11 is another perspective view of the second stator of FIG. 10.

FIG. 12 is a plan view of the second stator of FIG. 10.

FIG. 13 is a cross-sectional view of the second stator of FIG. 10.

FIG. 14 is a perspective view of a timing plate that can be used with the CVT of FIG. 1.

FIG. 15 is a cross-sectional perspective view of the timing plate of FIG. 14.

FIG. 16 is a Detail View B of the timing plate of FIG. 14.

FIG. 17 is a perspective view of a stator driver assembly that can be used with the CVT of FIG. 1.

FIG. 18 is an exploded perspective view of the stator driver assembly of FIG. 17.

FIG. 19 is a perspective view of an embodiment of a stator driver assembly.

FIG. 20 is an exploded perspective view of the stator driver assembly of FIG. 19.

FIG. 21 is a perspective view of another embodiment of a stator driver assembly.

FIG. 22 is an exploded perspective view of the stator driver assembly of FIG. 21.

FIG. 27A is an exploded, cross-sectional perspective view of certain components of the CVT of FIG. 23.

FIG. 27B is a plan view of an eccentric gear that can be used with the CVT of FIG. 23.

FIG. 27C is a perspective view of a sliding block and the eccentric gear of FIG. 27.

FIG. 28 is a perspective view of a shifting mechanism that can be used with the CVT of FIG. 1 or FIG. 23.

FIG. 29 is an exploded perspective view of the shifting mechanism of FIG. 28.

FIG. 32 is a perspective view of yet another embodiment of a shifting mechanism that can be used with the CVT of FIG. 1 or 23.

FIG. 33 is an exploded perspective view of the shifting mechanism of FIG. 32.

FIG. 34 is a schematic illustration of an embodiment of a shifting mechanism that can be used with the CVT of FIG. 1 or 23.

FIG. 35 is a schematic illustration of another embodiment of a shifting mechanism that can be used with the CVT of FIG. 1 or 23.

FIG. 36 is a schematic illustration of a shifting mechanism and handle grip that can be used with the CVT of FIG. 1 or 23.

FIG. 37A is a plan view illustration of a first position of the shifting mechanism of FIG. 36.

FIG. 37B is a plan view illustration of a second position of the shifting mechanism of FIG. 36.

FIG. 42 is a schematic illustration of an embodiment of a shifting mechanism that can be used with a CVT having a skew-based control system.

FIG. 43 is a section A-A view of the shifting mechanism of FIG. 42.

FIG. 44 is a schematic illustration of another embodiment of a shifting mechanism that can be used with a CVT having a skew-based control system.

FIG. 45 is a schematic illustration of a CVT having a skew-based control system and a fly-ball governor.

FIG. 46A is a schematic illustration of a CVT having a skew-based control system and a speed governor and a torque governor.

FIG. 46B is a schematic illustration of a CVT having a skew-based control system and a speed governor and a torque governor.

FIG. 47 is a schematic illustration of a hydraulic control system that can be used with a CVT having a skew-based control system.

FIG. 48 is a schematic of certain components of a bicycle employing a CVT having a skew-based control system.

FIG. 53 is a schematic view of an embodiment of a CVT having a skew-based control system and a planetary gear set.

FIG. 54 is a schematic view of an embodiment of a CVT having a skew-based control system and an actuator shaft.

FIG. 67 is a perspective view of yet another embodiment of a shifting mechanism that can be used with the CVT of FIG. 1, 23, or 55 for example.

FIG. 68 is another perspective view of the shifting mechanism of FIG. 67.

DETAILED DESCRIPTION OF CERTAIN INVENTIVE EMBODIMENTS

Figures 1, 2:
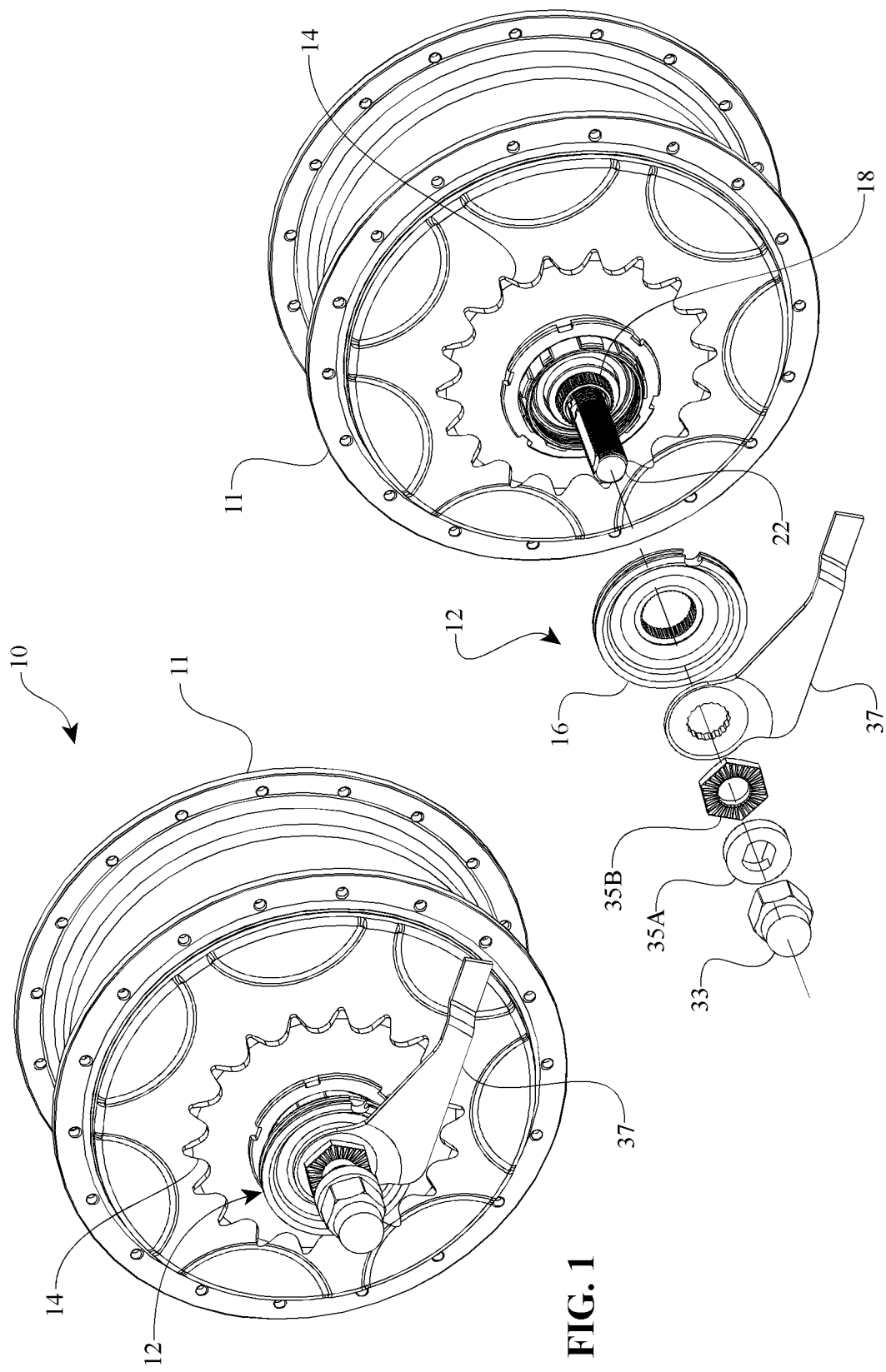
FIG. 1 is a perspective view of a ball planetary continuously variable transmission (CVT) having a skew-based control system.
FIG. 2 is an exploded perspective view of the CVT of FIG. 1.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the invention. Furthermore, embodiments of the invention can include several inventive features, no single one of which is solely responsible for its desirable attributes or which is essential to practicing the inventions described. Certain CVT embodiments described here are generally related to the type disclosed in U.S. Pat. Nos. 6,241,636; 6,419,608; 6,689,012; 7,011,600; 7,166,052; U.S. patent application Ser. Nos. 11/243,484 and 11/543,311; and Patent Cooperation Treaty patent applications PCT/IB2006/054911, PCT/US2008/068929, PCT/US2007/023315, PCT/US2008/074496, and PCT/US2008/079879. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, washers 35A and washers 35B) will be referred to collectively by a single label (for example, washers 35).

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs described here may operate in both tractive and frictional applications. For example, in the embodiment where a CVT is used for a bicycle application, the CVT can operate at times as a friction drive and at other times as a traction drive, depending on the torque and speed conditions present during operation.

One aspect of the continuously variable transmissions disclosed here relates to drive systems wherein a prime mover drives various driven devices. The prime mover can be, for example, an electrical motor and/or an internal combustion engine. For purposes of description here, an accessory includes any machine or device that can be powered by a prime mover. For purposes of illustration and not limitation, said machine or device can be a power takeoff device (PTO), pump, compressor, generator, auxiliary electric motor, etc. Accessory devices configured to be driven by a prime mover may also include alternators, water pumps, power steering pumps, fuel pumps, oil pumps, air conditioning compressors, cooling fans, superchargers, turbochargers and any other device that is typically powered by an automobile engine. Usually, the speed of a prime mover varies as the speed or power requirements change; however, in many cases the accessories operate optimally at a given, substantially constant speed. Embodiments of the continuously variable transmissions disclosed here can be used to control the speed of the power delivered to the accessories powered by a prime mover.

In other situations, inventive embodiments of the continuously variable transmissions disclosed here can be used to decrease or increase speed and/or torque delivered to the accessories for achieving optimal system performance. In certain situations, inventive embodiments of the continuously variable transmissions disclosed here can be used to increase speed to the accessories when the prime mover runs at low speed and to decrease speed to the accessories when the prime mover runs at high speed. Thus, the design and operation of accessories can be optimized by allowing the accessories to operate at one substantially favorable speed, or a more narrow speed range whereby the accessories need not be made larger than necessary to provide sufficient performance at an optimal speed or speed range.

Embodiments of the invention disclosed here are related to the control of a variator and/or a CVT using generally spherical planets each having a tiltable axis of rotation (sometimes referred to here as a "planet axis of rotation") that can be adjusted to achieve a desired ratio of input speed to output speed during operation. In some embodiments, adjustment of said axis of rotation involves angular misalignment of the planet axis in a first plane in order to achieve an angular adjustment of the planet axis of rotation in a second plane, thereby adjusting the speed ratio of the variator. The angular misalignment in the first plane is referred to here as "skew" or "skew angle". In one embodiment, a control system coordinates the use of a skew angle to generate forces between certain contacting components in the variator that will tilt the planet axis of rotation in the second plane. The tilting of the planet axis of rotation adjusts the speed ratio of the variator. Embodiments of skew control systems (sometimes referred to here as "skew based control systems") and skew angle actuation devices for attaining a desired speed ratio of a variator will be discussed.

Figure 70:
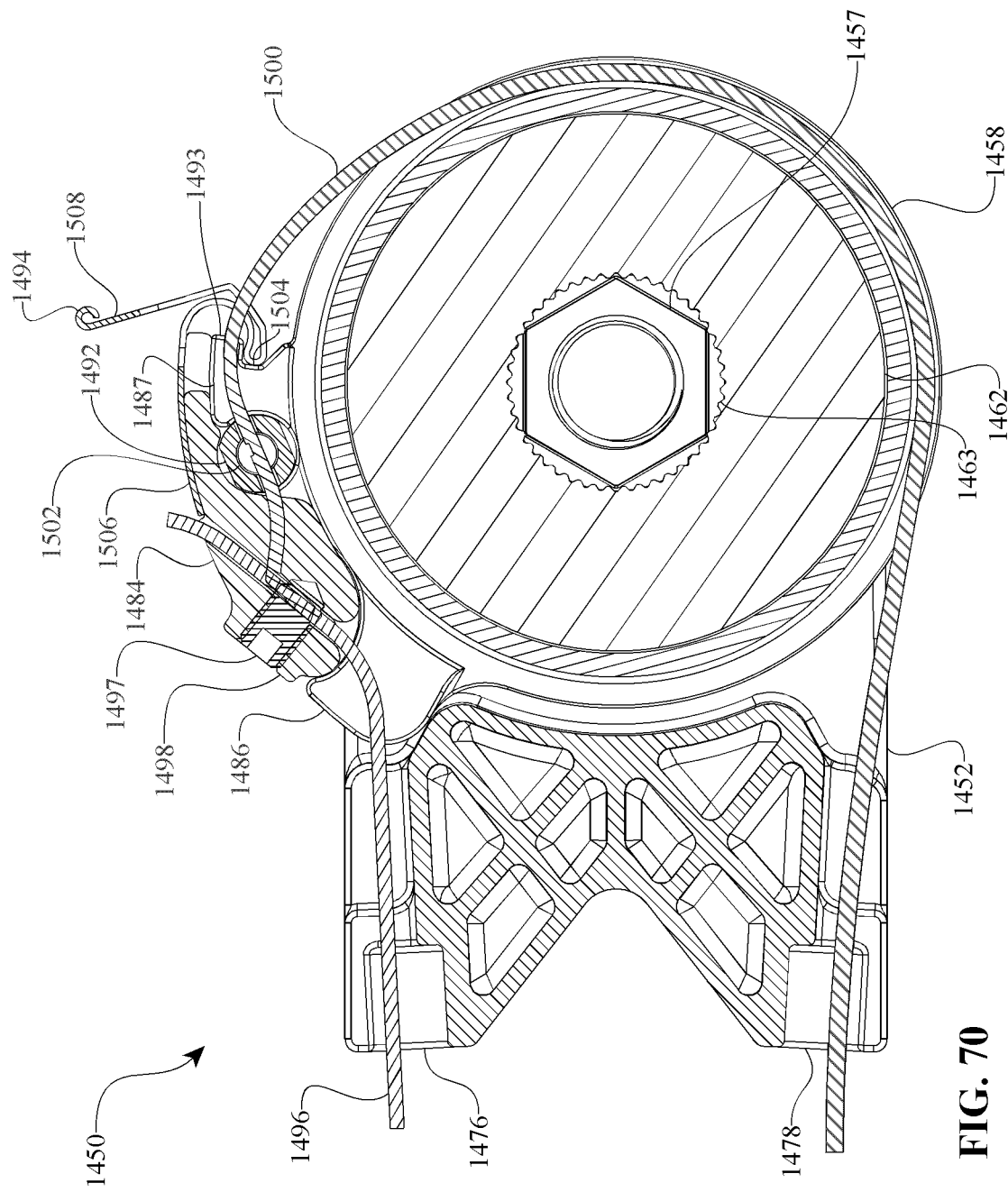
FIG. 70 is a cross-sectioned plan view of the shifting mechanism of FIG. 67.

Embodiments of a continuously variable transmission (CVT), and components and subassemblies thereof, will be described now with reference to FIGS. 1-70. FIG. 1 shows a CVT 10 that can be used in many applications including, but not limited to, human powered vehicles (for example, bicycles), light electrical vehicles, hybrid human-, electric-, or internal combustion powered vehicles, industrial equipment, wind turbines, etc. Any technical application that requires modulation of mechanical power transfer between a power input and a power sink (for example, a load) can implement embodiments of the CVT 10 in its power train.

Figure 3:
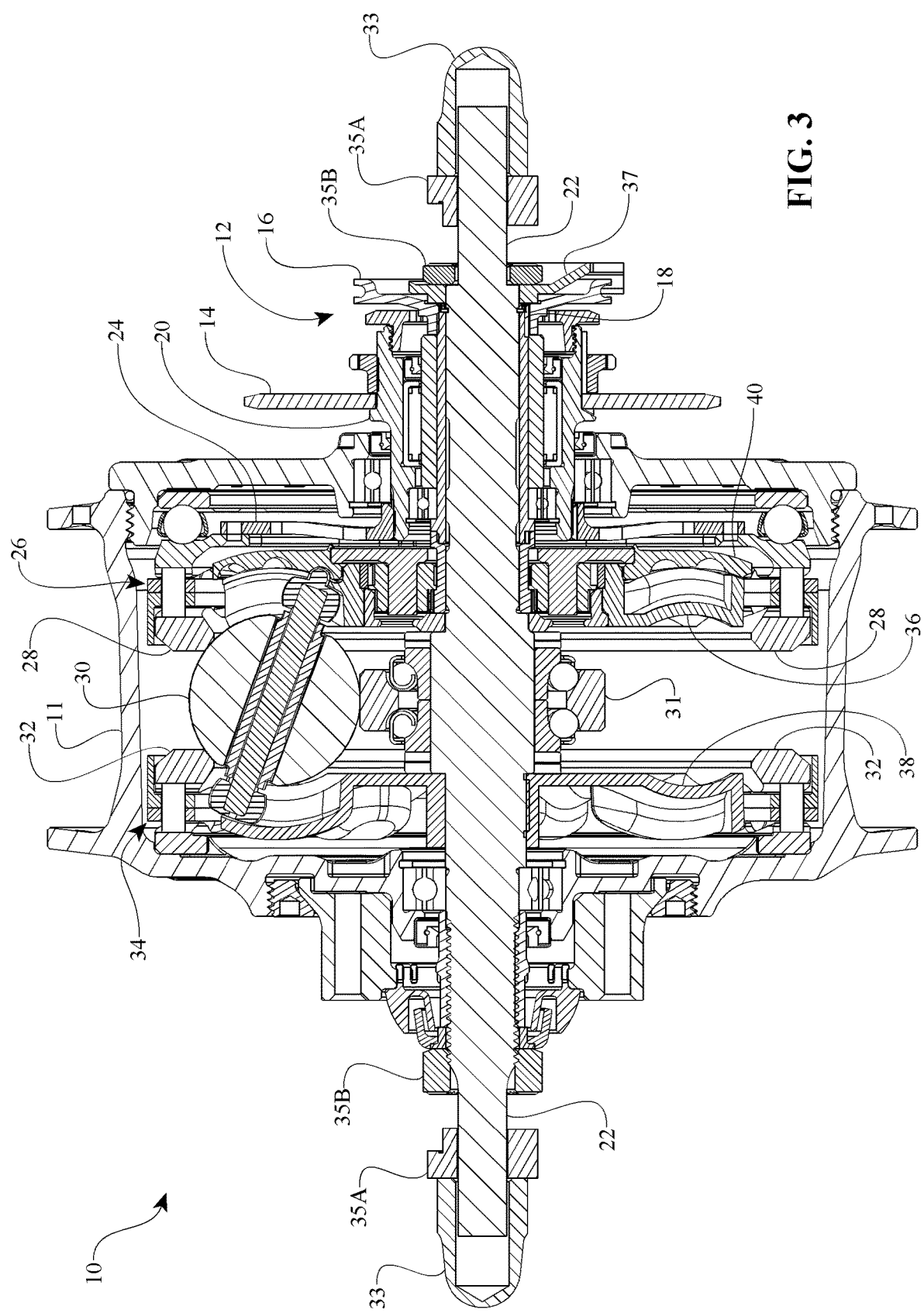
FIG. 3 is a cross-sectional view of the CVT of FIG. 1.

Referring now to FIGS. 1-3, in one embodiment the CVT 10 includes a housing 11 configured to structurally support and generally encloses components of the CVT 10. The CVT 10 can be provided with a shifting mechanism 12 configured to cooperate with, for example, a cable actuator of a bicycle (not shown). In some embodiments, the CVT 10 has a sprocket 14 configured to receive an input power. In one embodiment, the shifting mechanism 12 includes a pulley 16 coupled to a shift tube 18.

Still referring to FIG. 3, in one embodiment of the CVT 10, an input driver 20 can be arranged coaxial with a main axle 22. The input driver 20 can be configured to receive an input power from, for example, the sprocket 14 or other suitable coupling. In one embodiment, the input driver 20 is coupled to a torsion plate 24 that is coupled to a first axial force generator assembly 26. The axial force generator assembly 26 is operably coupled to a first traction ring 28. The first traction ring 28 is configured to contact each of a plurality of traction planets 30. Each traction planet 30 is in contact with an idler 31 located radially inward of the traction planets 30. A second traction ring 32 is configured to contact each of the traction planets 30. In one embodiment, the second traction ring 32 is coupled to a second axial force generator assembly 34. The second axial force generator assembly 34 can be substantially similar to the first axial force generator assembly 26. In certain embodiments, the axial force generator assemblies 26, 34 can be substantially similar to the clamping force generator mechanisms generally described in Patent Cooperation Treaty Application PCT/US2007/023315, the entire disclosure of which is hereby incorporated herein by reference. In one embodiment, the CVT 10 can be provided with a set of nuts 33 and washers 35A, 35B to facilitate the coupling of the main axle 22 to, for example, a bicycle frame (not shown). The main axle 22 can further be coupled to the bicycle frame via a reaction arm 37.

During operation of CVT 10, an input power can be transferred to the input driver 20 via, for example, the sprocket 14. The input driver 20 can transfer power to the first axial force generator 26 via the torsion plate 24. The first axial force generator 26 can transfer power to the traction planets 30 via a traction or friction interface between the first traction ring 28 and the each of the traction planets 30. The traction planets 30 deliver the power to the housing 11 via the second traction ring 32 and the second axial force generator 34. A shift in the ratio of input speed to output speed, and consequently, a shift in the ratio of input torque to output torque, is accomplished by tilting the rotational axis of the traction planets 30. In one embodiment, the tilting of the rotational axes of the traction planets 30 is accomplished by rotating a first stator 36 with respect to a second stator 38.

Figure 4:
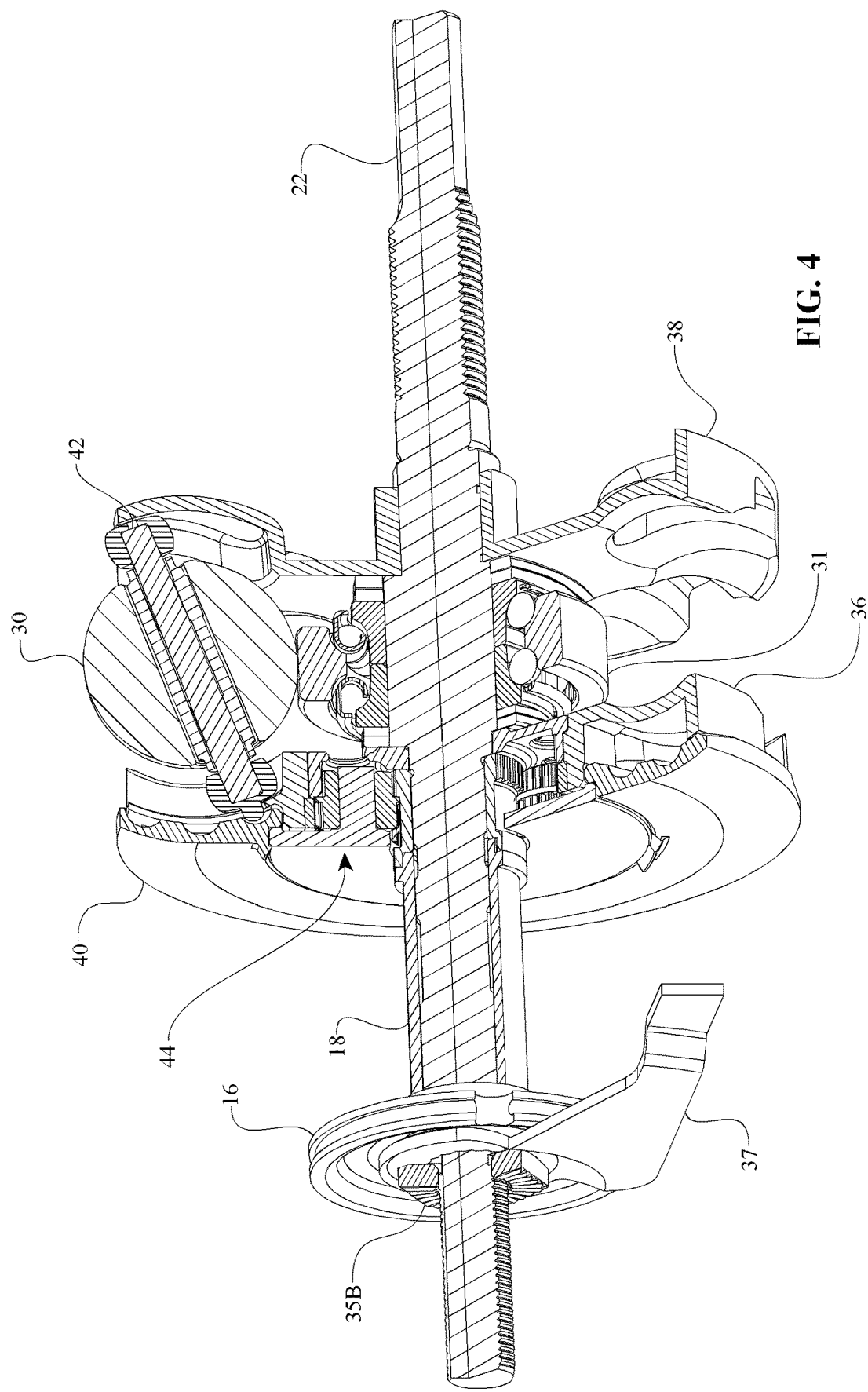
FIG. 4 is a cross-sectional perspective view of certain components of the CVT of FIG. 1.
Figure 5:
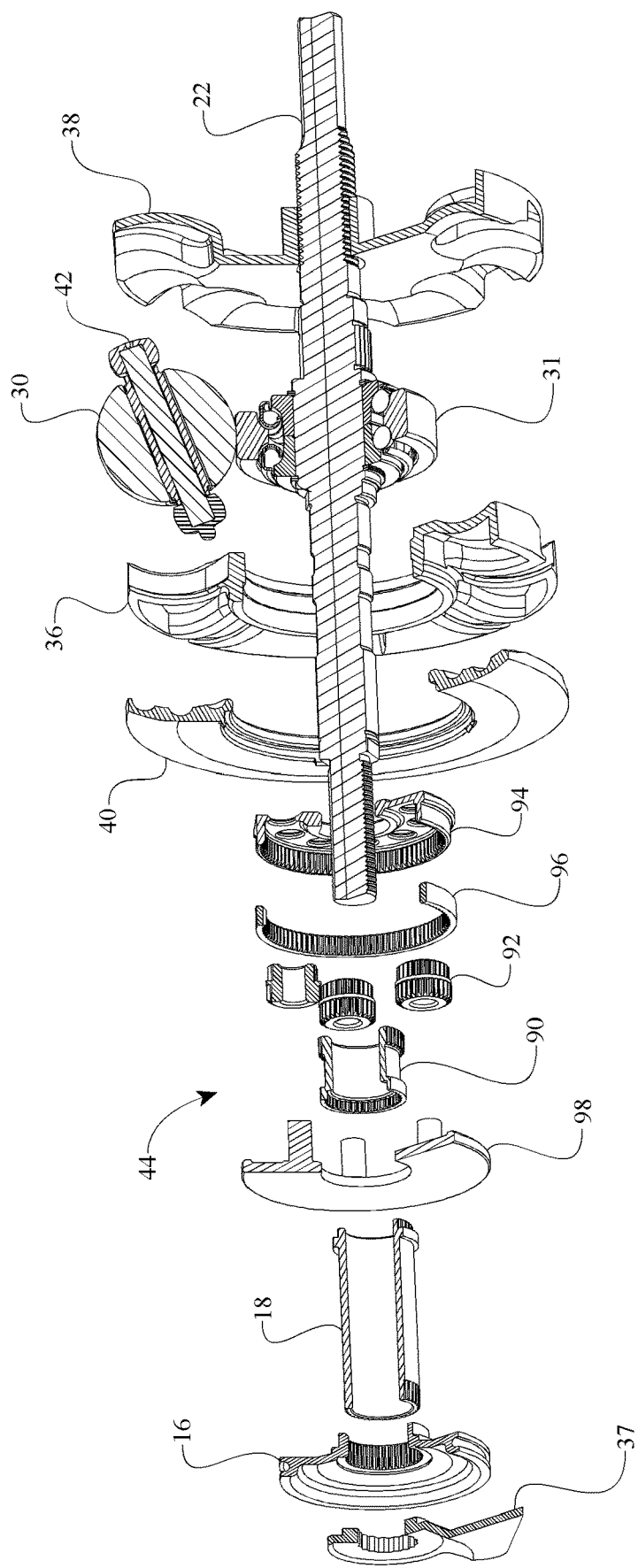
FIG. 5 is an exploded, cross-sectional, perspective view of certain components of the CVT of FIG. 1.

Referring now to FIGS. 4 and 5, each of the traction planets 30 is provided with a planet axle 42 received in an inner bore. In some embodiments, the traction planet 30 is rotatable about the planet axle 42. In other embodiments, the planet axle 42 is rotationally fixed relative to the traction planet 30 so that the planet axle 42 and the traction planet 30 rotate in unison. In one embodiment the CVT 10 can be provided with a timing plate 40 operably coupled to one end of the planet axles 42. The timing plate 40 facilitates the general synchronization of the traction planet assemblies 30. When the CVT 10 is not operating, that is, when the traction planet assemblies 30 are not spinning, the timing plate 40 retains the traction planet assemblies 30 to generally start near the same angular position upon operation of the CVT 10. However, during most operating conditions of the CVT 10, the timing plate 40 is substantially passive in guiding the traction planet assemblies 30. The CVT 10 can be provided with a stator driver assembly 44 coupled to the shift tube 18. The stator driver assembly 44 is coupled to the first stator 36. The stator driver assembly 44 can facilitate a rotation of the first stator 36 about a longitudinal axis of the CVT 10.

Passing now to FIGS. 6-9, in one embodiment the second stator 38 is a substantially disc-shaped body 50 having a central bore 52. The central bore 52 facilitates the coupling of the second stator 38 to the main axle 22. The disc-shaped body 50 can be provided with a plurality of radially off-set curved guide slots 54 arranged angularly about the central bore 52. Each radially off-set guide slot 54 is sized to accommodate the coupling of the second stator 38 to the planet axle 42. The radially off-set guide slots 54 are angularly offset from a radial construction line 56 when viewed in the plane of the page of FIG. 8. The angular offset can be approximated by an angle 58. The angle 58 is formed between the radial construction line 56 and a construction line 60. The construction line 60 substantially bisects the guide slot 54 when viewed in the plane of the page of FIG. 8. In some embodiments, the angle 58 is between 3 degrees and 45 degrees. A low angle 58 would provide faster shift rates in a given application but stator clocking angle (beta) must be controlled over a very small range. A high angle 58 would provide slower shift rates in a given application but stator clocking angle (beta) would be controlled over a larger range. In effect, a low angle 58 is highly responsive in transmission ratio change but potentially more difficult to control or stabilize, while a high angle can be less responsive in transmission ratio change but easy to control by comparison. In some embodiments, where it is desirable to have high speed, fast shift rates, the angle 58 can be, for example, 10 degrees. In other embodiments, where it is desirable to have slower speed, precise control of transmission ratio, the angle 58 can be about 30 degrees. However, the said values of the angle 58 are provided as an illustrative example, and the angle 58 can be varied in any manner a designer desires. In some embodiments, the angle 58 can be any angle in the range of 10 to 25 degrees including any angle in between or fractions thereof. For example, the angle can be 10, 11, 12, 13, 14, 15, 16, 17, 18, 19, 20, 21, 22, 23, 24, 25, or any portion thereof. In other embodiments, the angle 58 can be 20 degrees. In one embodiment, the radially off-set guide slots 54 can be arranged so that the construction line 60 is linearly offset from a construction line 61 by a distance 62. The construction line 61 is parallel to the construction line 60 and intersects the center of the disc-shaped body 50. In other embodiments, such as the one illustrated in FIG. 8A, the second stator 38 can be provided with a guide slot 53. The guide slot 53 can be substantially similar to the guide slot 54. The guide slot 53 can have a substantially curved profile when viewed in the plane of the page of FIG. 8A. The curvature of the guide slot 53 can be generally defined by a construction line 57. For illustrative purposes, a construction line 57 can be shown tangent to the construction line 60. In some embodiments, the construction line 57 is a constant radius curve. In other embodiments, the construction line 57 can be a non-constant radius curve. The curvature of the construction line 57, and consequently the curvature of the guide slot 53, can be configured to provide the desired control stability and response of the CVT 10.

Turning now to FIGS. 10-13, in one embodiment the first stator 36 is a substantially disc-shaped body 70 having a central bore 72. In some embodiments, the central bore 72 can be configured to couple to the stator driver assembly 44. The disc-shaped body 70 can be provided with a plurality of curved guide slots 74 arranged angularly about the central bore 72. The guide slots 74 are aligned with a radial construction line 76 when viewed in the plane of the page of FIG. 12. In some embodiments, the first stator 36 can be provided with guide slots 74 that are angularly offset in a similar configuration as the guide slots 54. In some embodiments, the first traction ring 28 can carry less torque than the traction ring 32 during operation of the CVT 10. It may be desirable in some applications to place the first stator 36 in proximity to the first traction ring 28 so that the first stator 36 operates with lower torque than, for example, the second stator 38.

Referring now to FIGS. 14-16, in one embodiment the timing plate 40 is a substantially disc-shaped body 80 having a central bore 82. The disc-shaped body 80 is provided with a plurality of helical grooves 84 formed on a first face. The helical grooves 84 are configured to operably couple to the planet axles 42. In one embodiment, the helical grooves 84 are angled with respect to the guide slots 74. In some embodiments, the angle of the helical grooves 84 with respect to the guide slots 74 is about 40 degrees when viewed down the longitudinal axis of the CVT 10. In one embodiment, the timing plate is provided with tabs 86. The tabs 86 facilitate the coupling of the timing plate 40 to, for example, the stator driver assembly 44. In some embodiments, the timing plate 40 is adapted to be rotationally unconstrained to the stator driver assembly 44.

Passing now to FIGS. 17 and 18 and referring again to FIG. 5, in one embodiment the stator driver assembly 44 includes a compound planetary gear set having a sun gear 90 arranged to couple to the shift tube 18. The stator driver assembly 44 includes a number of planet gears 92 coupled to first and second ring gears 94, 96. The first ring gear 94 can couple to the main shaft 22 while the second ring gear 96 can couple to the first stator 36. In one embodiment, the stator driver assembly 44 includes a carrier 98 (FIG. 5). The carrier 98 can couple to the timing plate 40. The carrier 98 can couple to the planetary gears 92. The number of teeth and pitch of the sun gear 90, the planet gears 92, and the first and second ring gears 94, 96 can be sized to provide the desired rotation of the first stator 36. In one embodiment, the reduction provided by the stator driver assembly 44 is in the range of about 0.019 rotations of the ring gear 96 to one rotation of the sun gear 90. In some embodiments, the ration of the carrier 98 is about 0.68 rotations to one rotation of the sun gear 90. There are many ratio combinations that are possible with the stator driver assembly 44.

Turning now to FIGS. 19 and 20, in one embodiment a stator driver assembly 100 can include a compound planocentric gear set having a fixed ring 102, an output ring 104, and a compound orbital planet gear 106. The compound orbital planet gear 106 can be coupled to an eccentric driver 108. The eccentric driver 108 can be provided with an eccentric lobe surface 109 that is configured to engage an inner bore 110 of the compound orbital planet gear 106. In one embodiment, the eccentric driver 108 can be rotated by the shift tube 18, for example. In some embodiments, the compound orbital planet gear 106 is provided with a first gear 112 and a second gear 114. The first gear 112 couples to the fixed ring 102. The second gear 114 couples to the output ring 104. In one embodiment, the stator driver assembly 100 can be configured to provide a ratio of 0.01 to 0.05 turns of the orbital planet gear 106 to about one turn of the eccentric driver 108. In some embodiments, the ratio range is such that a positive rotation of the eccentric driver 108 can result in either a clockwise or a counterclockwise rotation of the output ring gear 104. The ratio range can be 0.01 to 0.05 turns of the output ring gear 104 to one turn of the eccentric driver 108.

Referring now to FIGS. 21 and 22, in one embodiment a stator driver assembly 120 can include a planocentric gear set 120 having a fixed carrier 122 coupled to first and second orbital planet gears 124, 126. The first and second orbital planet gears 124, 126 couple to an output ring 128. The first and second orbital planet gears 124, 126 can be coupled to an eccentric driver 130. In one embodiment, the eccentric driver 130 can be coupled to the shift tube 18, for example. In some embodiments, the eccentric driver 130 is provided with eccentric lobe surfaces 131A, 131B that are configured to engage first and second inner bores 132A, 132B of the first and second orbital planet gears 124, 126, respectively. The fixed carrier 122 can be provided with a number of pins 134 to facilitate the coupling of the fixed carrier 122 to a number of holes 136A, 136B of the first and second orbital planet gears 124, 126, respectively. Typically, the holes 136A, 136B have a larger diameter than the pins 134 to provide a small degree of freedom to the first and second orbital planet gears 124, 126. The degree of freedom allows the first and second orbital gears 124, 126 to orbit about the longitudinal axis while substantially preventing rotation of the first and second orbital planet gears 124, 126 about the longitudinal axis. The first and second orbital planet gears 124, 126 share the torque transfer to the output ring 128. The eccentric lobe surfaces 131 can be configured to prevent backlash between the first and second orbital planet gears 124, 126. In one embodiment, the ratio range of the stator driver assembly 120 is about 0.03 rotations of the output ring 128 to one rotation of the eccentric driver 130.

Figure 23:
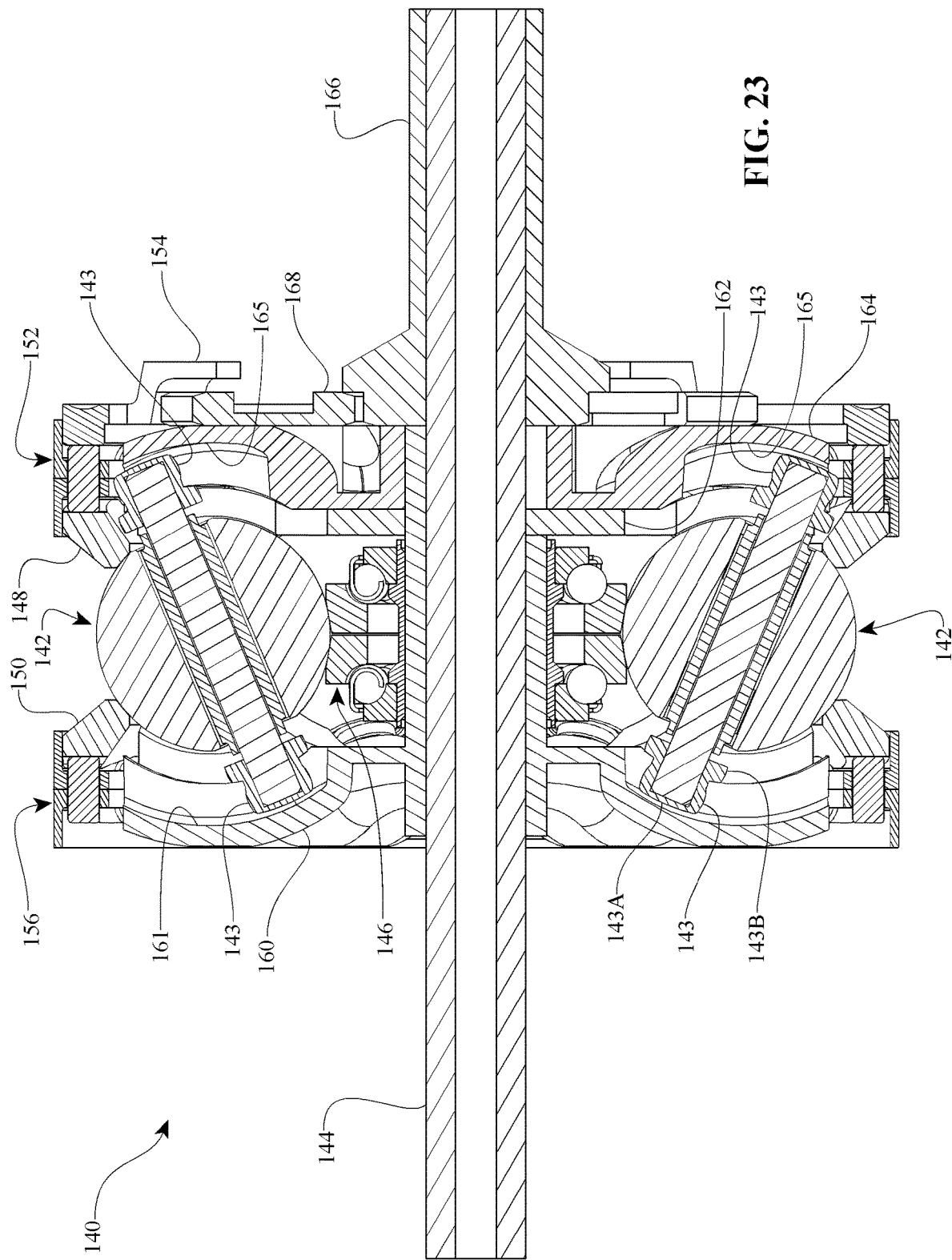
FIG. 23 is a cross-sectional view of an embodiment of a CVT having a skew-based control system.
Figure 24:
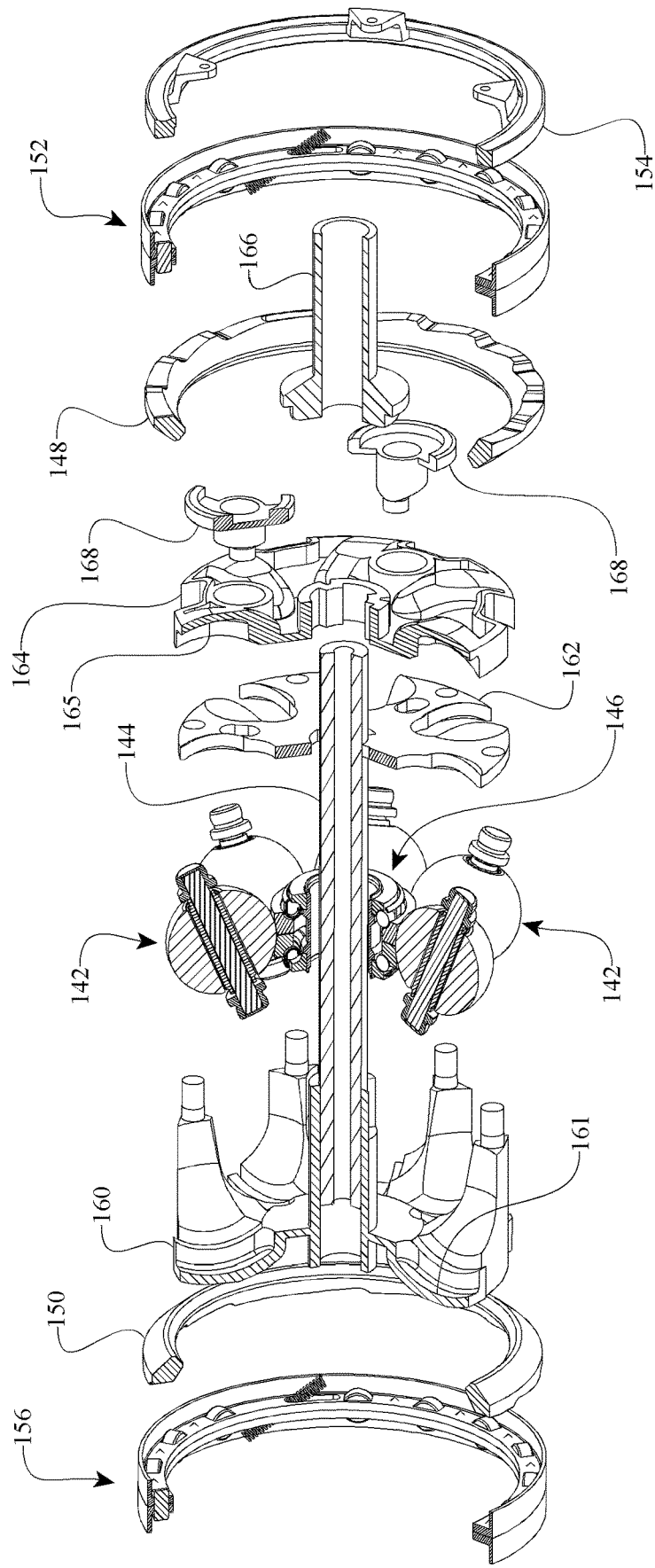
FIG. 24 is an exploded, cross-sectional perspective view of the CVT of FIG. 23.
Figure 25:
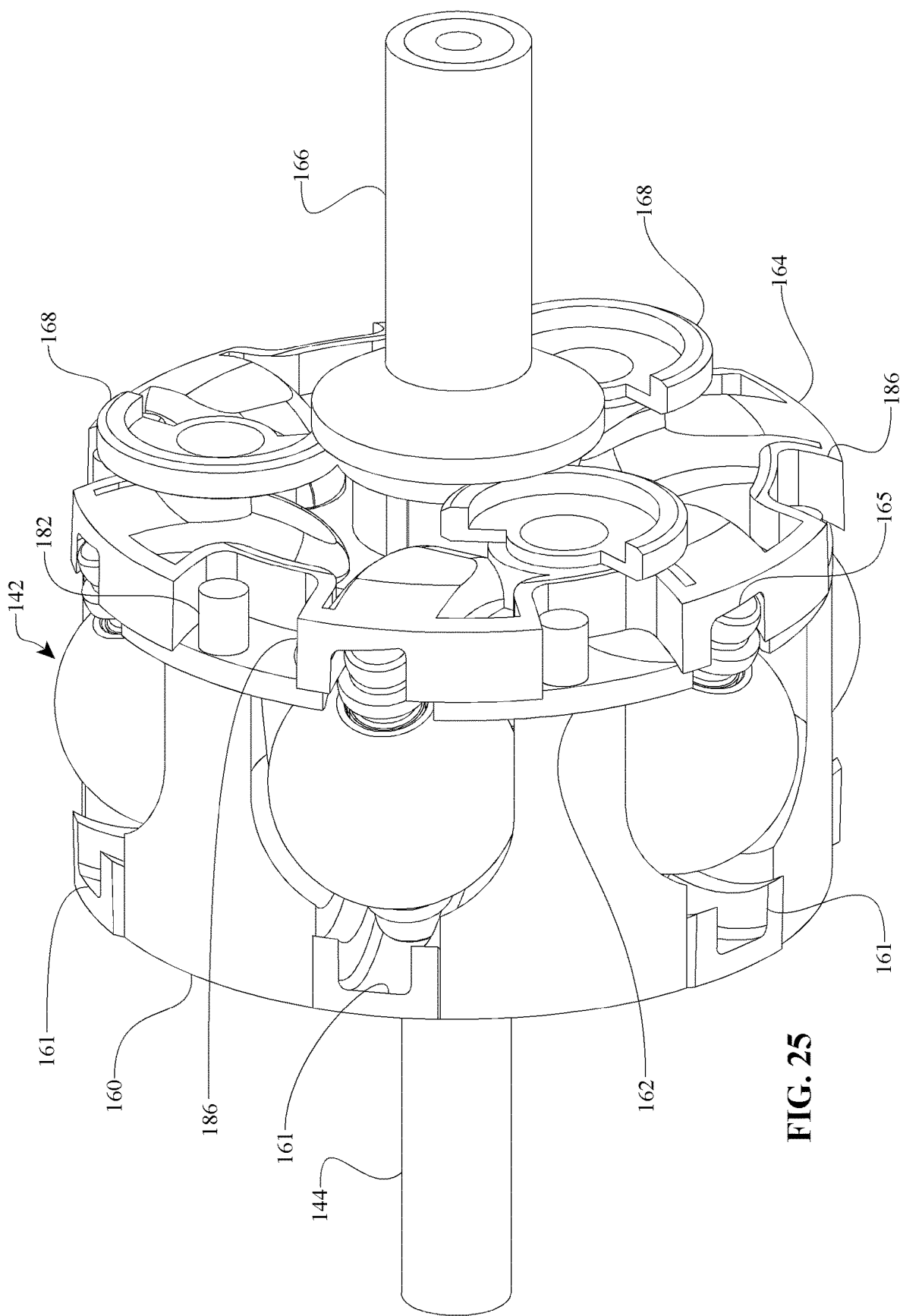
FIG. 25 is a perspective view of certain components of the CVT of FIG. 23.
Figure 26:
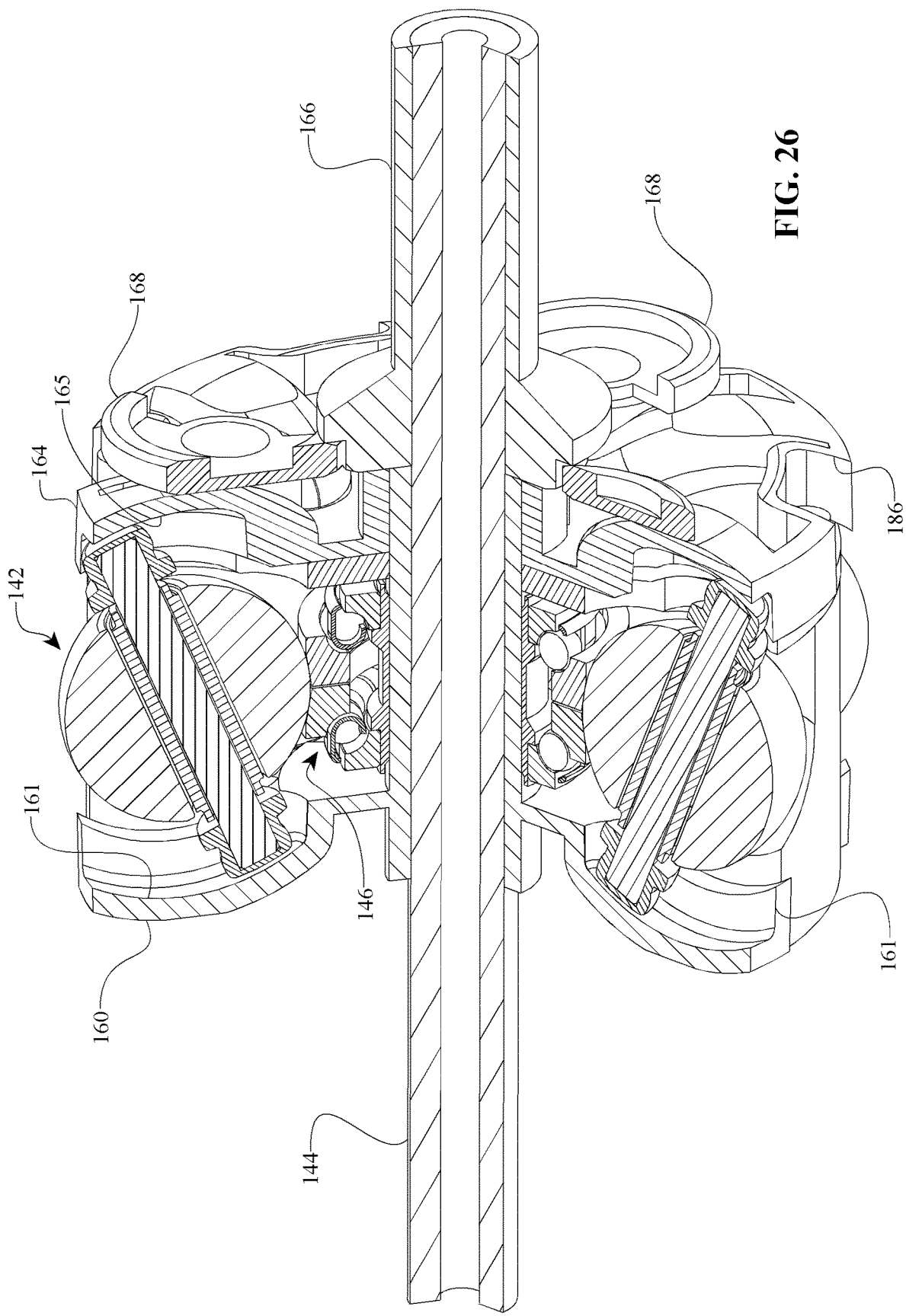
FIG. 26 is a cross-sectional perspective view of certain components of the CVT of FIG. 23.

Passing now to FIGS. 23 and 24, in one embodiment a CVT 140 can include a number of traction planet assemblies 142, for example six traction planet assemblies 142, arranged angularly about a main axle 144. The main axle 144 generally defines a longitudinal axis of the CVT 140. The traction planet assemblies 142 are in contact with a traction sun assembly 146. The traction sun assembly 146 is located radially inward of the traction planet assemblies 142. The traction sun assembly 146 is coaxial with, the main axle 144. The CVT 140 includes first and second traction rings 148, 150, in contact with each of the traction planet assemblies 142. In one embodiment, the first traction ring 148 is coupled to a first axial force generator assembly 152. The first axial force generator assembly 152 is coupled to an input driver ring 154. The input driver ring 154 is configured to receive an input power. The second traction ring 150 is coupled to a second axial force generator assembly 156. In one embodiment, the second axial force generator 156 is configured to transfer a power out of the CVT 140.

Still referring to FIGS. 23 and 24, in one embodiment the CVT 140 includes a first stator 160 coupled to a reaction plate 162. The CVT 140 includes a second stator 164 operably coupled to the first stator 160. The first and second stators 160, 164 and the reaction plate 162 are coaxial with the main axle 144. In one embodiment, the first stator 160 and the reaction plate 162 are substantially non-rotatable about the main axle 144. The second stator 164 can be configured to rotate about the main axle 144 relative to the first stator 160. The first stator 160 can be provided with a number of guide slots 161. The guide slots 161 can be arranged on the first stator 160 in a substantially similar manner as the curved guide slots 74 (FIG. 12) are arranged on the stator 36. The second stator 164 can be provided with a number of guide slots 165. The guide slots 165 can be arranged substantially similar to the curved guide slots 54 (FIG. 8) on the stator 38. Each of the traction planet assemblies 142 couples to the guide slots 161 and 165. In one embodiment, the traction planet assemblies 142 are provided with a planet axle support 143. The planet axle supports 143 have a top-hat cross-section when viewed in the plane of the page of FIG. 23. In some embodiments, the planet axle supports 143 can be formed as an integral component as shown in FIG. 23. In other embodiments, the planet axle supports 143 can be divided into two components: a cap 143A and a ring 143B, where the ring 143B is coupled to the reaction plate 162 and the cap 143A is coupled to the second stator 164, for example. In some embodiments, the ring 143B can be an o-ring (not shown), in which case the planet axle is adapted to receive the o-ring. During operation of the CVT 140, a rotation of the second stator 164 with respect to the first stator 160 induces a skew condition on the traction planet assemblies 142 to thereby facilitate a change in the speed ratio of the CVT 140. The first and second stators 160, 164 are coupled to each of the traction planet assemblies 142.

Referring now to FIGS. 25-27B, in some embodiments, the CVT 140 includes a stator driver 166 coaxial with, and rotatable about the main axle 144. The stator driver 166 can be configured to operably couple to, for example, a cable actuator via a pulley or some other suitable coupling (not shown) for facilitating a rotation of the stator driver 166 about the main axle 144. In one embodiment, the stator driver 166 couples to a set of eccentric gears 168. The eccentric gear 168 can be provided with gear teeth (not shown) to interface with a gear ring 169 of the stator driver 166. The eccentric gears 168 couple to the second stator 164 and the reaction plate 162. Each of the eccentric gears 168 has a cam lobe 170 extending from a reaction lobe 172. In one embodiment, the cam lobe 170 can be surrounded by an anti-friction sleeve or bushing (not shown) to reduce friction between the eccentric gear 168 and the reaction plate 162. The cam lobe 170 and the reaction lobe 172 attach to a gear ring 174. The rotational center 171 of the cam lobe 170 is offset from the rotational center 173 of the reaction lobe 172 by a distance D when viewed in the plane of FIG. 27B. In one embodiment, the distance D is in the range of about 0.5 mm to about 5 mm. In some embodiments, the distance D is about 3.1 mm. In one embodiment, the cam lobes 170 couple to a number of guide slots 176 provided on the reaction plate 162. The reaction lobes 172 slidingly couple to a number of guide bores 178 provided on the second stator 164. In one embodiment, the CVT 140 can have one or more gears 168. In some embodiments, the CVT 140 has three eccentric gears 168.

Referring still to FIGS. 27A and 27B, in one embodiment the first stator 160 is provided with a number of fingers 180. Each finger 180 is provided with a reaction member 182 extending axially from the finger 180. The reaction member 182 is configured to couple to the reaction plate 162. In one embodiment, the reaction members 182 can couple to the reaction plate 162 through insertion into a set of holes 184 with, for example, a press-fit. The reaction members 182 extend axially past the reaction plate 162 and come into contact (under certain operating conditions of the CVT 140) with a number of shoulders 186 formed on the second stator 164. In one embodiment, the reaction member 162 is provided with a number of clearance slots 187. The clearance slots 187 are generally aligned with the guide slots 161 and 165 and are sized to accommodate the traction planet assemblies 142. In one embodiment, the first stator 160 can be provided with a number of splines 189 that are configured to engage a number of splines 190 formed on the reaction plate 162.

During operation of the CVT 140, the stator driver 166 can be rotated to thereby rotate the eccentric gears 168. Since the rotational center 171 of the cam lobe 170 is offset from the rotational center 173 of the reaction lobe 172, a rotation of the eccentric gears 168 tends to rotate the second stator 164 with respect to the first stator 160. The offset D provides a moment arm that allows a force to be transferred from the second stator 164 to the reaction plate 162. Thus, a torque applied to the second stator 164 during operation of the CVT 140 can be reacted by the reaction plate 162. Therefore, the amount of torque required to rotate the stator driver 166 is low.

Referring now to FIG. 27C, in one embodiment the guide slots 176 of the reaction plate 162 can be configured to couple to a sliding block 206. The sliding block 206 can couple to the cam lobe 170. In one embodiment, the sliding block 206 is made from a low friction material. The sliding block 206 can have flat sides adapted to slidingly engage the guide slot 176. The flat sides facilitate the reduction of pressure on reaction plate 162, which also lowers friction.

Passing now to FIGS. 28 and 29, in one embodiment a shifting mechanism 250 can be configured to cooperate with the CVT 10, the CVT 140, or any other comparable CVT having a skew-based control system. In one embodiment, the shifting mechanism 250 includes a reaction arm 252 coupled to, for example, the main axle 22. The reaction arm 252 is substantially non-rotatable with respect to the main axle 22. In one embodiment, the reaction arm 252 is provided with a splined bore 253 configured to engage the main axle 22. The shifting mechanism 250 is provided with a shift arm 254 coupled to, for example, the shift tube 18. In one embodiment, the shift arm 254 is provided with a splined bore 255 configured to engage the shift tube 18. The shift arm 254 is configured to rotate with respect to the reaction arm 252. The shifting mechanism 250 is configured to couple to a cable 256. The cable 256 can be of any type well-known in the bicycle industry. The cable 256 can be provided with a cable end 258. The cable end 258 is substantially cylindrical. In one embodiment, the cable end 258 is coupled to a guide slot 260 provided on the reaction arm 252. The cable end 258 is coupled to a guide slot 261 provided on the shift arm 254. The cable end 258 is adapted to slide in the guide slots 260, 261. The cable end 258 can be coupled to a spring 262. The spring 262 couples to the reaction arm 252 to thereby bias the cable end 258 toward on end of the guide slot 260. A movement of the cable 256 tends to translate the cable end 258 in the guide slots 260, 261, which thereby rotates the shift arm 254 with respect to the reaction arm 252. A rotation of the shift arm 254 thereby rotates, for example, the shift tube 18, which tends to shift the transmission ratio of the CVT 10.

Figure 30:
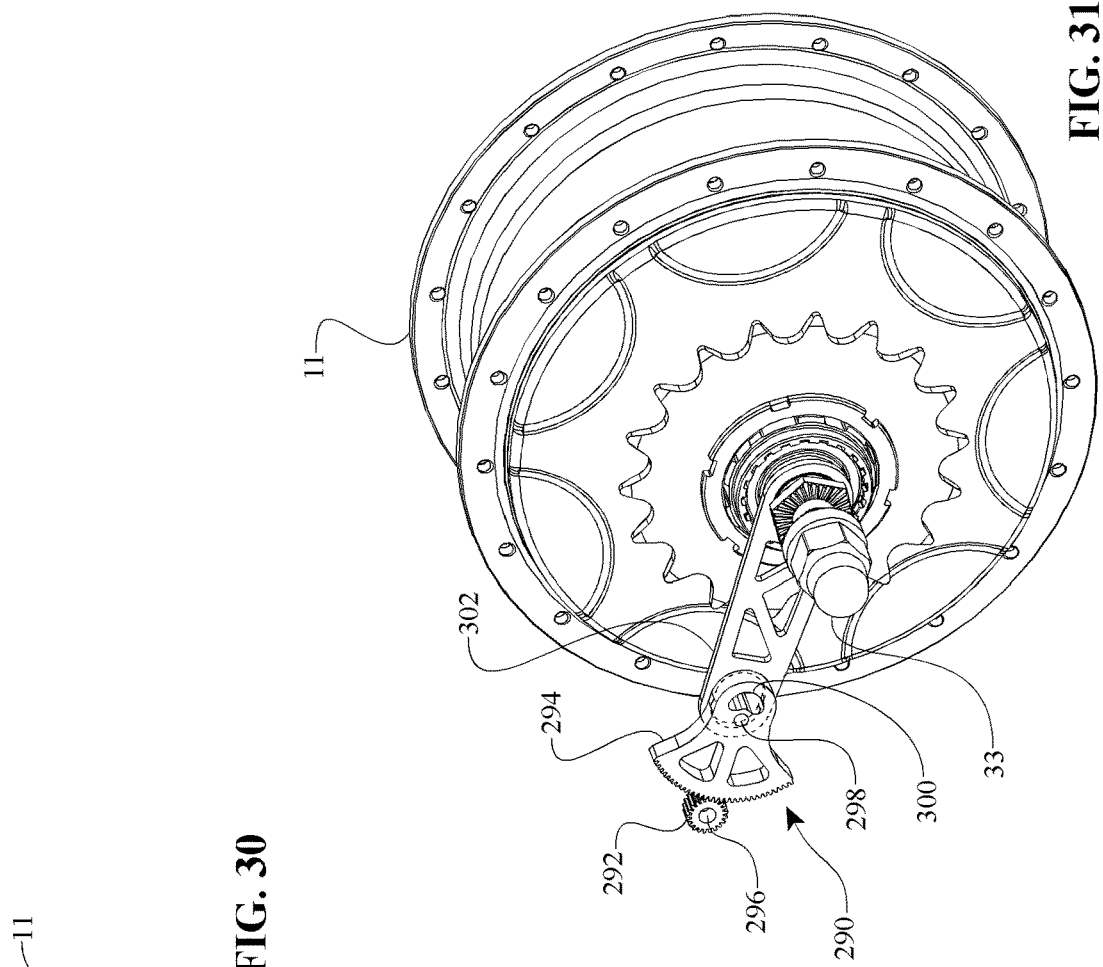
FIG. 30 is a perspective view of an embodiment of a shifting mechanism that can be used with the CVT of FIG. 1 or 23.

Referring now to FIG. 30, in one embodiment a shifting mechanism 280 can be configured to cooperate with the CVT 10, the CVT 140, or any other comparable CVT having a skew-based control system. In one embodiment, the shifting mechanism 280 includes a reaction arm 282 coupled to, for example, the main axle 22. The reaction arm 282 is substantially non-rotatable with respect to the main axle 22. In one embodiment, the reaction arm 282 is provided with a hole 284 to facilitate the coupling of the reaction arm to a standard cable (not shown). The shifting mechanism 280 is provided with a rocker arm 286. The rocker arm 286 can be configured to couple to a cable (not shown) to facilitate a rotation of the rocker arm 286 with respect to the reaction arm 282. In one embodiment, the rocker arm 286 is provided with a D-shaped pivot 288 that is adapted to transfer a torque from the rocker arm 286 to a shift tube driver (not shown). In one embodiment, the shift tube driver can be a gear adapted to couple to, for example, the shift tube 18. In some embodiments, the shift tube driver can be a pulley adapted to couple to the shift tube 18. In other embodiments, the shift tube driver can be a belt, or other suitable coupling, adapted to transfer a torque from the rocker arm 286 to the shift tube 18.

Figure 31:
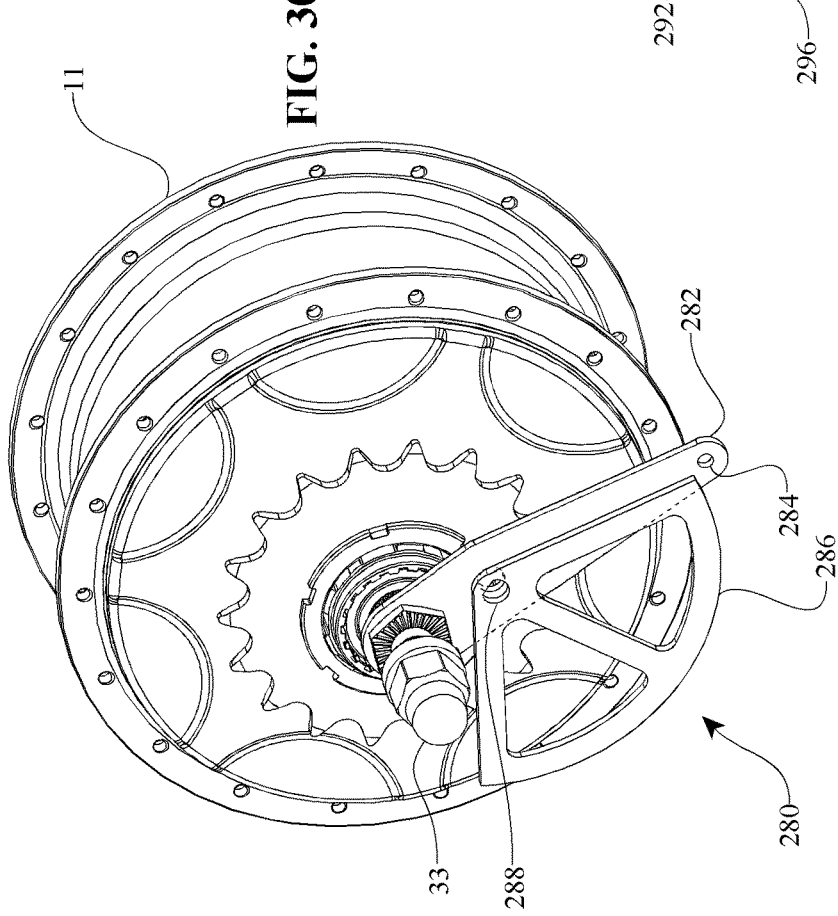
FIG. 31 is a perspective view of another embodiment of a shifting mechanism that can be used with the CVT of FIG. 1 or 23.

Turning now to FIG. 31, in one embodiment a shifting mechanism 290 can be configured to cooperate with the CVT 10, the CVT 140, or any other comparable CVT having a skew-based control system. The shifting mechanism 290 can be provided with an input gear 292 adapted to couple to a standard cable (not shown) via, for example, a pulley or some other suitable coupling. The shifting mechanism 290 is provided with a transfer gear 294 coupled to the input gear 292. The input gear 292 is provided with a bore 296. The transfer gear 294 is provided with a bore 298. The bores 296, 298 are adapted to attach to a fixed member such as a bicycle frame or a reaction arm such as the reaction arm 282 (not shown in FIG. 29). The transfer gear 294 is provided with an eccentric guide bore 300. The shifting mechanism 290 is provided with a shift arm 302 operably coupled to the eccentric guide bore 300 via, for example, a dowel (not shown). In one embodiment, the shift arm 302 couples to, for example, the shift tube 18. A shift in a transmission ratio during operation of, for example, the CVT 10, can be achieved by rotating the input gear 292 to thereby rotate the transfer gear 294 about the bore 298. A rotation of the transfer gear 294 tends to rotate the shift arm 302 via the eccentric guide bore 300.

Referring now to FIGS. 32 and 33, in one embodiment a shifting mechanism 310 can include a substantially non-rotatable reaction arm 311. The shifting mechanism 310 is provided with a pulley 312 coupled to, for example, a shift tube 18 via a splined bore 313. The pulley 312 is provided with a cable end attachment interface 314. In some embodiments, the pulley 312 can have an eccentric shape. In other embodiments, the pulley 312 can be a circular shape. In yet other embodiments, the shape of the pulley 312 is configured to provide a desired ratio between rotations of the shift tube 18 and the resulting transmission ratio of the CVT 10. The reaction arm 311 is provided with a cable housing interface 315 that is configured to cooperate with a standard cable and cable housing (not shown). The reaction arm 311 is provided with a splined bore 316. In one embodiment, the shifting mechanism 310 is provided with an indexing washer 317 that is configured to couple to the splined bore 316. The indexing washer 317 has a number of indexing markings 318. The indexing washer 317 can have an inner bore 319 configured to mate with, for example, the main axle 22, in such a way as to prevent rotation of the indexing washer 317, and consequently the reaction arm 311, with respect to the main axle 22. In one embodiment, the indexing washer 317 can be provided with a slot formed on the inner bore. The slot can receive a frictional spring type element (not shown) that can be made of wire or plastic to employ a slight interference or frictional fit onto the main axle 22. The indexing washer 317 can aid in the retention of the reaction arm 311 onto the main shaft 22 such that it will not accidentally fall off while trying to fit the CVT 10 into a bike frame. The shifting mechanism 310 provides advantages for removal of a wheel (not shown) equipped with the CVT 10, for example, from a bicycle as a complete assembly without any tools, thus allowing disconnection between the cable that is attached to the bike frame and the CVT 10. Once an orientation between the bike frame dropout slots and the directional requirement for the cable location on the bike frame is established, the indexing markings 318 can be used to maintain the orientation upon removal and re-installation of the wheel.

Turning now to FIG. 34, in one embodiment a shifting mechanism 320 can include a reaction arm 322 coupled to, for example, a bicycle frame 324. The shifting mechanism 320 is provided with a shift arm 326. In one embodiment, the shift arm 326 can be coupled to, for example, the shift tube 18. The shift arm 326 is coupled to a first lever 328 at a first pivot 330. The first lever 328 is coupled to a second lever 332 at a second pivot 334. The second lever 332 is coupled to the reaction arm 322 at a third pivot 336. In one embodiment, the shifting mechanism 320 is provided with a spring 338 coupled to the second pivot 334 and the reaction arm 322. In some embodiments, the first, second, and third pivots 330, 334, 336 are common fasteners configured to provide relative rotation between the first and second levers 328, 332. In one embodiment, the shifting mechanism 320 can be coupled to a standard cable (not shown) at the pivot 334. The standard cable can be configured to translate the pivot 334 in the rightward and leftward direction (in reference to plane of FIG. 34). The translation of the pivot 334 tends to rotate the shift arm 326.

Passing now FIG. 35, in one embodiment a shifting mechanism 350 can be provided with a reaction arm 352 coupled to, for example, a bicycle frame 354. The reaction arm 352 can be adapted to couple to a cable 355 and a cable sleeve 356. In one embodiment, the shifting mechanism 350 has a shift arm 358 coupled to, for example, the shift tube 18. The shifting mechanism 350 has a lever 360 coupled to the shift arm 358 at a first pivot 362. The lever 360 is coupled to the cable 355 at a second pivot 364. The second pivot 364 is located on one end of the lever 360 at a distal location from the first pivot 362. In one embodiment, the shifting mechanism 350 is provided with a linkage 366 coupled to the reaction arm 352 at a pivot 368. The linkage 366 is coupled to the lever 360 at a pivot 370. The pivot 370 is located between the first and second pivots 362, 364. The cable 355 can be pulled to thereby move the lever 360. The lever 360 tends to rotate about the pivot 370 to facilitate a rotation of the shift arm 358.

Turning now to FIGS. 36-37B, in one embodiment a shifting mechanism 400 can couple to a handle grip 402 via a cable 404. The shifting mechanism 400 includes a pulley 406. The pulley 406 can have a splined inner bore adapted to couple to a reaction member 408. In one embodiment, the pulley 406 can operably couple to the shift tube 18, for example. The reaction member 408 can be provided with a pocket 410. The pocket 410 is adapted to support a spring 412. In one embodiment, the spring 412 is coupled to a roller 414. The spring 412 tends to press the roller 414 towards the splined inner bore of the pulley 406. The roller 414 applies a holding force on the pulley 406 which facilitates the engagement of the splined inner bore of the pulley 406 to the splined circumference of the reaction member 408 at, for example, a location 416. In one embodiment, the shifting mechanism 400 is positioned in proximity to the CVT 10, for example. In some embodiments, the shifting mechanism 400 can be located within, or in proximity to, the handle grip 402.

During operation of the CVT 10, for example, a control force is applied to the cable 404 to facilitate a rotation of the pulley 406. The control force induces a tension in the cable 404, which tends to displace the pulley 406 in the direction of the control force, for example the pulley 406 displaces in a rightward direction when viewed in the plane of the page of FIG. 37A. For illustrative purposes, FIG. 37B depicts a position of the pulley 406 in the presence of cable tension in comparison to a non-tensioned position 406' (depicted in dashed lines). The pulley 406 and the reaction member 408 do not contact at the location 416 in the presence of cable tension which enables the pulley 406 to rotate relative to the reaction member 408. Once the control force is removed from the cable 404 and tension is relieved, the spring 412 urges the pulley 406 in the leftward direction (in reference to FIG. 40A), which engages the pulley 406 and the reaction member 408 at the location 416.

Figure 39:
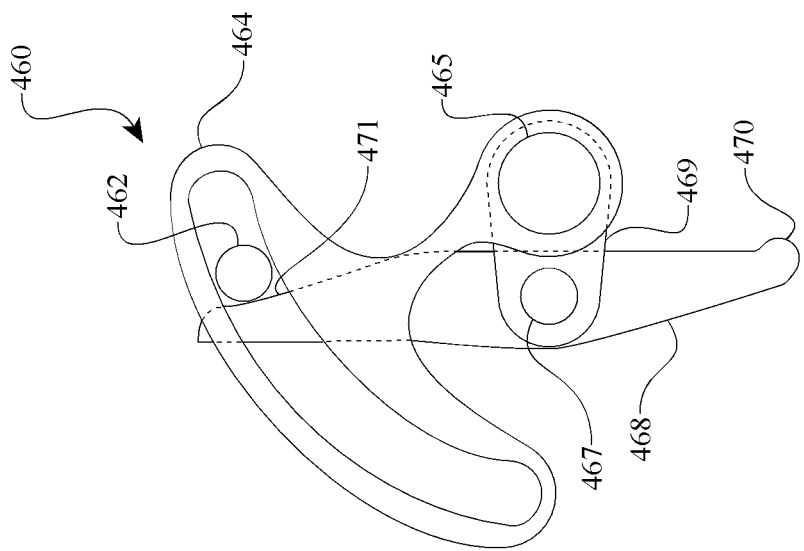
FIG. 39 is a plan view of a shifting mechanism that can be used with the CVT of FIG. 38.
Figure 38:
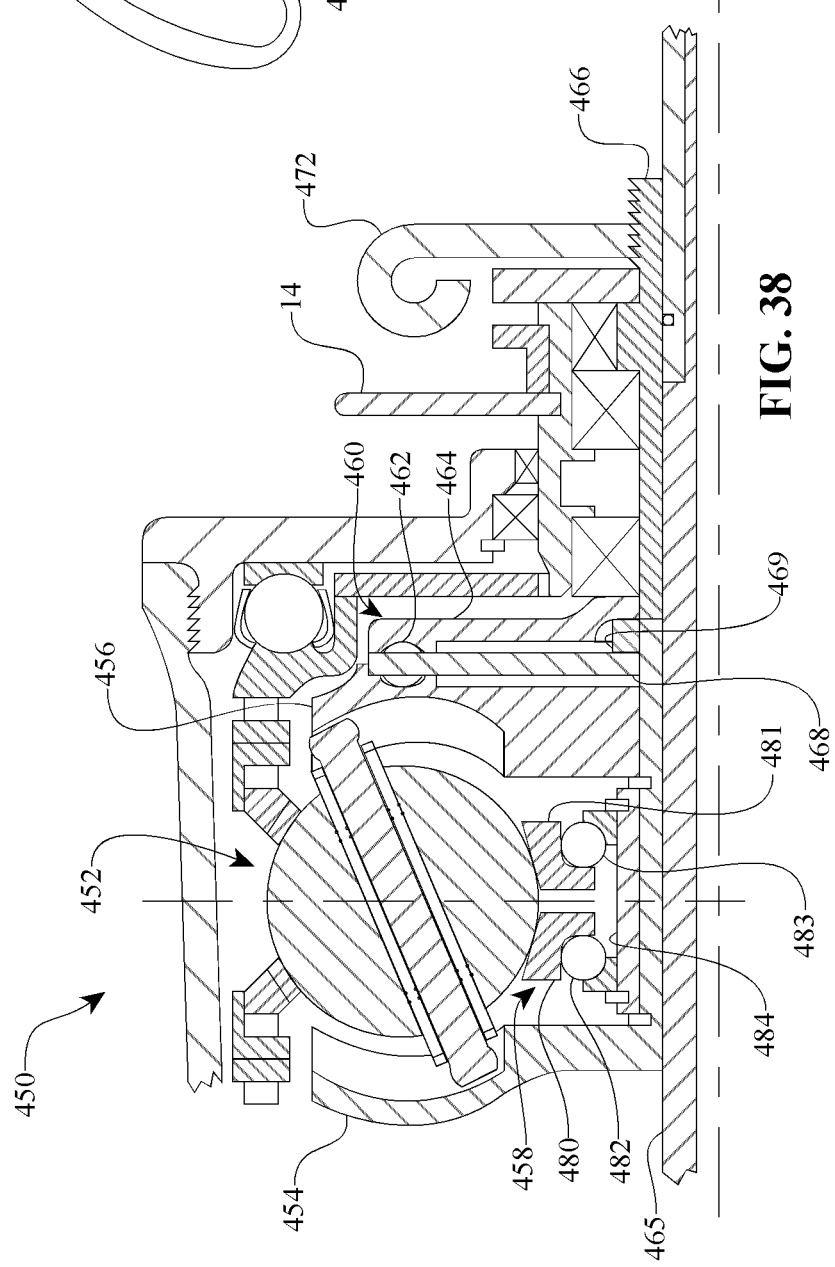
FIG. 38 is a partial cross-section view of certain components of an embodiment of a CVT having a skew-based control system.

Passing now to FIGS. 38 and 39, in one embodiment a CVT 450 can be substantially similar to the CVT 10. For description purposes, only the differences between the CVT 450 and the CVT 10 will be discussed. The CVT 450 has a plurality of traction planet assemblies 452 coupled to a first stator 454 and a second stator 456. The traction planet assemblies 452 are configured to contact an idler assembly 458. In one embodiment, the second stator 456 is coupled to a shifting mechanism 460. The shifting mechanism 460 includes a roller 462 in contact with the second stator 456 and a guide member 464. The guide member 464 can be configured to rotate about a main axle 465. In one embodiment, the guide member 464 is coupled to a shift tube 466. The shift tube 466 can be substantially similar to the shift tube 18. The shifting mechanism 460 can include a reaction arm 468 in contact with the roller 462. The reaction arm 468 can rotate about a pivot 467. The pivot 467 can be coupled to a grounded arm 469. The grounded arm 469 can attach to the main axle 465. In one embodiment, the reaction arm 468 couples to the first stator 454 at an end 470. The end 470 can be pinned to the first stator 454 through a suitable coupling means. In some embodiments, the coupling between the first stator 454 and the end 470 involves a rod (not shown) arranged between the traction planet assemblies 452. The rod can be positioned axially to facilitate the coupling of the first stator 454 to the end 470. The reaction arm 468 can be provided with at least one surface 471 adapted to radially guide the roller 462. During operation of the CVT 450, the second stator 456 reacts torque from the traction planet assemblies 452. The torque can be transferred from the second stator 456 via the roller 462 to the surface 471 of the reaction arm 468. A relative rotation between the first and second stators 454, 456 can be facilitated by a rotation of the guide member 464 with, for example, a shift arm 472. The shift arm 472 can be substantially similar to the shift arm 254, the shift arm 302, the shift arm 326, or any other suitable shift arm.

Referring again to FIG. 38, in one embodiment the assembly 458 can include a first rolling element 480 and a second rolling element 481, both in contact with each of the traction planet assemblies 452. The first and second rolling elements 480, 481 are supported with bearings 482, 483 on a support tube 484. In one embodiment, the support tube 484 is substantially fixed from axial movement. In some embodiments, the bearings 482, 483 are directly coupled to the main axle 22. In other embodiments, the idler assembly 458 can float with respect to the main axle 22.

Figure 40:
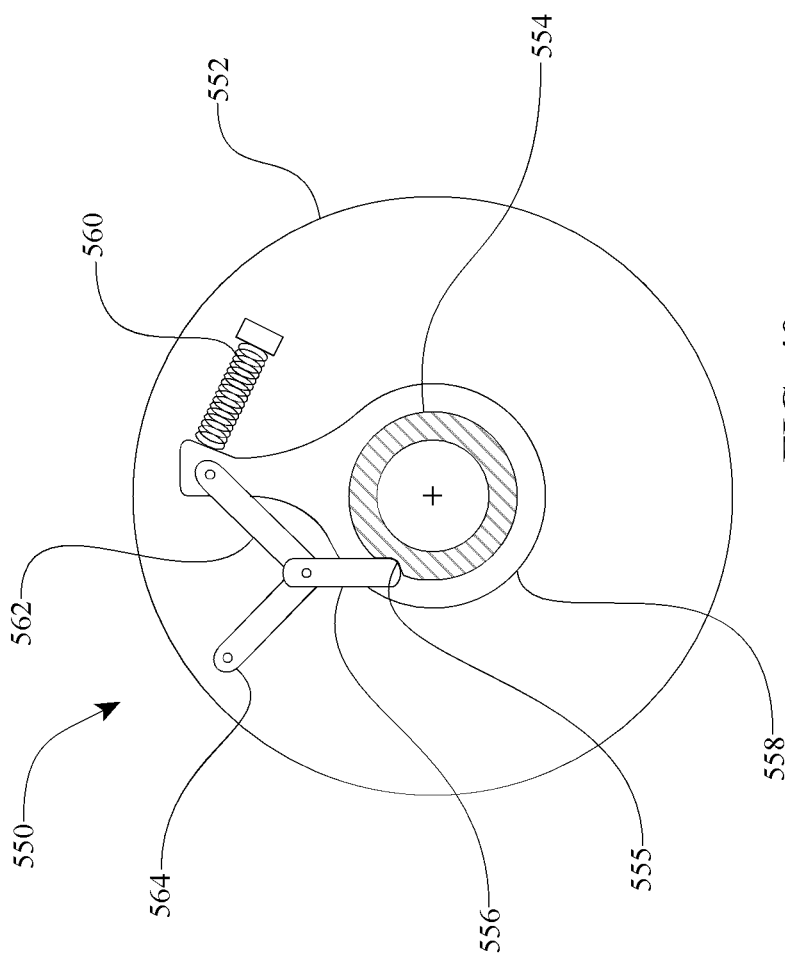
FIG. 40 is a schematic illustration of an embodiment of a shifting mechanism that can be used with a CVT having a skew-based control system.

Turning now to FIG. 40, in one embodiment a shifting mechanism 550 can include a stator 552 that is substantially similar to the stator 38. The shifting mechanism 550 is provided with a shift tube 554 that can be substantially similar to the shift tube 18. The shift tube 554 is arranged coaxial with the stator 552. In one embodiment, the shift tube 554 can be configured to couple to a push link 556. An interface 555 between the shift tube 554 and the push link 556 can be a pinned joint or other suitable coupling. The shifting mechanism 550 can be provided with a reaction arm 558 that is adapted to be substantially non-rotatable. The reaction arm 558 is coupled to the stator 552 via a spring 560. The shifting mechanism 550 is provided with a linkage 562 coupled to the push link 556 on a first end and coupled to the reaction arm 558 on a second end. Each end of the linkage 562 is configured to pivot. The shifting mechanism 550 can be provided with a linkage 564 coupled at a first end to the push link 556 and coupled at a second end to the stator 552. Each end of the linkage 564 is configured to pivot.

During operation, the stator 552 can be rotated to facilitate a change in a transmission ratio. The shift tube 554 can be rotated by a standard cable (not shown), which tends to move the push link 556. The movement of the push link 556 tends to displace the linkage 564 with respect to the linkage 562 in a scissor-like motion to thereby rotate the stator 552. A rotation of the stator 552 can also be facilitated by a change in a torque applied to the stator 552 during operation of a CVT. For example, the spring 560 couples the reaction arm 558 to the stator 552, therefore a change in torque applied to the stator 552 results in a displacement of the spring 560. A change in the displacement of the spring 560 corresponds to a rotation of the stator 552. Consequently, a desired operating torque for a CVT can be prescribed for a desired speed ratio by appropriately sizing and preloading the spring 560.

Figure 41:
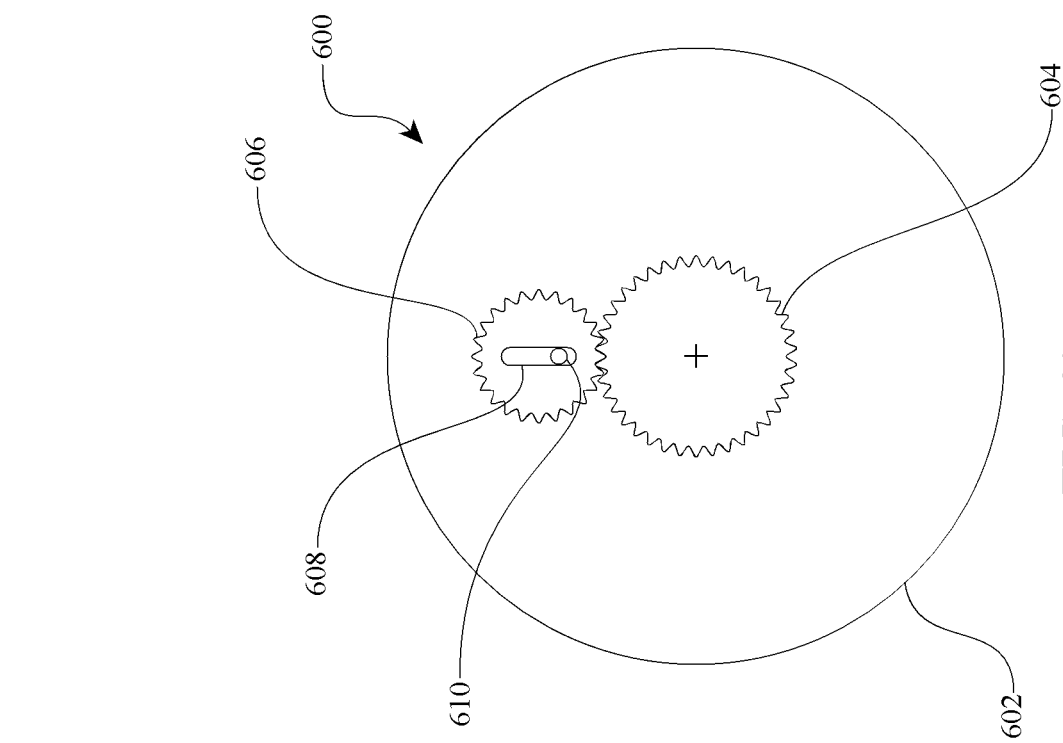
FIG. 41 is a schematic illustration of another embodiment of a shifting mechanism that can be used with a CVT having a skew-based control system.

Passing now to FIG. 41, in one embodiment a shifting mechanism 600 can include a stator 602 that is substantially similar to the stator 38. The shifting mechanism 600 can include a driver 604 adapted to cooperate with, for example, a pulley (not shown) or other suitable actuator. The driver 604 can be provided with gear teeth to engage a driven gear 606. The driven gear 606 has a slot 608 that is adapted to engage a pin 610. The pin 610 is attached to the stator 602. A rotation of the driver 604 tends to rotate the driven gear 606. The rotation of the driven gear 606 urges the pin 610 to rotate the stator 602. Consequently, the pin 610 slides in the slot 608.

Referring now to FIGS. 42 and 43, in one embodiment a CVT 620 can be provided with a shifting mechanism 621. The CVT 620 can be substantially similar to the CVT 10. For description purposes, only the differences between the CVT 620 and the CVT 10 will be discussed. The shifting mechanism 621 can have a shift tube 622 configured to carry a number of rollers 624. The shift tube 622 is adapted to translate axially. The rollers 624 engage a first helical groove 626 formed in a main shaft 628. The rollers 624 engage a second helical groove 630 formed in a first stator 632. In one embodiment, the first and second helical grooves 626, 630 are high lead. In some embodiments, the first and second helical grooves 626, 630 can be nearly axial grooves. The first stator 632 can be substantially similar to the stator 38. An axial translation of the shift tube 622 tends to move the rollers 624 in the helical grooves to thereby rotate the first stator 632 with respect to a second stator 634. In one embodiment, the first and second helical grooves 626, 630 have different leads so that at least a portion of the torque applied to the first stator 632 can be transferred to the main shaft 628 during operation of the CVT 620. In one embodiment, the main shaft 628 and the first and second stators 632, 634 are adapted to receive a power input and rotate about a longitudinal axis 636. In some embodiments, the shift tube 622 can be suitably coupled to an actuator (not shown) to facilitate the axial translation of the shift tube 622 along the main shaft 628.

Turning now to FIG. 44, in one embodiment the CVT 620 can be provided with a shift tube 640. The shift tube 640 can have a slot 642 adapted to couple to the rollers 624. The shift tube 640 can be configured to rotate about the main shaft 628. In one embodiment, the shift tube 640 can be coupled to a suitable actuator to facilitate a rotation of the shift tube 640. The rotation of the shift tube 640 tends to rotate the roller 624 to thereby facilitate a relative rotation between stators 634, 632.

Passing now to FIG. 45, in one embodiment a CVT 660 includes, among other things, first and second traction rings 661, 662 and an idler 663 in contact with a group of traction planet assemblies 664. The CVT 660 can be substantially similar to the CVT 10. For description purposes, only the differences between the CVT 660 and the CVT 10 will be discussed. The CVT 660 can be provided with a first stator 666 and a second stator 668 operably coupled to the traction planet assemblies 664. The first and second stators 666, 668 can be configured substantially similar to the stators 36, 38. In one embodiment, the CVT 660 can be provided with a well-known fly-ball governor. For description purposes, the fly-ball governor is depicted as a ball 670. In some embodiments, the fly-ball governor can include a spring adjustment and appropriate bearings (not shown). The fly-ball governor can include the ball 670 in contact with a stator driver 672 and a stator member 674. In one embodiment, the stators 666, 668 are adapted to receive an input power and rotate about the longitudinal axis LA. The ball 670 tends to radially displace proportional to the speed of the first and second stators 666, 668. A radial displacement of the ball 670 can correspond to an axial translation of the stator driver 672. The stator driver 672 can have a threaded interface with the second stator 668. An axial translation of the stator driver 672 facilitates a rotation of the second stator 668 with respect to the first stator 666. In an alternative embodiment, the fly-ball governor is configured to cooperate with the first traction ring 661 so that a change in the speed of the first traction ring 661 tends to rotate the first stator 666 with respect to the second stator 668. In some embodiments, the first traction ring 661 can be configured to receive an input power, and the second traction ring 662 can be configured to transfer an output power out of the CVT 660.

Referring now to FIGS. 46A and 46B, in one embodiment a CVT 700 includes, among other things, first and second traction rings 701, 702 and an idler 703 in contact with a group of traction planet assemblies 704. The traction planet assemblies 704 can be operably coupled to first and second stators 706, 708. In one embodiment, the first stator 706 can be coupled to a fly-ball governor 710. The fly-ball governor 710 can be configured to rotate the first stator 706 corresponding to a change in the rotational speed. The second stator 708 can be coupled to a spring member 712. In some embodiments, the first and second stators 706, 708 can be adapted to receive an input power. In one embodiment, the first traction ring 701 can be adapted to receive an input power. In other embodiments, a CVT 720 can be configured to include a fly-ball governor 722 coupled to a first traction ring 721 and a first stator 723. The first traction ring 721 and the first stator 723 can be substantially similar to the first traction ring 701 and the first stator 706, respectively. During operation of the CVT 700 or the CVT 720, the spring 712 can react a torque transferred from the second stator 708. The spring 712 can displace relative to the magnitude of the torque. The second stator 708 tends to rotate with respect to the first stator 706 corresponding to the displacement of the spring 712. Therefore, a desired operating torque for a CVT can be prescribed by appropriately sizing and preloading the spring 712. The combination of the fly-ball governor 710 or 722 with the spring 712 provides both speed control and torque control for the CVT 700 or 720, which is desirable in mobile ground vehicles, for example.

Passing now to FIG. 47, in one embodiment a control system 750 can be configured to cooperate with, for example, CVT 10 or any of the CVT embodiments disclosed here. The control system 750 can include a pump 752 in fluid communication with a flow control valve 754. The flow control valve 754 can have a coupling 756 adapted to rotate, for example, a stator 758. The flow control valve 754 can be in fluid communication with an orifice 760. The orifice 760 directs a fluid to a fluid reservoir 762. The fluid reservoir 762 can supply the fluid to the pump 752. In one embodiment, the orifice 760 is a fixed orifice. In some embodiments, the orifice 760 is a variable orifice. During operation, a transmission ratio can be adjusted and maintained using the flow control valve 754. A torque applied to the stator 758 can be reacted by the flow control valve 754 via the coupling 756. In alternative embodiments, the control system 750 can be configured to function as a torque limiter for the CVT 10 or any similar CVT having a skew-based control system.

Turning now to FIG. 48, in one embodiment a bicycle 800 can include the CVT 10, for example, coupled to a wheel 801 with spokes 802. The CVT 10 can be provided with a shift arm 804 that is adapted to operably couple to, for example, a shift tube 18. The bicycle 800 can include a drive chain 806 coupled to a well-known chain tensioner 808. The chain tensioner 808 can be coupled to the shift arm 804 via a turn buckle 810, for example. During operation of the bicycle 800, a user applies a force to the pedals 812 resulting in an oscillatory torque transmission to the chain 806. The oscillatory torque tends to tension and un-tension the chain 806, which causes the chain 806 to displace and move the chain tensioner 808. The movement of the chain tension 808 tends to rotate the shift arm 804.

Figure 49:
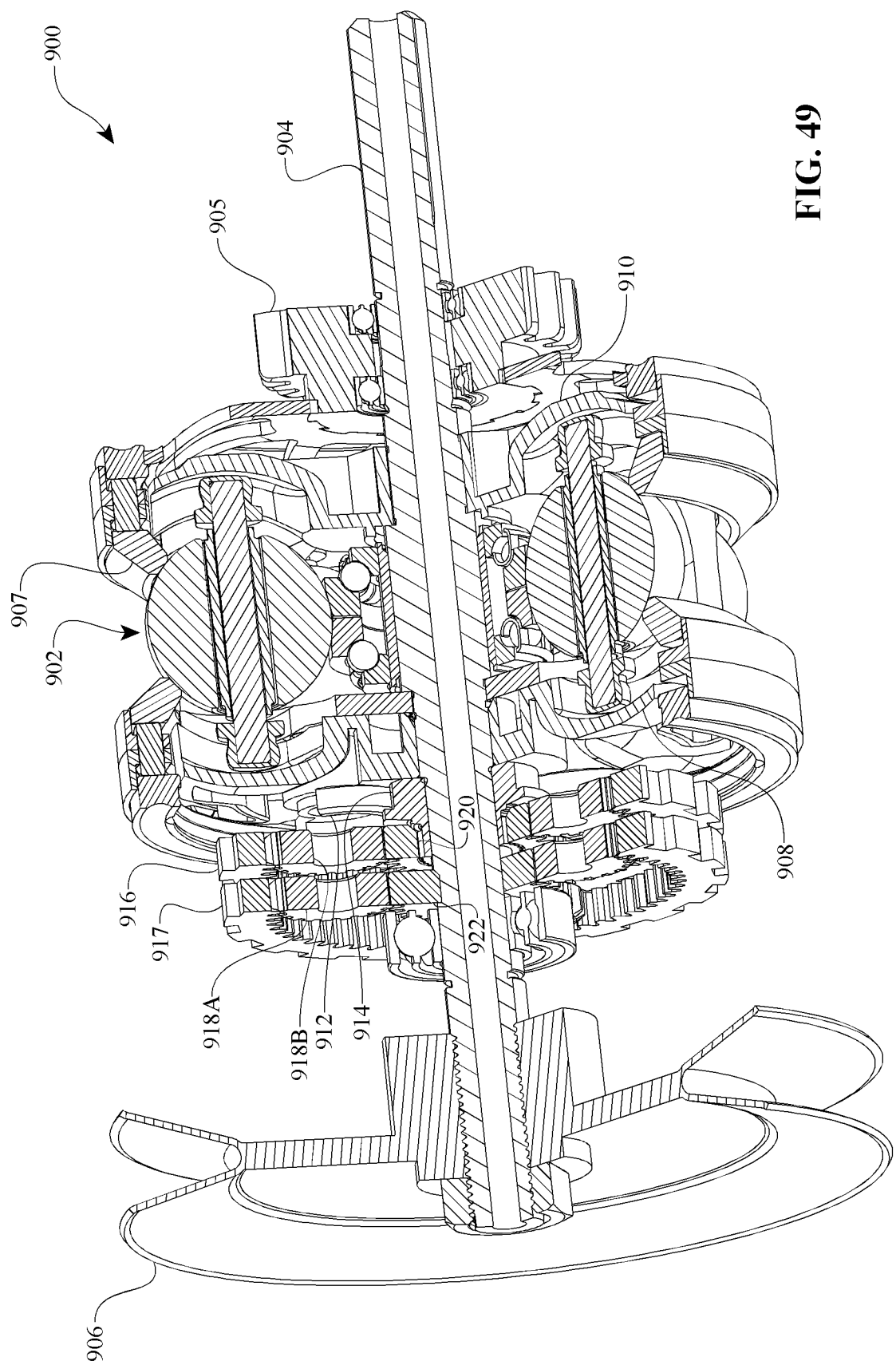
FIG. 49 is a partial, cross-sectional perspective view of an embodiment of a CVT employing a skew-based control system.
Figure 50:
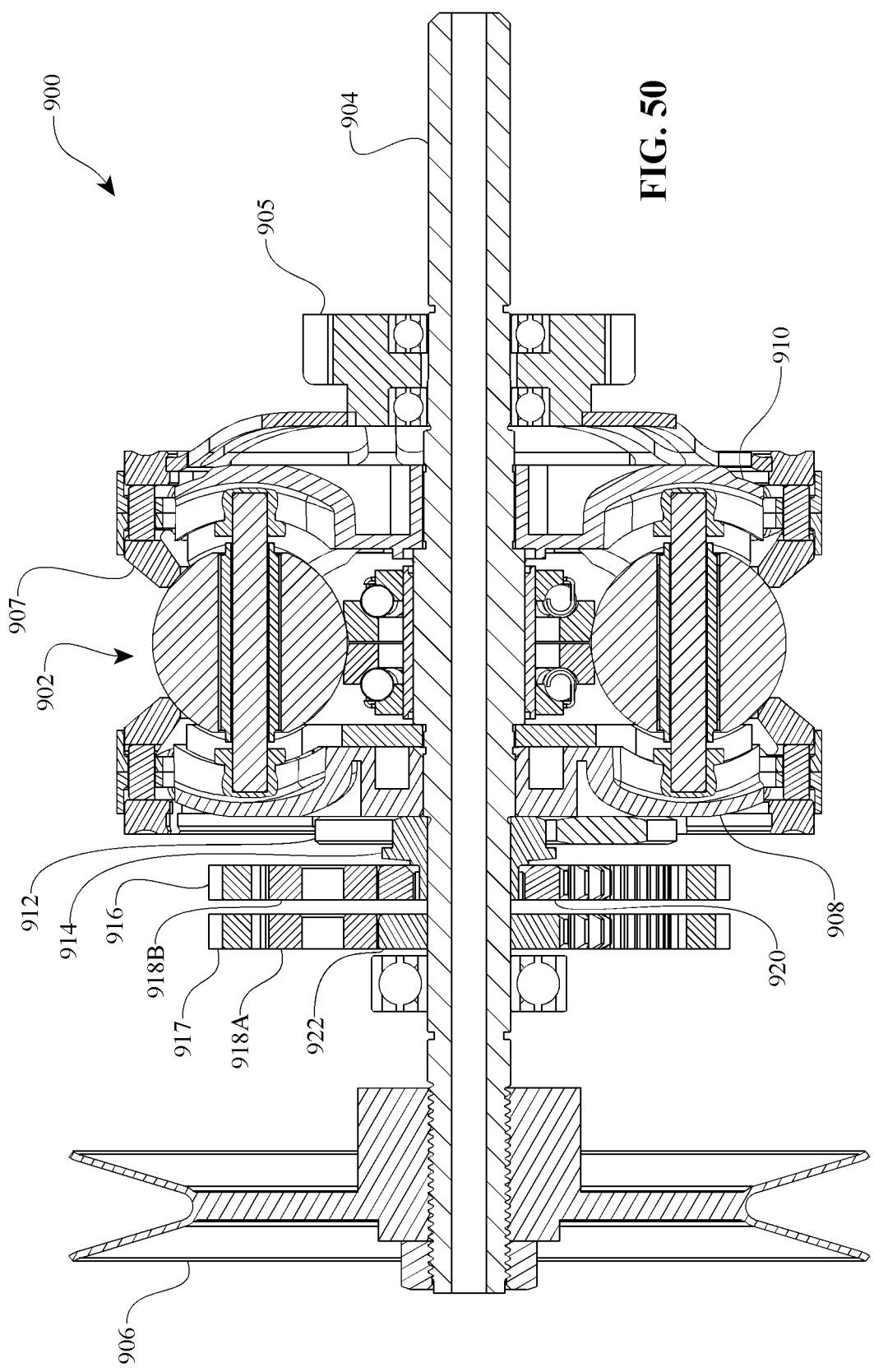
FIG. 50 is a cross-sectional view of the CVT of FIG. 49.

Passing now to FIGS. 49 and 50, in one embodiment a CVT 900 can have a number of traction planet assemblies 902 arranged radially about a main axle 904. The CVT 900 can be substantially similar to the CVT 140. For description purposes, only the differences between the CVT 900 and the CVT 140 will be discussed. In one embodiment, the CVT 900 is adapted to receive an input power with, for example, a pulley 906 or other suitable coupling. The pulley 906 can be coupled to the main axle 904. The CVT 900 can have an output gear 905 configured to transfer power from a traction ring 907. The traction ring 907 can be in contact with each of the traction planet assemblies 902. In one embodiment, the main axle 904 is coupled to a first stator 908 and a second stator 910. The first and second stators 908, 910 can be configured to support each of the traction planet assemblies 902. In one embodiment, the first and second stators 908, 910 are adapted to transfer the input power to the traction planet assemblies 902. The first and second stators 908, 910 are configured to rotate with the main axle 904. The first and second stators 908, 910 are adapted to rotate with respect to each other to induce a skew condition on the traction planet assemblies 902. The skew condition facilitates a change in transmission ratio of the CVT 900.

In one embodiment, the CVT 900 has a number of eccentric gears 912 coupled to the first stator 908. The eccentric gears 912 can be substantially similar to the eccentric gears 168. The eccentric gears 912 couple to a shift tube 914. The shift tube 914 can couple to a compound planetary gear set having a first ring gear 916 and a second ring gear 917, each ring gear 916, 917 coupled to a number of planet gears 918. The planet gears 918A, 918B share a common axle and are free to rotate with respect to each other. The shift tube 914 can couple to a first sun gear 920. In one embodiment, a second sun gear 922 can couple to the main axle 904. The first ring gear 916 is coupled to, for example, a non-rotatable housing (not shown). The second ring gear 917 can be coupled to a suitable actuator such as a motor (not shown). During operation of the CVT 900, a relative rotation between the first ring gear 916 and the second ring gear 917 tends to facilitate a relative rotation between the first stator 908 and the second stator 910.

Figure 51:
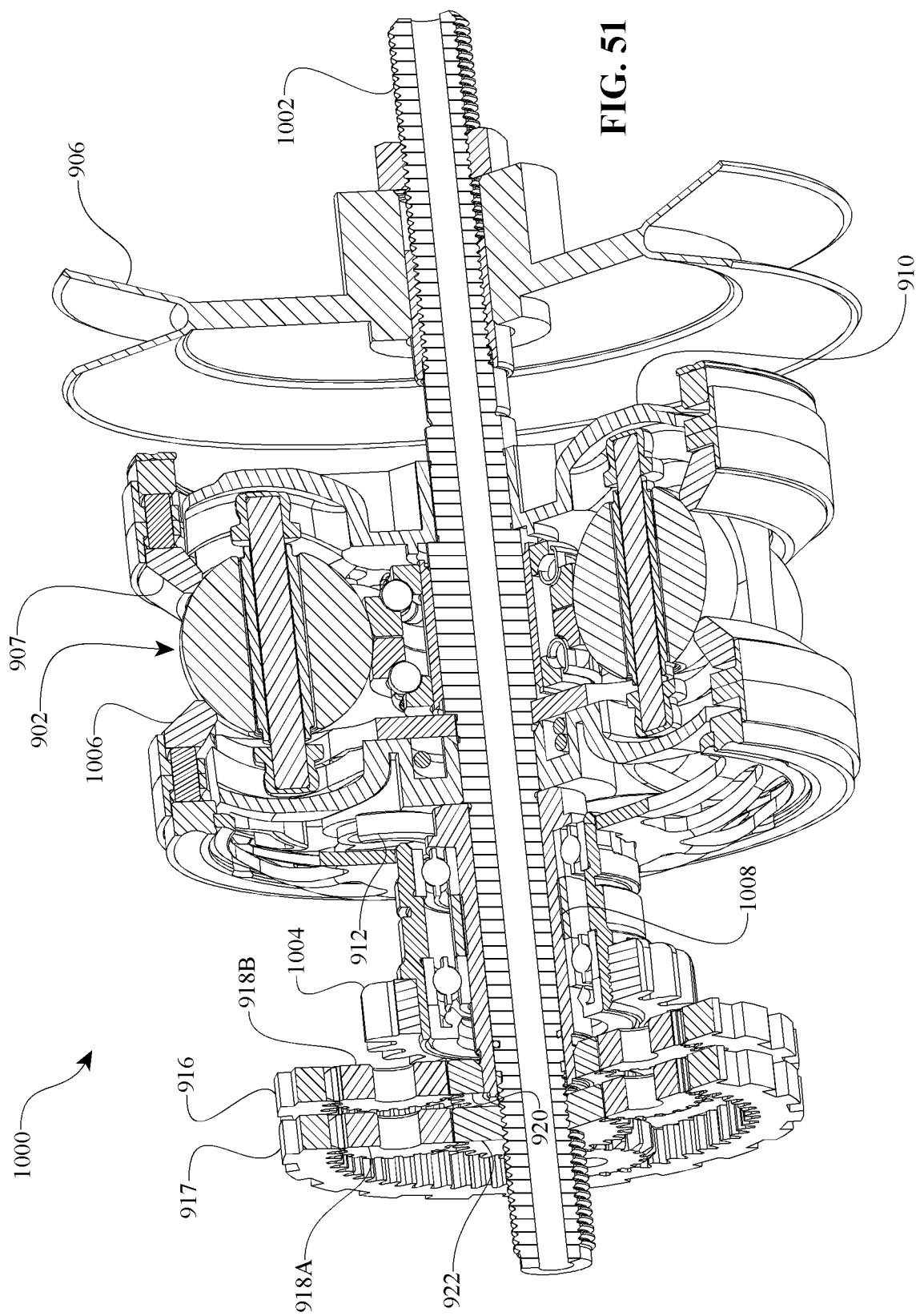
FIG. 51 is a partial, cross-sectional perspective view of another embodiment of a CVT employing a skew-based control system.
Figure 52:
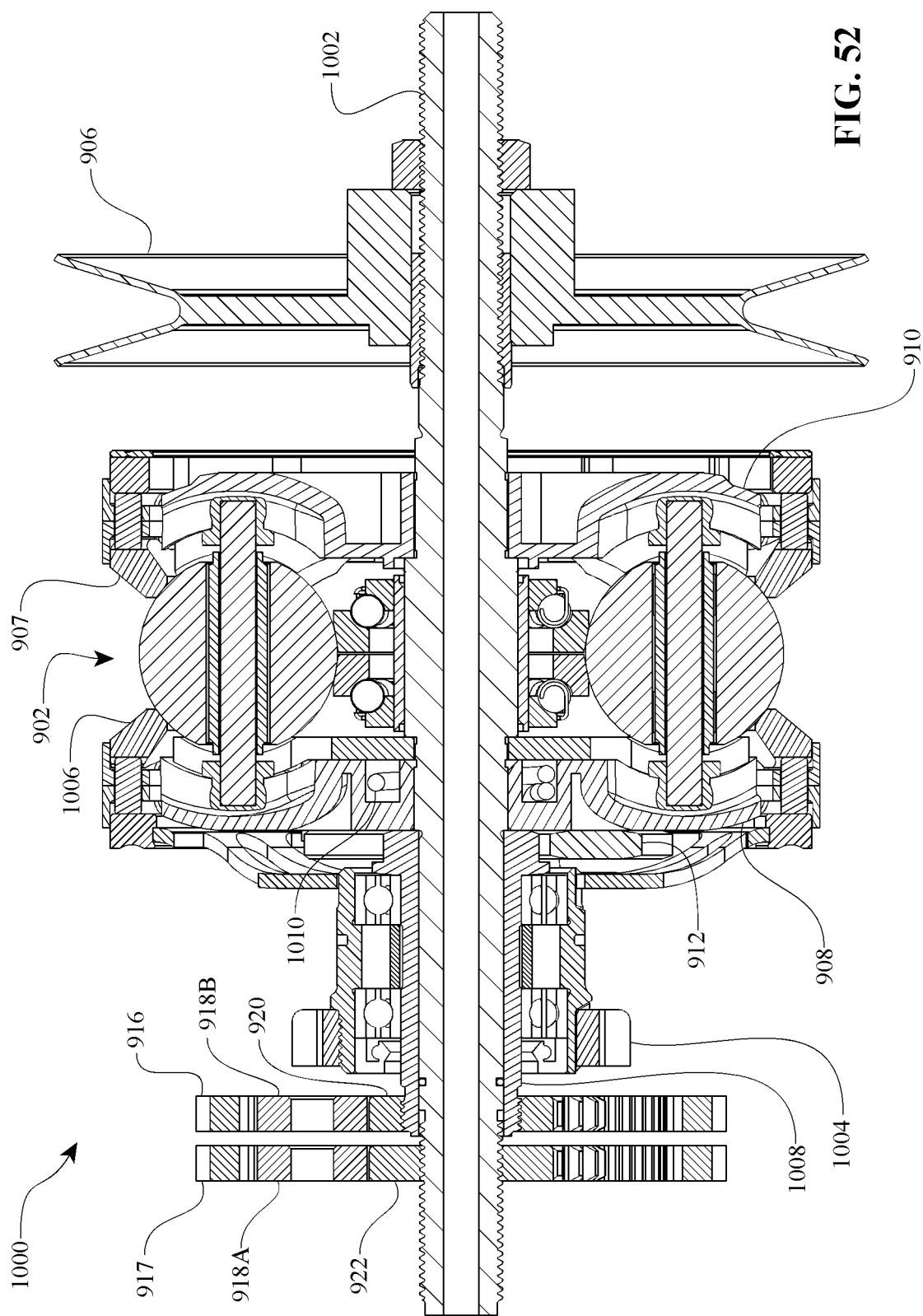
FIG. 52 is a cross-sectional view of the CVT of FIG. 51.
Figure 55:
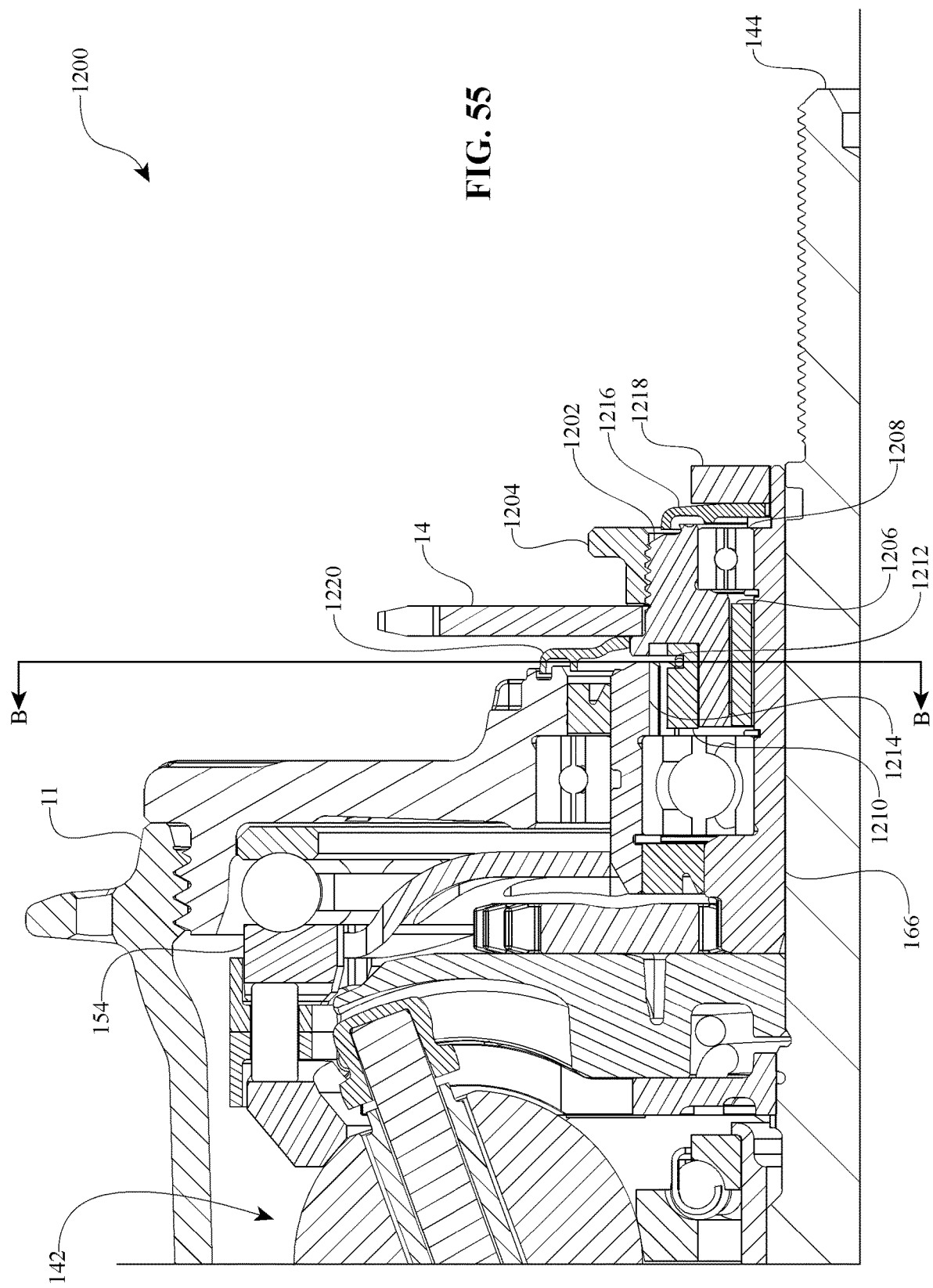
FIG. 55 is a partial cross-sectional view of a CVT having a skew-based control system and an internal freewheel mechanism.
Figure 56:
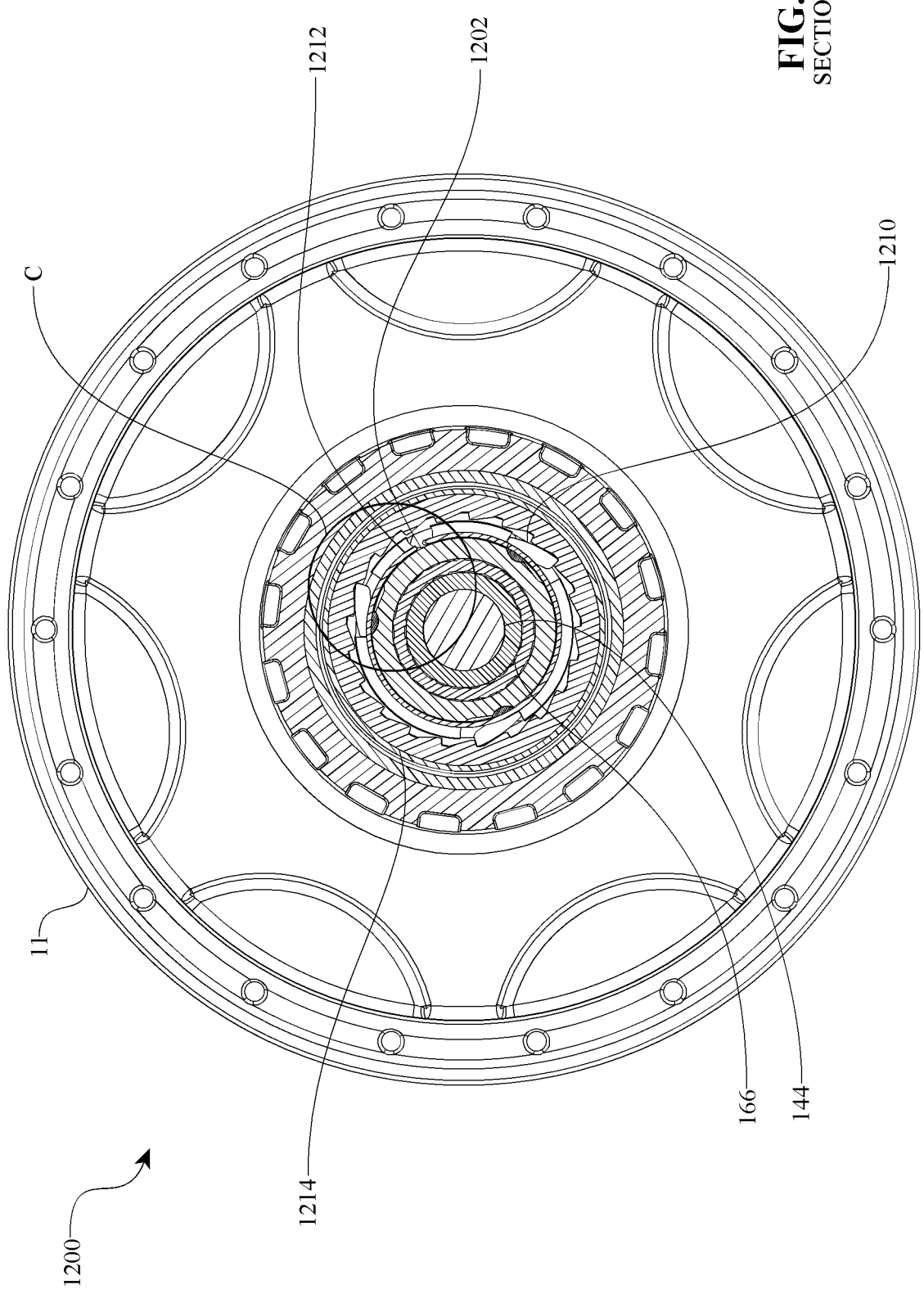
FIG. 56 is section view B-B of the CVT of FIG. 55.

Turning now to FIGS. 51 and 52, in one embodiment a CVT 1000 can be substantially similar to the CVT 900. For description purposes, only the differences between the CVT 1000 and the CVT 900 will be discussed. The CVT 1000 is configured to receive an input power from, for example, the pulley 906. The pulley 906 can be coupled to a main shaft 1002. In one embodiment, the first traction ring 907 is substantially non-rotatable about the main shaft 1002. The CVT 1000 can have an output gear 1004 configured to receive power from a second traction ring 1006. The output gear 1004 is coaxial with a shift tube 1008. The shift tube 1008 is coupled to the first stator 908. In one embodiment, the shift tube 1008 is coupled to the first sun gear 920. In some embodiments, the CVT 1000 can have a spring 1010 coupled to the first stator 908. During operation of the CVT 1000, a change in the transmission ratio is facilitated by a relative rotation between the first and second stators 908, 910. The first stator 908 can be rotated with respect to the second stator 910 via a rotation of the shift tube 1008. The shift tube 1008 is rotated during operation in a substantially similar manner as the shift tube 914 via the sun gear 920.

Passing now to FIG. 53, in one embodiment a CVT 1050 can be substantially similar to the CVT 1000. For description purposes, only the differences between the CVT 1000 and the CVT 1050 will be described. In one embodiment, the CVT 1050 includes a planetary gear set 1052 coupled to a first stator 1054 with, for example, a chain or a belt 1056. The planetary gear set 1052 can couple to a second stator 1058 with, for example, a chain or a belt 1060. The planetary gear set 1052 includes a first ring gear 1062 coupled to a number of planet gears 1064. The planet gears 1064 couple to a first sun gear 1066. In one embodiment, the first sun gear 1066 is substantially non-rotatable. The planetary gear set 1052 includes a second ring gear 1068 coupled to a number of planet gears 1070. The planet gears 1070 couple to a second sun gear 1072. The second sun gear 1072 can be coupled to a suitable actuator (not shown). The actuator can be adapted to rotate the second sun gear 1072 during operation of the CVT 1050. The planet gears 1064 and 1070 can be coupled to a carrier 1074. The carrier 1074 can be adapted to receive an input power 1076 (depicted as an arrow in FIG. 53).

Referring now to FIG. 54, in one embodiment a CVT 1100 can be substantially similar to the CVT 1000. For description purposes, only the differences between the CVT 1000 and the CVT 1100 will be described. In one embodiment, the CVT 1100 includes a first stator 1102 and a second stator 1104. The first stator 1102 can be coupled to an input shaft 1106 with a chain or belt 1108. The input shaft 1106 is adapted to receive an input power 1110 (depicted as an arrow in FIG. 54). In one embodiment, the second stator 1104 is configured to couple to a shift tube 1112 with a chain or a belt 1114. The shift tube 1112 is coupled to a shift tube driver 1116. The shift tube driver 1116 mates to the shift tube 1112 through a set of helical splines 1118. In one embodiment, the helical splines 1118 are high lead. The shift tube driver 1116 mates to the input shaft 1106 with a set of straight splines 1120. The shift tube driver 1116 can be configured to rotate and translate during operation of the CVT 1100. In one embodiment, the shift tube driver 1116 is configured to couple to an actuator shaft 1122. The actuator shaft 1122 can be substantially non-rotatable. The actuator shaft 1122 can be configured to linearly translate. The actuator shaft 1122 is supported on the shift tube driver 1116 with a number of bearings 1124.

Figure 58:
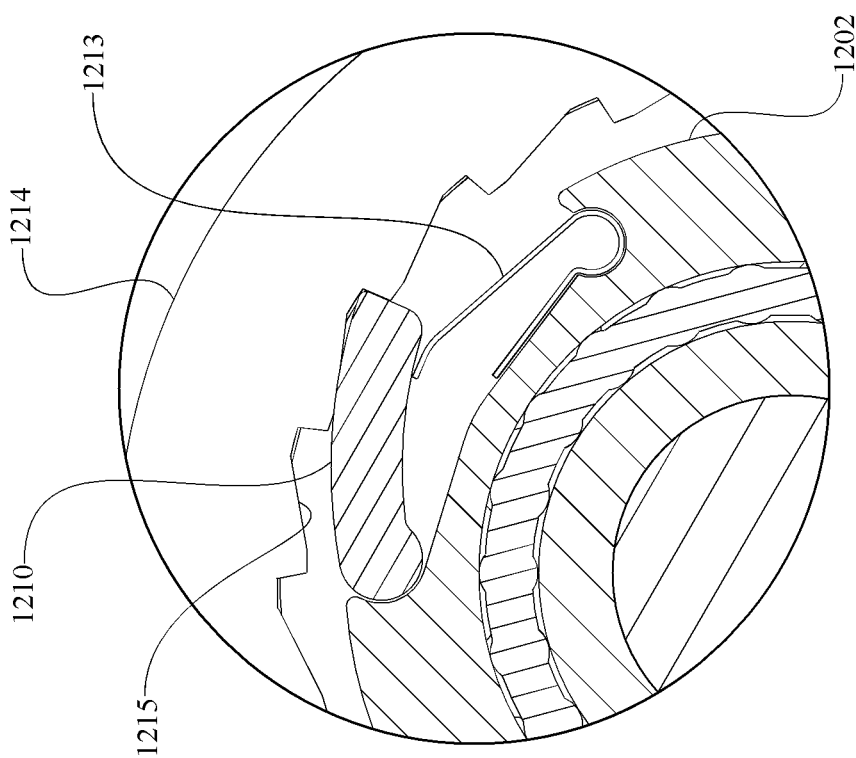
FIG. 58 is an alternative embodiment of a freewheel spring that can be used with the CVT of FIG. 55.
Figure 57:
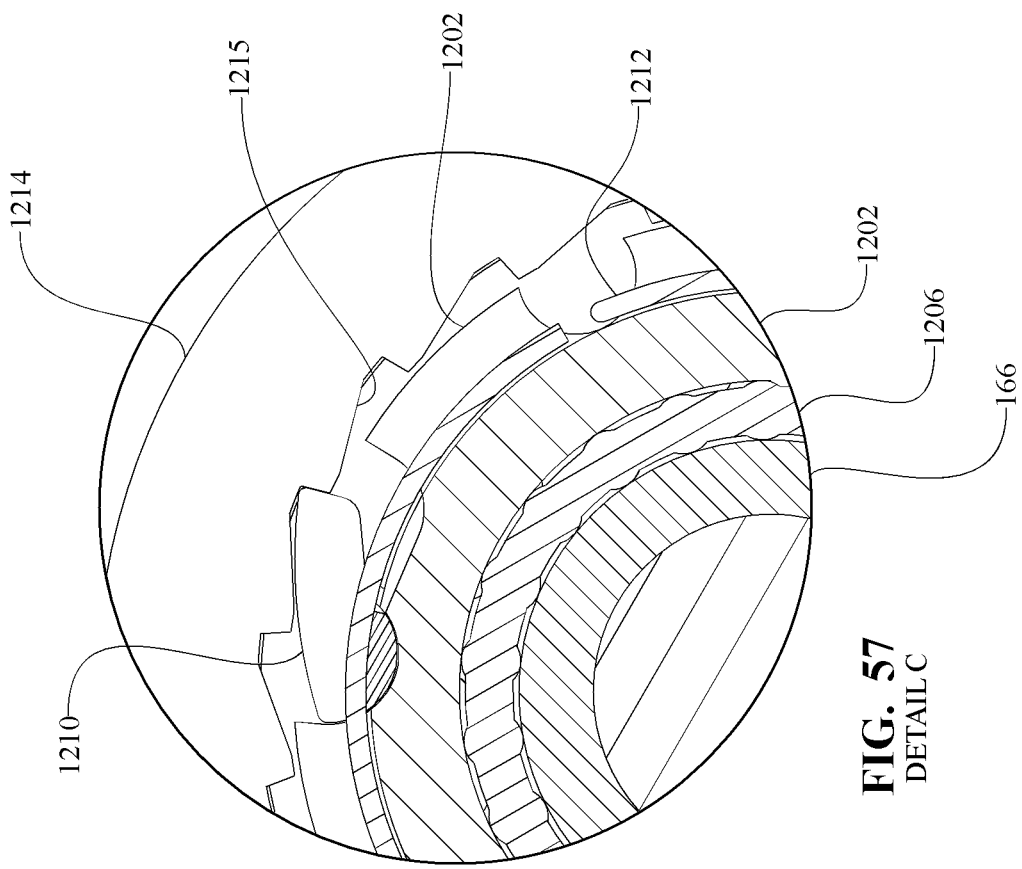
FIG. 57 is a detail view A of the CVT of FIG. 55.

Passing now to FIGS. 55-58, in one embodiment a CVT 1200 can be substantially similar to the CVT 1000. For description purposes, only the differences between the CVT 1000 and the CVT 1200 will be described. In one embodiment, the CVT 1200 is provided with a freewheel driver 1202 coupled to the sprocket 14. The sprocket 14 can be attached to the freewheel driver 1202 with a retaining nut 1204. The freewheel driver 1202 can be supported by a first bearing 1206 and a second bearing 1208. In one embodiment, the first bearing 1206 can be a needle roller bearing, for example. In some embodiments, the second bearing 1208 can be a ball bearing, for example. The first and second bearings 1206, 1208 can be adapted to couple to, for example, the stator driver 166. In one embodiment, the freewheel driver 1202 is adapted to cooperate with a number of pawls 1210. The pawls 1210 are coupled to a spring 1212. In one embodiment, the spring 1212 can be a torsion spring adapted to couple to each of the pawls 1210. In some embodiments, each of the pawls 1210 can be coupled to a spring element 1213 (FIG. 58). The spring elements 1213 can be retained in the freewheel driver 1202. The pawls 1210 are configured to selectively engage a torque driver 1214. The torque driver 1214 can have a number of teeth 1215 (FIG. 57). The teeth 1215 are configured to engage the pawls 1210. The torque driver 1214 can be operably coupled to the input driver ring 154, for example. In some embodiments, the CVT 1200 can be provided with a first dust cover 1216 positioned between the freewheel driver 1202 and, for example, a shift actuator pulley 1218. In some embodiments, the CVT 1200 can be provided with a second dust cover 1220 positioned between the sprocket 14 and the hub shell 11, for example.

During operation of the CVT 1200, an input torque is transmitted from the sprocket 14 to the freewheel driver 1202. The freewheel driver 1202 transmits torque in a first rotational direction to the torque driver 1214 via the pawls 1210. Under certain operating conditions, the torque driver 1214 can receive a torque from the driver ring 154 in a second rotational direction, which tends to disengage the pawls 1210 from the torque driver 1214 and prevents the transfer of the said torque to the freewheel driver 1202.

Figure 59:
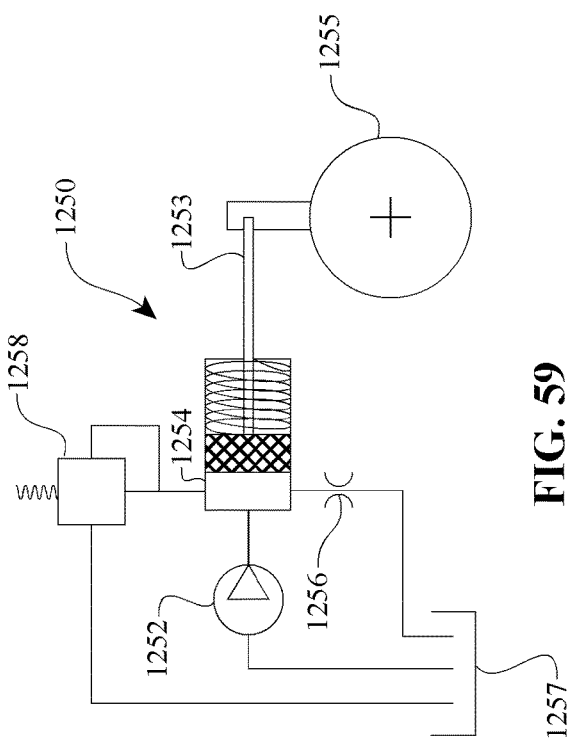
FIG. 59 is a schematic illustration of a hydraulic control system that can be used with a CVT having a skew-based control system.
Figure 63:
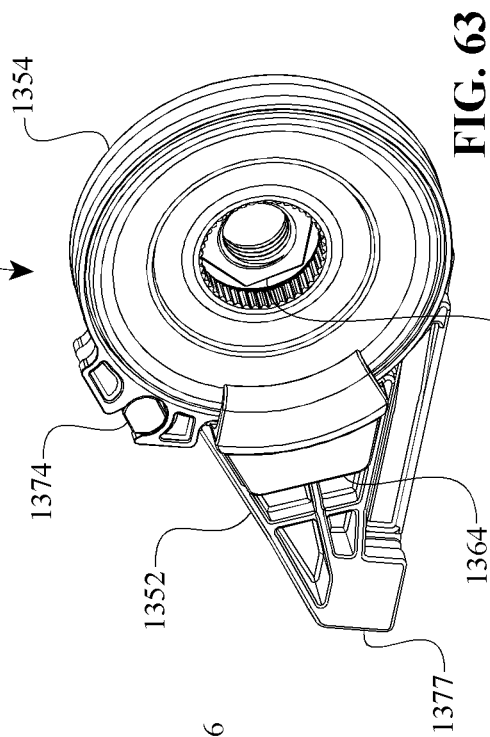
FIG. 63 is a perspective view of the shifting mechanism of FIG. 62.
Figure 62:
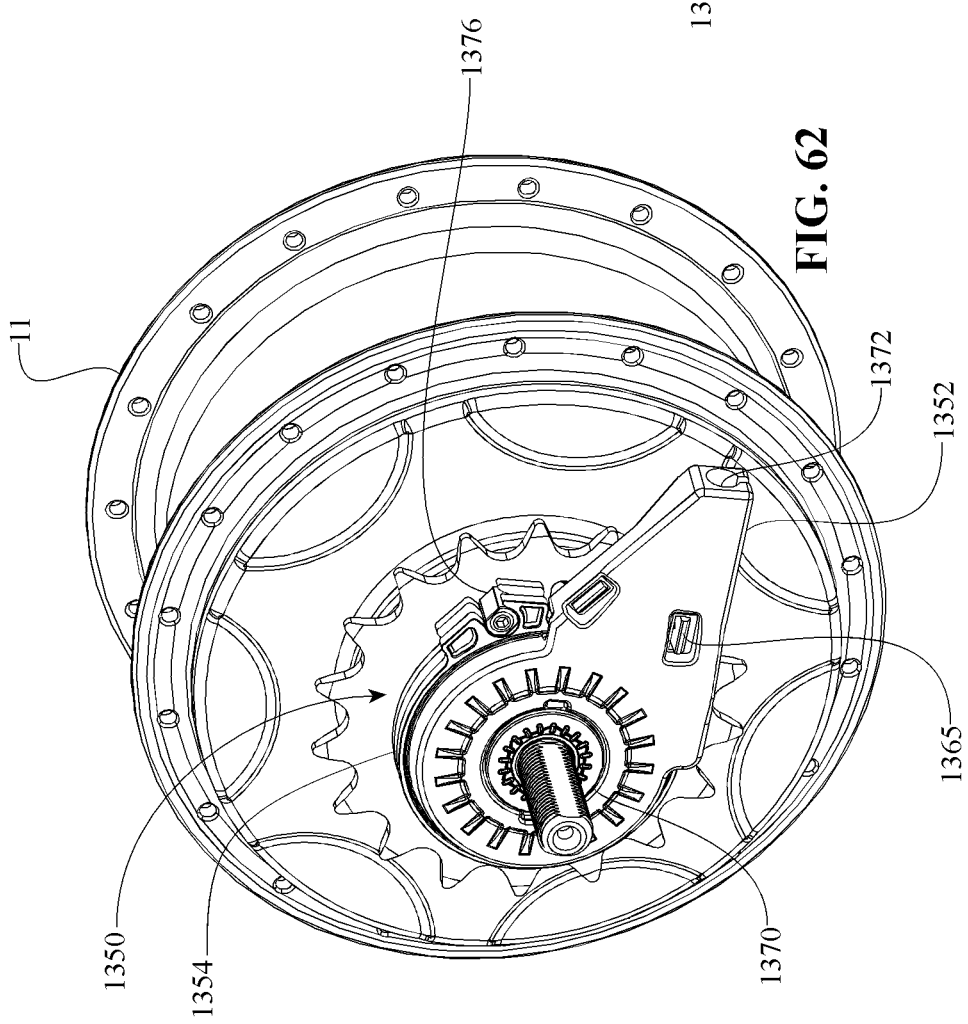
FIG. 62 is a perspective view of yet another embodiment of a shifting mechanism that can be used with the CVT of FIG. 1, 23, or 55 for example.
Figure 64:
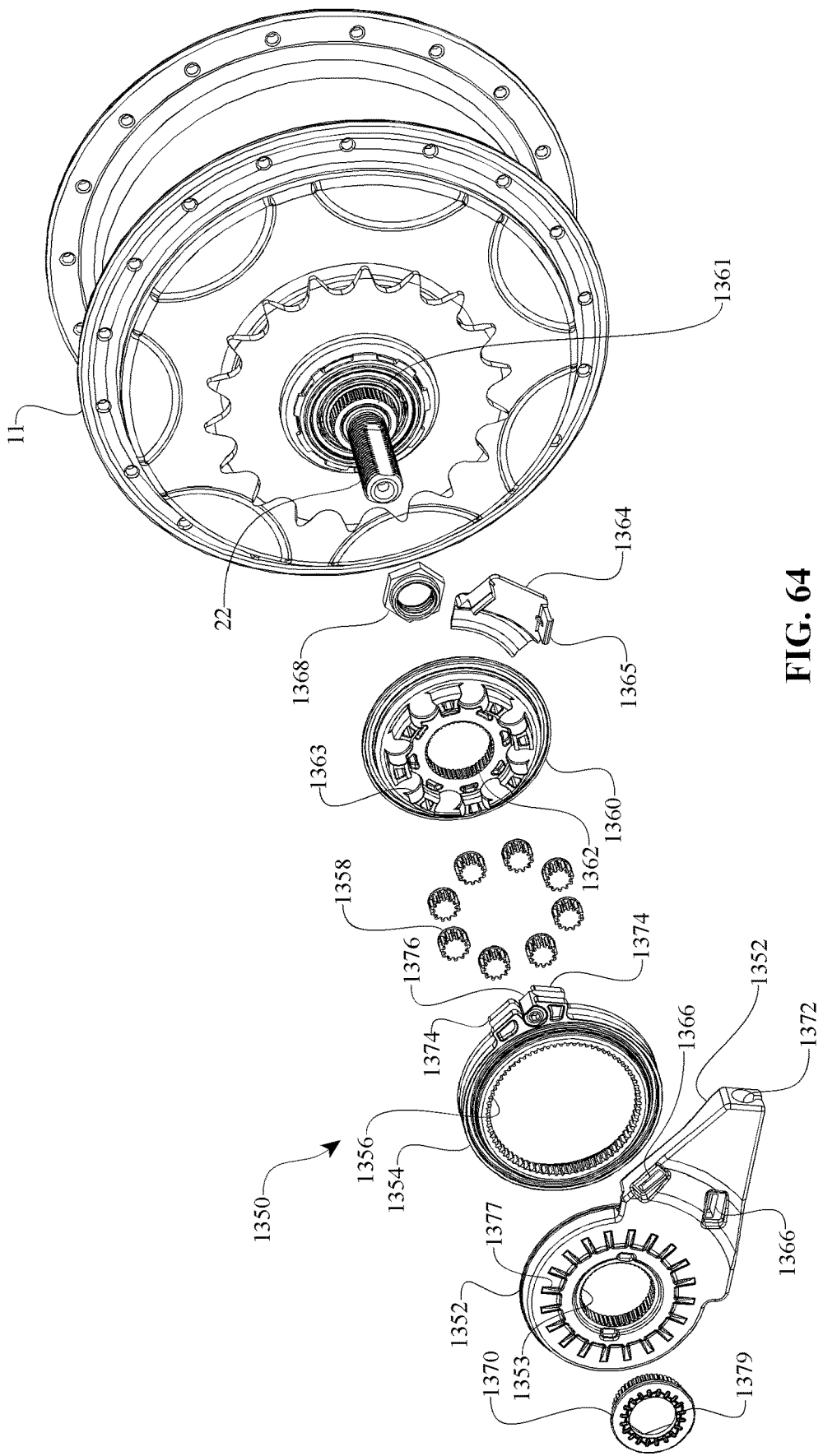
FIG. 64 is an exploded perspective view of the shifting mechanism of FIG. 62.

Turning now to FIG. 59, in one embodiment a control system 1250 can be configured to cooperate with, for example, the CVT 10 or any of the CVT embodiments disclosed here. The control system 1250 can include a pump 1252 in fluid communication with a flow control valve 1254. The flow control valve 1254 can have a coupling 1253 adapted to rotate, for example, a stator 1255. The flow control valve 1254 can be in fluid communication with an orifice 1256. The orifice 1256 directs a fluid to a fluid reservoir 1257. In one embodiment, the flow control valve 1254 can be configured to cooperate with a pressure control valve 1258. During operation of the control system 1250, the pressure control valve 1258 controls the operating pressure of the flow control valve 1254. An adjustment of the pressure control valve 1258 or the flow control valve 1254 tends to move the coupling 1253 thereby rotating the stator 1255 to facilitate a change in transmission ratio.

Figure 60:
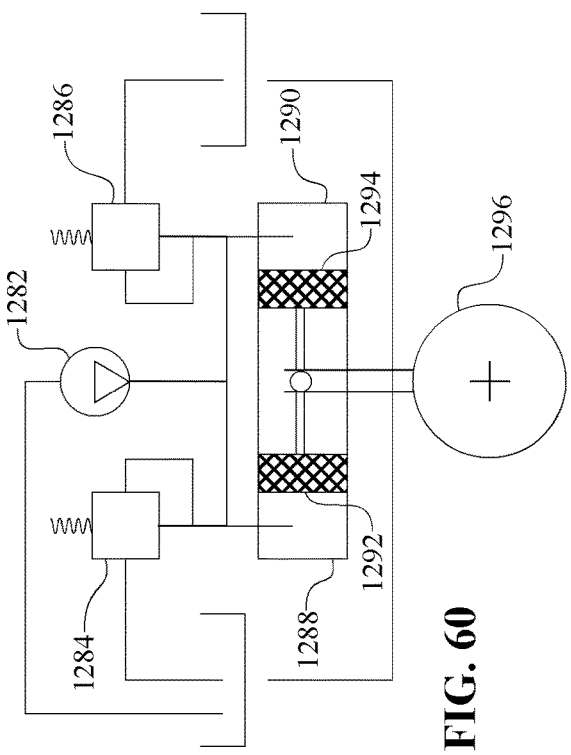
FIG. 60 is another schematic illustration of a hydraulic control system that can be used with a CVT having a skew-based control system.

Referring now to FIG. 60, in one embodiment a control system 1280 can be configured to cooperate with, for example, the CVT 10 or any of the CVT embodiments disclosed here. The control system 1280 can include a pump 1282 in fluid communication with a first pressure control valve 1284 and a second pressure control valve 1286. In one embodiment, the first and second pressure control valves 1284, 1286 can be in fluid communication with first and second pressure chambers 1288, 1290, respectively. The first and second pressure chambers 1288, 1290 are configured to act on first and second pistons 1292, 1294, respectively. The first and second pistons 1292, 1294 are coupled to, for example, a stator 1296. During operation of the control system 1280, fluid pressure in the pressure chambers 1288, 1290 can displace the pistons 1292, 1294 which tends to rotate the stator 1296 to facilitate a change in transmission ratio of the CVT 10, for example.

Figure 61:
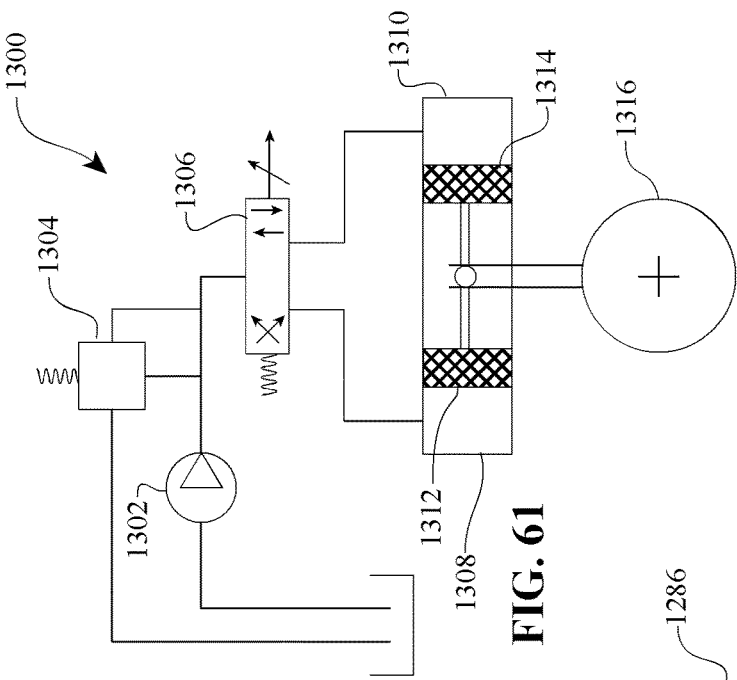
FIG. 61 is yet another schematic illustration of a hydraulic control system that can be used with a CVT having a skew-based control system.

Passing now to FIG. 61, in one embodiment a control system 1300 can be configured to cooperate with, for example, the CVT 10 or any of the CVT embodiments disclosed here. The control system 1300 can include a pump 1302 in fluid communication with a pressure control valve 1304. The pump 1302 can be in fluid communication with a directional control valve 1306. In one embodiment, the directional control valve 1306 is in fluid communication with first and second pressure chambers 1308, 1310. In some embodiments, the directional control valve 1306 is a servo controlled four way directional control valve. The first and second pressure chambers 1308, 1310 are configured to act on first and second pistons 1312, 1314, respectively. The first and second pistons 1312, 1314 are coupled to, for example, a stator 1316. During operation of the control system 1300, fluid pressure in the pressure chambers 1308, 1310 can displace the pistons 1312, 1314 which tends to rotate the stator 1316 to facilitate a change in transmission ratio of the CVT 10, for example. In some embodiments, the displacement of the pistons 1312, 1314 can be achieved by control of a position of the valve spool of the direction control valve 1306.

Referring now to FIGS. 62-65, in one embodiment a shifting mechanism 1350 can be coupled to the shift tube 18 of the CVT 10, for example. The shifting mechanism 1350 is provided with a generally non-rotatable housing 1352 having a splined bore 1353. The splined bore 1353 can be adapted to operably couple to the main axle 22, for example. The shifting mechanism 1350 is provided with a pulley 1354 that is rotatably disposed about the main axle 22. The pulley 1354 has a splined inner bore 1356. In one embodiment, the pulley 1354 is coupled to a number of planet gears 1358. The planet gears 1358 are arranged radially about the main axle 22. The planet gears 1358 couple to a cage 1360. The cage 1360 has a splined inner bore 1362 that is adapted to couple to a stator driver 1361. The stator driver 1361 can be substantially similar to the stator driver 166, for example. The cage 1360 has a number of planet pockets 1363 that are configured to receive the planet gears 1358. The plant pockets 1363 can be generally circular cut outs formed on the periphery of the cage 1360.

In one embodiment, the cage 1360 is coupled to the housing 1352 with a clip 1364. The clip 1364 can be formed with a number of tabs 1365 that are adapted to engage the housing 1352. In one embodiment, the tabs 1365 engage a number of slots 1366 formed on the housing 1352. Once assembled, the cage 1360 can rotate with respect to the housing 1352 while maintaining a consistent axial position with respect to the stator driver 1361. In one embodiment, the shifting mechanism 1350 is provided with an axle nut 1368. The axle nut 1368 is adapted to couple to the main axle 22. In one embodiment, the shifting mechanism 1350 is provided with a locking nut 1370 adapted to couple to the splined bore 1356 of the housing 1352. The locking nut 1370 is adapted to attach to the axle nut 1368. For example, the axle nut 1368 can be provided with a number of flat surfaces arranged about the periphery of the body, and the locking nut 1370 can be provided with a number of mating female surfaces formed about the inner bore of the locking nut 1370. Once assembled, the locking nut 1370 facilitates the alignment of the housing 1352, and consequently the shifting mechanism 1350, with respect to the stator driver 1361 and the CVT 10, for example. The housing 1352 has a number of timing markings 1377 that align upon assembly with a number of index markings 1379 on the locking nut 1370. Once an orientation between the bike frame dropout slots and the directional requirement for the cable location on the bike frame is established, the indexing markings 1379 can be used to maintain the orientation upon removal and re-installation of the wheel.

Referring still to FIGS. 62-65, in one embodiment the housing 1352 is provided with a cable housing stop 1372. The cable housing stop 1372 extends from the body of the housing 1352 and is configured to facilitate the alignment and the coupling of a standard bicycle control cable, for example, with the pulley 1354. The pulley 1354 is provided with cable end retention tabs 1374. The cable end retention tabs 1374 are configured to receive a cable end 1376. The cable end 1376 can be attached to one end of the standard bicycle control cable with a screw, for example.

Figure 65:
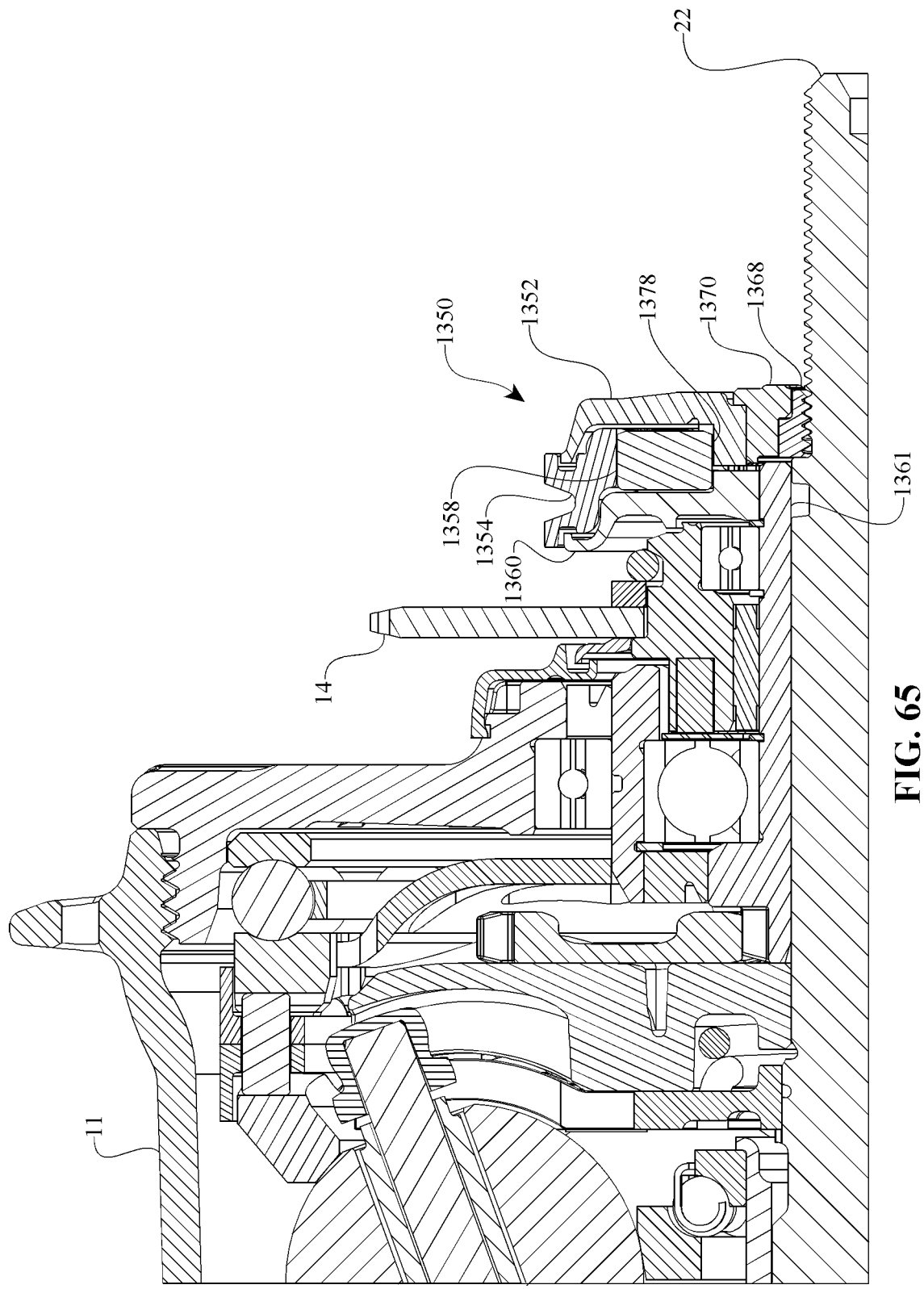
FIG. 65 is a partial cross-section view of the shifting mechanism and CVT of FIG. 62.

During operation of the CVT 10, for example, a change in ratio of the CVT 10 can be attained by tensioning a standard bicycle control cable (not shown) to thereby facilitate a rotation of the pulley 1354 with respect to the housing 1350. The rotation of the pulley 1354 tends to rotate the planet gears 1358 about a sun gear 1378. In one embodiment, the sun gear 1378 is formed integral to the housing 1352 (FIG. 65). The rotation of the planet gears 1358 tends to rotate the cage 1360 to thereby rotate the stator driver 1361. It should be noted that this configuration provides a mechanical advantage for transferring torque to the stator driver 1361 and thereby reduces the effort for shifting the CVT 10.

Figure 66:
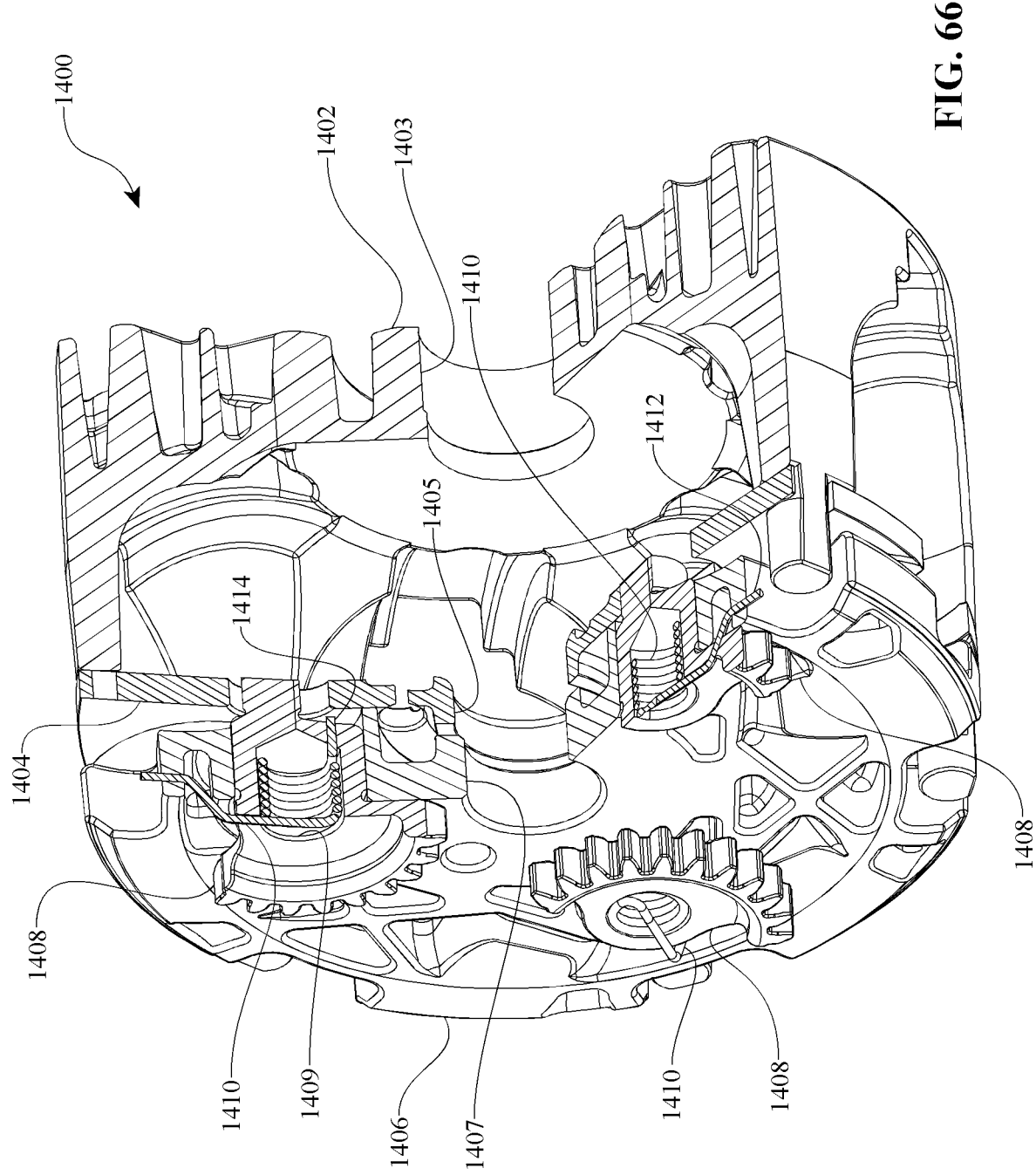
FIG. 66 is a partial cross-section perspective view of a traction planet carrier assembly that can be used with the CVT of FIG. 1, 23, 55, or 62 for example.

Turning now to FIG. 66, in one embodiment a traction planet carrier assembly 1400 can be used with any of the CVT embodiments disclosed here. The traction planet carrier assembly 1400 can include a first stator 1402 adapted to support the traction planets 30, for example. The first stator 1402 couples to a reaction plate 1404. The reaction plate 1404 is coaxial with the first stator 1402. The first stator 1402 operably couples to a skew stator 1406. The skew stator 1406 is coaxial with the first stator 1402 and the reaction plate 1404. The skew stator 1406 is adapted to rotate with respect to the first stator 1402 and the reaction plate 1404. In one embodiment, the first stator 1402, the reaction plate 1404, and the skew stator 1406 are substantially similar to the first stator 160, the reaction plate 162, and the second stator 164, respectively. This first stator 1402 is provided with an inner bore 1403 that is adapted to receive, for example, the main axle 144. The reaction plate 1404 is provided with an inner bore 1405 that is adapted to receive, for example, the main axle 144. The skew stator 1406 is provided with an inner bore 1407 that is adapted to receive, for example, the main axle 144.

Still referring to FIG. 66, in one embodiment the skew stator 1406 is adapted to support a number of eccentric gears 1408. The eccentric gears 1408 can be coupled to the stator driver 166, for example. Each of the eccentric gears 1408 includes a pocket 1409 adapted to house to a spring 1410. The spring 1410 has a first end 1412 adapted to couple to the skew stator 1406. The spring 1410 has a second end 1414 adapted to couple to the eccentric gear 1408. During operation of the CVT, a change in transmission ratio can be achieved by rotating the skew stator 1406 with respect to the first stator 1402. The rotation of the skew stator 1406 can be achieved by rotating the eccentric gears 1408. The eccentric gears 1408 couple to the skew stator 1406 in a substantially similar way as the eccentric gears 148 are coupled to the second stator 164. In one embodiment, the springs 1410 apply force to the eccentric gears 1408 that tend to move the skew stator 1406 to a position corresponding to an underdrive transmission ratio. In one embodiment, the springs 1410 can be sized to provide a force capable of overcoming friction forces in the CVT and in the shifting components.

Figure 69:
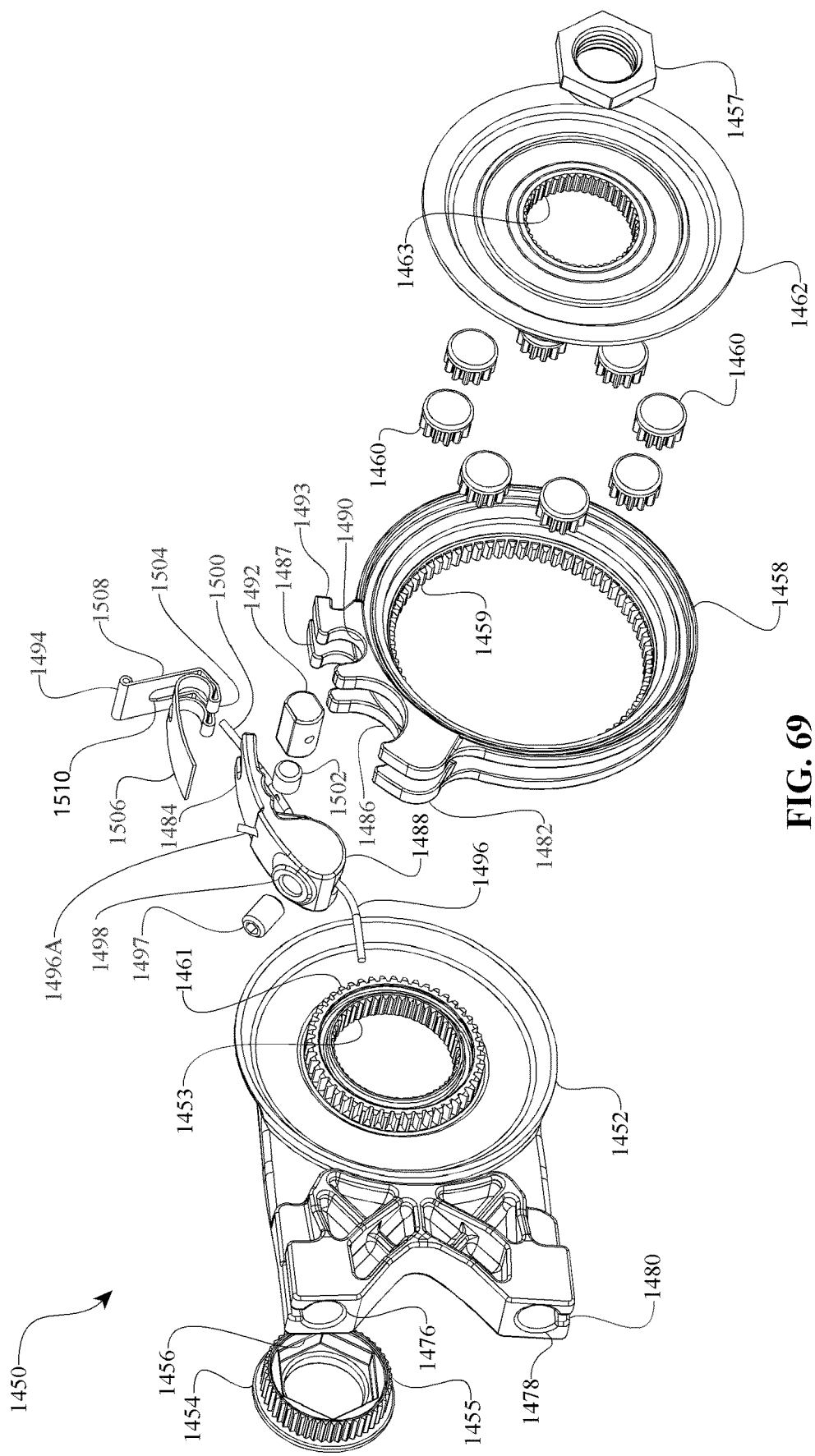
FIG. 69 is an exploded, perspective view of the shifting mechanism of FIG. 67.

Turning now to FIGS. 67-69, in one embodiment a shifting mechanism 1450 can be coupled to the shift tube 18 of the CVT 10, for example. The shifting mechanism 1450 can be provided with a generally non-rotatable housing 1452 having a splined inner bore 1453. The splined inner bore 1453 is adapted to couple to a locking nut 1454. The locking nut 1454 is provided with a mating splined circumference 1455. The locking nut 1454 is provided with a number of reaction faces 1456 that are configured to engage an axle nut 1457. The axle nut 1457 couples to the main axle 22, for example, with threads. In one embodiment, the shifting mechanism 1450 includes a pulley 1458 operably coupled to the housing 1452. The pulley 1458 is rotatable with respect to the housing 1452. The pulley 1458 has a geared inner bore 1459 adapted to couple to a number of planet gears 1460. The planet gears 1460 are supported in a cage 1462. The cage 1462 is substantially similar to the cage 1360. The planet gears 1460 couple to a sun gear 1461 formed around the splined inner bore 1453 of the housing 1452. In one embodiment, the cage 1462 has a splined inner bore 1463 that can be coupled to a stator driver such as the stator driver 1361, for example. The shifting mechanism 1450 can include a retainer clip 1464 that couples to the pulley 1458.

Referring again to FIG. 67, in one embodiment the housing 1452 can have a front face 1470 and a back face 1472. Typically, the back face 1472 is arranged in proximity to the hub shell 11, for example, so that the front face 1470 is in view when the shifting mechanism 1450 is assembled on the CVT 10. The front face 1472 can be provided with a number of notches 1474 formed radially about the inner bore 1453. The front face 1474 can be provided with a set of recesses 1475 flanking the inner bore 1453. The recesses 1475 can be adapted to receive a tool, such as a screw driver, for removing the locking nut 1454. In one embodiment, the housing 1452 can be provided with a first cable housing stop 1476 arranged between the front face 1470 and the back face 1472. The housing 1452 can be provided with a second cable housing stop 1478 arranged between the front face 1470 and the back face 1472. In one embodiment, the first cable housing stop 1476 is generally parallel to the second cable housing stop 1478. The first and second cable housing stops 1476, 1478 are each provided with slots 1480. The slots 1480 facilitate the assembly of a standard bicycle control cable to the housing 1452.

In one embodiment, the pulley 1458 is provided with a tab 1482 extending from the periphery of the pulley 1458. The tab 1482 is adapted to couple to a cable retainer cap 1484. The tab 1482 can have a first cut-out 1486 that is adapted to receive a curved portion 1488 of the cable retainer cap 1484. The tab 1482 can be provided with a second cut-out 1490 that is adapted to receive a cable end stop 1492. The tab 1482 can be formed with a slot 1487. The slot 1487 facilitates the coupling of the first and second cables 1496, 1500 to the pulley 1458. The cable retainer cap 1484 can be attached to the tab 1482 with a clip 1494. The cable retainer cap 1484 is adapted to receive a first cable 1496. The first cable 1496 is partially shown in FIGS. 67-70. The first cable 1496 is attached to the cable retainer cap 1484 with a set screw 1497, for example. The set screw 1497 threads into a hole 1498. The set screw 1497 pinches the first cable 1496 against the cable retainer cap 1484 (FIG. 70). An end 1496A of the first cable 1496 can extend past the cable retainer cap 1484. Typically the end 1496A is cut closely to the cable retainer cap 1484. In one embodiment, a set screw 1502 is adapted to partially secure a second cable 1500 to the cable retainer cap 1484. The cable retainer cap 1484 is provided with internal channels for the first and second cables 1496, 1500. For clarity purposes, only a portion of the second cable 1500 is shown in FIGS. 67-69. The first cable 1496 can wrap around the pulley 1458 and exit the shifting mechanism 1450 at the first cable housing stop 1476. The second cable 1500 can wrap around the pulley 1458 and exit the shifting mechanism 1450 at the second cable housing stop 1478.

In one embodiment, the clip 1494 is a generally spring like member having a bend 1504 adapted to couple to a lip 1493 formed on the tab 1482. The clip 1494 is provided with a first extension 1506 that extends from the bend 1504 and is configured to generally cover a portion of the cable retainer cap 1484. The clip 1494 is provided with a second extension 1508 that extends from the bend 1504 and is adapted to provide a means for removing or assembling the clip 1494. The clip 1494 can be provided with a slot 1510 to provided clearance for the second cable 1500.

Once assembled, a force can be applied to the first cable 1496 that tends to facilitate a rotation of the pulley 1458 in a first direction, and consequently a change in ratio of the CVT, for example, from an underdrive ratio towards an overdrive ratio. A force can be applied to the second cable 1500 that tends to facilitate a rotation of the pulley 1458 is a second direction, and consequently a change in ratio of the CVT, for example from an overdrive ratio towards an underdrive ratio.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as any one claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A system for controlling skew in a ball planetary continuously variable transmission (CVT) having a plurality of traction planets distributed radially about a main axle defining a longitudinal axis, each traction planet rotatable about an axle defining a tiltable axis, a first traction ring and a second traction ring in contact with the traction planets, the plurality of traction planets interposed between the first traction ring and the second traction ring, and an idler assembly positioned radially inward of and in contact with each of the traction planets, the system comprising:
    a first stator having a plurality of radial guide slots for engaging a first end of each planet axle;
    a second stator having a plurality of radially offset guide slots for engaging a second end of each planet axle, the plurality of radially offset slots formed at an angle relative to the plurality of radial guide slots;
    a stator driver assembly coupled to the first stator, wherein the stator driver assembly comprises a compound planocentric gear set, and wherein the stator driver assembly is configured to rotate the first stator relative to the second stator; and
    a timing plate for engagement with one of the first end or the second end of each planet axle.

2. The system of claim 1, wherein the plurality of radially offset guide slots are formed at an angle between 3 and 45 degrees relative to a radial construction line.

3. The system of claim 2, wherein the plurality of radially offset guide slots are formed at an angle between 3 and 20 degrees.

4. The system of claim 1, wherein the idler assembly comprises first and second rolling elements.

5. The system of claim 1, wherein the compound planocentric gear set comprises a fixed ring, an output ring, and a compound orbital planet gear.

6. The system of claim 5, further comprising a shifting mechanism coupled to the stator driver, the shifting mechanism comprising an eccentric driver having an eccentric lobe surface that is configured to engage an inner bore of the compound orbital planet gear.

7. The system of claim 5, wherein the compound orbital planet gear comprises a first gear and a second gear, wherein the first gear couples to the fixed ring, and wherein the second gear couples to the output ring.

8. The system of claim 6, wherein the stator driver assembly is configured to provide a ratio of 0.01 to 0.05 turns of the compound orbital planet gear to about one turn of the eccentric driver, and wherein a positive rotation of the eccentric driver can result in either a clockwise or a counterclockwise rotation of the output ring gear.

9. The system of claim 8, wherein the ratio range comprises 0.01 to 0.05 turns of the output ring gear to one turn of the eccentric driver.

10. The system of claim 1, wherein the timing plate comprises grooves.

11. A ball planetary continuously variable transmission (CVT) comprising:
- a plurality of traction planets distributed radially about a main axle defining a longitudinal axis, each traction planet rotatable about an axle defining a liftable axis;
- a first traction ring and a second traction ring in contact with the plurality of traction planets, the plurality of traction planets interposed between the first traction ring and the second traction ring;
- an idler assembly positioned radially inward of and in contact with each of the plurality of traction planets; and
- a control system comprising
  - a first stator having a plurality of radial guide slots for engaging a first end of each planet axle,
  - a second stator having a plurality of radially offset guide slots for engaging a second end of each planet axle, the plurality of radially offset slots formed at an angle relative to the plurality of radial guide slots,
  - a stator driver assembly coupled to the first stator, wherein the stator driver assembly is configured to rotate the first stator relative to the second stator, and
  - a timing plate for engagement with one of the first end or the second end of each planet axle.

12. The CVT of claim 11, wherein the plurality of radially offset guide slots are formed at an angle between 3 and 45 degrees relative to a radial construction line.

13. The CVT of claim 12, wherein the plurality of radially offset guide slots are formed at an angle between 3 and 20 degrees.

14. The CVT of claim 11, wherein the idler assembly comprises first and second rolling elements.

15. The CVT of claim 11, wherein the stator driver assembly comprises a compound planocentric gear set, and wherein the compound planocentric gear set comprises a fixed ring, an output ring, and a compound orbital planet gear.

16. The CVT of claim 15, further comprising a shifting mechanism coupled to the stator driver, the shifting mechanism comprising an eccentric driver having an eccentric lobe surface that is configured to engage an inner bore of the compound orbital planet gear.

17. The CVT of claim 15, wherein the compound orbital planet gear comprises a first gear and a second gear, and wherein the first gear couples to the fixed ring, and wherein the second gear couples to the output ring.

18. The CVT of claim 16, wherein the stator driver assembly is configured to provide a ratio of 0.01 to 0.05 turns of the compound orbital planet gear to about one turn of the eccentric driver, and wherein a positive rotation of the eccentric driver can result in either a clockwise or a counterclockwise rotation of the output ring gear.

19. The CVT of claim 18, wherein the ratio range comprises 0.01 to 0.05 turns of the output ring gear to one turn of the eccentric driver.

20. The CVT of claim 11, wherein the timing plate comprises grooves.

* * * * *

UNITED STATES PATENT AND TRADEMARK OFFICE
CERTIFICATE OF CORRECTION

PATENT NO. : 10,746,270 B2
APPLICATION NO. : 15/924080
DATED : August 18, 2020
INVENTOR(S) : Jon M. Nichols Page 1 of 1

It is certified that error appears in the above-identified patent and that said Letters Patent is hereby corrected as shown below:

In the Claims

In Column 29, Line 7, Claim 11, delete "liftable" and insert --tiltable--.

Signed and Sealed this
Twentieth Day of October, 2020

Andrei Iancu
*Director of the United States Patent and Trademark Office*